US011326723B2

(12) United States Patent
Reneau et al.

(10) Patent No.: US 11,326,723 B2
(45) Date of Patent: May 10, 2022

(54) SEGMENTAL TUBES

(71) Applicant: Hyperloop Technologies, Inc., Los Angeles, CA (US)

(72) Inventors: Ryan Matthew Reneau, Fullerton, CA (US); Matthew Thomas Matsumoto, Pasadena, CA (US); Matthew Allan Mey, Los Angeles, CA (US); Sushant Chavan, Pico Rivera, CA (US); Andy Hilgers, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/152,304

(22) Filed: Jan. 19, 2021

(65) Prior Publication Data
US 2021/0140567 A1 May 13, 2021

Related U.S. Application Data

(63) Continuation of application No. 16/206,510, filed on Nov. 30, 2018, now Pat. No. 10,941,886.
(Continued)

(51) Int. Cl.
*F16L 9/22* (2006.01)
*F16L 1/024* (2006.01)
(Continued)

(52) U.S. Cl.
CPC ............... *F16L 9/22* (2013.01); *B21D 51/10* (2013.01); *E01B 19/00* (2013.01); *E01B 25/00* (2013.01);
(Continued)

(58) Field of Classification Search
CPC .. F16L 9/22; F16L 1/0273; F16L 9/02; B21D 51/10; B23K 2101/06; E01B 19/00; E01B 25/00
(Continued)

(56) References Cited

U.S. PATENT DOCUMENTS 1,792,084 A * 2/1931 Glasser ................ E21D 11/102
405/148
3,565,269 A * 2/1971 Martin .................... F16L 1/036
414/537
(Continued)

FOREIGN PATENT DOCUMENTS

| CN | 103542201 | 1/2014 |
| CN | 105253150 A | 1/2016 |
| JP | H06-79900 U | 11/1994 |

OTHER PUBLICATIONS

International Search Report and Written Opinion in counterpart International Application No. PCT/US2018/063412, dated Feb. 5, 2019.
(Continued)

*Primary Examiner* — Craig M Schneider
*Assistant Examiner* — David R Deal
(74) *Attorney, Agent, or Firm* — Greenblum & Bernstein, P.L.C.

(57) ABSTRACT

A segmental tube section structure having a length and a circumference, the segmental tube section structure including a plurality of tube segments extending the length in a longitudinal direction of the segmental tube section structure and extending in a circumferential direction of the segmental tube section structure, wherein each tube segment of the plurality of tube segments extends in the circumferential direction to span an equal arc of the circumference of the segmental tube section, and wherein each of the plurality of tube segments are connected to adjacent tube segments of the plurality of tube segments in the circumferential direction to form the segmental tube section structure.

20 Claims, 53 Drawing Sheets

Related U.S. Application Data

(60) Provisional application No. 62/593,489, filed on Dec. 1, 2017.

(51) Int. Cl.

| | | |
|---|---|---|
| *B21D 51/10* | (2006.01) |
| *E01B 19/00* | (2006.01) |
| *F16L 9/02* | (2006.01) |
| *E01B 25/00* | (2006.01) |
| *B23K 101/06* | (2006.01) |

(52) U.S. Cl.
CPC ............... *F16L 1/0243* (2013.01); *F16L 9/02* (2013.01); *B23K 2101/06* (2018.08)

(58) Field of Classification Search
USPC ......................................................... 138/157
See application file for complete search history.

(56) References Cited

U.S. PATENT DOCUMENTS

| | | | | | |
|---|---|---|---|---|---|
| 4,124,985 | A | * | 11/1978 | Maimets | E21D 11/08 |
| | | | | | 405/150.1 |
| 4,693,634 | A | * | 9/1987 | Chiaves | E04B 1/18 |
| | | | | | 405/124 |
| 4,812,084 | A | * | 3/1989 | Wagner | E21D 11/08 |
| | | | | | 405/151 |
| 5,051,033 | A | * | 9/1991 | Grotenhofer | E21D 9/0879 |
| | | | | | 405/147 |
| 5,324,139 | A | * | 6/1994 | Wagner | E21D 9/0609 |
| | | | | | 405/146 |
| 5,513,573 | A | * | 5/1996 | Sutton | B61B 13/10 |
| | | | | | 104/138.1 |
| 5,735,156 | A | | 4/1998 | Yoshitomi et al. | |
| 6,089,279 | A | ‡ | 7/2000 | Clarke | E03F 3/06 |
| | | | | | 138/157 |
| 7,159,370 | B2 | ‡ | 1/2007 | Oliphant | E04C 3/30 |
| | | | | | 52/845 |
| 7,238,256 | B2 | | 7/2007 | Skinner et al. | |
| 7,464,512 | B1 | ‡ | 12/2008 | Perina | E04H 12/08 |
| | | | | | 52/651.01 |
| 7,740,731 | B2 | ‡ | 6/2010 | Leontaridis | B29C 65/342 |
| | | | | | 156/292 |
| 7,950,418 | B2 | ‡ | 5/2011 | Wolf | F16L 55/1683 |
| | | | | | 138/157 |
| 8,250,833 | B2 | ‡ | 8/2012 | Thomsen | E04H 12/085 |
| | | | | | 52/845 |
| 9,068,686 | B2 | ‡ | 6/2015 | Kamiyama | F16L 55/165 |
| 9,080,693 | B2 | * | 7/2015 | Cheney | F16L 1/036 |
| 9,233,775 | B1 | ‡ | 1/2016 | Holbrook | E03F 1/003 |
| 9,249,597 | B2 | ‡ | 2/2016 | Stiesdal | E04H 12/34 |
| 2008/0217913 | A1 | | 9/2008 | Leontaridis | |
| 2009/0090069 | A1 | ‡ | 4/2009 | Willis | E04H 12/08 |
| | | | | | 52/79.12 |
| 2009/0263221 | A1 | * | 10/2009 | Oldershaw | B60P 1/02 |
| | | | | | 414/495 |
| 2009/0314376 | A1 | ‡ | 12/2009 | Wagner | E04F 17/02 |
| | | | | | 138/148 |
| 2015/0276095 | A1 | | 10/2015 | Polk et al. | |
| 2015/0330532 | A1 | * | 11/2015 | Vines | H02G 9/08 |
| | | | | | 414/745.4 |
| 2016/0061640 | A1 | | 3/2016 | Joshi et al. | |
| 2017/0080823 | A1 | | 3/2017 | Kley et al. | |
| 2017/0210274 | A1 | | 7/2017 | de Weerdt | |
| 2018/0051735 | A1 | | 2/2018 | Stenyakin | |
| 2018/0106413 | A1 | | 4/2018 | Kuzniar | |
| 2018/0141571 | A1 | | 5/2018 | Zarafshan | |
| 2018/0208216 | A1 | | 7/2018 | Grip | |
| 2018/0208217 | A1 | | 7/2018 | Grip | |
| 2018/0281820 | A1 | | 10/2018 | Grip | |
| 2018/0282006 | A1 | | 10/2018 | Grip | |
| 2021/0071781 | A1 | * | 3/2021 | Ramsay | E02F 5/10 |

OTHER PUBLICATIONS

Extended European search report in counterpart EP application No. 18882431.2, dated Jul. 21, 2021.
Chinese Office Action in counterpart CN application No. 201880088173.X, dated Aug. 11, 2021.

\* cited by examiner
‡ imported from a related application

SEGMENTAL TUBES

CROSS-REFERENCE TO RELATED APPLICATIONS

This is a continuation of U.S. application Ser. No. 16/206,510, filed on Nov. 30, 2018, which claims the benefit of U.S. Provisional Application No. 62/593,489, filed Dec. 1, 2017. The disclosure of each of the above-mentioned documents, including the specification, drawings, and claims, is expressly incorporated by reference herein in its entirety.

BACKGROUND OF THE DISCLOSURE

1. Field of the Disclosure

The present disclosure relates to tubular structures, and more specifically relates to manufacture and deployment of segmental tubes.

2. Background of the Disclosure

Deployment of conventionally manufactured pipelines (or tubes) can be expensive and time consuming. Generally, the pipes are produced in long spans (e.g., pre-manufactured concrete or metal tubes) that need to be shipped to the job site, and then connected by known techniques, such as welding. Making pipes in smaller segments may make the segments easier to ship, but more difficult or involved to assemble. Conversely, longer segments of pipes may make assembly easier (e.g., less connections), but may render shipment and logistics more difficult. Additionally, both techniques (e.g., utilizing smaller segments or larger segments) require a large footprint at the installation site for staging (as the tube segments must be stored on site prior to connection to the pipeline (or tube structure).

Thus, there is a need for an improved method and system for manufacture and deployment of segmental tubes.

SUMMARY OF THE EMBODIMENTS OF THE DISCLOSURE

The novel features which are characteristic of the disclosure, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure.

Aspects of the disclosure are directed to a segmental tube section structure having a length and a circumference. The segmental tube section structure comprises a plurality of tube segments extending the length in a longitudinal direction of the segmental tube section structure and extending in a circumferential direction of the segmental tube section structure. Each tube segment of the plurality of tube segments extends in the circumferential direction to span an equal arc of the circumference of the segmental tube section. Each of the plurality of tube segments are connected to adjacent tube segments of the plurality of tube segments in the circumferential direction to form the segmental tube section structure.

In embodiments, the plurality of tube segments comprise a sheet metal, and each of the plurality of tube segments are connected to the adjacent tube segments of the plurality of tube segments via welds formed between the adjacent tube segments.

In further embodiments, the plurality of tube segments when welded to the adjacent tube segments of the plurality of tube segments forms an air-tight interior surface to maintain a sub 100 pa pressure environment, for example.

In additional embodiments, the plurality of tube segments are nestable with each other when arranged adjacent each other, and are accommodateable in a shipping container for shipping from a manufacturing facility.

In yet further embodiments, each of the plurality of tube segments comprises an outer metal layer and an inner metal layer.

In embodiments, the inner metal layer comprises a plurality of rib stiffeners.

In further embodiments, the plurality of rib stiffeners are welded to the outer metal layer.

In additional embodiments, the segmental tube section structure further comprises a middle layer formed between the outer metal layer and the inner metal layer.

In yet further embodiments, at least one of the plurality of tube segments comprises a transportation vehicle track or attachment structure to accommodate a vehicle track assembly.

In embodiments, at least one of the outer metal layer and the inner metal layer is a steel sheet layer.

In further embodiments, the plurality of tube segments is transportable via a shipping container to a tube assembly location, and assembleable into the segmental tube section structure at the tube assembly location.

In additional embodiments, the plurality of tube segments comprise six segments each spanning 60 degrees of the circumference of the segmental tube section structure.

In yet further embodiments, the plurality of tube segments comprise between six and eight segments.

Aspects of the disclosure are directed to a method of making one of the plurality of tube segments of the segmental tube section structure. The method comprises forming the outer metal layer, the forming the outer metal layer comprising: de-coiling a steel sheet, providing a curvature to the steel sheet along a short axis of the steel sheet that extends in a longitudinal axis of the steel sheet, and cutting the steel sheet to a desired length. The method further comprises forming the inner metal layer, the forming the inner metal layer comprising: de-coiling a second steel sheet, forming a plurality of rib blanks from the second steel sheet, and stamping the plurality of rib blanks in a press to form a plurality of ribs having the curvature. The method further comprises welding the plurality of ribs to a concave surface of the outer metal layer.

In embodiments, the method further comprises attaching at least one a propulsion track and a levitation track or attachment structure to accommodate a vehicle track assembly to at least one of the plurality of tube segments.

In further embodiments, the method further comprises bending longitudinal edges of the outer metal layer to form longitudinal sidewalls of the one of the plurality of tube segments.

Aspects of the disclosure are directed to a method of installing the segmental tube section structure. The method comprises de-containerizing the plurality of tube segments from a shipping container at an installation site, queueing the plurality of tube segments on an assembly conveyor, conveying the plurality of tube segments through previously assembled segmental tube sections from the installation site to the tube manufacturing location, and connecting the plurality of tube segments to adjacent tube segments of the plurality of tube segments, and connecting the plurality of tube segments to adjacent tube segments of a previously assembled segmental tube section structure.

In embodiments, the method of installing the segmental tube section structure further comprises lowering a tube segment into a transfer mechanism to insert a tube segment into a radial fixture spanning from column to column, then lowering a next tube segment into the transfer mechanism, rotating the tube segment by a distance of the arc, before inserting the tube segment into the radial fixture. This process is repeated on a plurality of tube segments to fully populate the fixture prior to welding or connecting the adjacent segments together along their longitudinal length.

In contemplated embodiments, the individual tube segment is welded along their short edge end to end to incrementally lengthen the tube segment longitudinally. This can occur before the inspection station at the containerization site prior to entering the tube or just prior to the installing station.

In further embodiments, a plurality of segmental tube section structures are connected with adjacent segmental tube section structures to form a tube extending in the longitudinal direction, wherein tube segments may be installed in the longitudinal direction prior to or at substantially the same time as installation of tube segments in the circumferential direction, such that the tube may be assembled in multiple directions simultaneously.

In additional embodiments, the connecting the plurality of tube segments to adjacent tube segments of the plurality of tube segments, and the connecting the plurality of tube segments to tube segments one of the previously assembled segmental tube section structures, comprises welding so as to form an air-tight interior surface.

Additional aspects of the disclosure are directed to a segmental tube section structure having a length and a circumference, the segmental tube section structure comprising, a plurality of tube segments extending the length in a longitudinal direction of the segmental tube section structure and extending in a circumferential direction of the segmental tube section structure. At least some of the tube segments of the plurality of tube segments extends in the circumferential direction to span an equal arc of the circumference of the segmental tube section. Each of the plurality of tube segments are connected to adjacent tube segments of the plurality of tube segments in the circumferential direction to form the segmental tube section structure.

In some embodiments, all but one of the tube segments of the plurality of tube segments extends in the circumferential direction to span an equal arc of the circumference of the segmental tube section.

In additional embodiments, the tube segment not spanning an equal arc of the circumference of the segmental tube section accommodates a transportation track or permanent attachment to accommodate a track assembly.

Aspects of the present disclosure are related to modular plate segments that may be attached to form a tubular structure. In an exemplary embodiment, a plate segment may include an inner plate, an outer plate, and a filling. The filling may include, for example, stiffeners and/or ribbing or concrete.

Additional aspects of the disclosure are directed to a containerization-ability of the tubular segments in, for shipping containers, for transportation from a production facility to a point of assembly. By implementing aspects of the disclosure, the tubular segments are able to be shipped overseas and around the world, while allowing the tubular segments to be centrally manufactured reducing construction times of hyperloop transportation systems. Reducing construction time is the largest driver to reducing overall cost of an infrastructure project. In accordance with further aspects of the disclosure, by maintaining manufacture at a central manufacturing facility, quality control (e.g., high tolerances), which are paramount with precision products, can be ensured to a very high degree (for example, as compared with a widely distributed manufacturing, where there may be a wide variance in quality). An additional benefit of centralized manufacture is less training may be required for staffing the manufacturing facility and staff needs may be lower (as compared to distributed manufacturing). This manufacturing aspect of the disclosure disrupts conventional less efficient construction industry practices with high volume manufacturing methodologies.

Additionally, some countries or regions of the world may not have manufacturing ability. As such, by providing a segmental tubular structure, in which, for example the tube segments can be nested within each other and stored in a shipping container, costs for transportation and installation of the segmental tubular structure can be significantly reduced and the speed of deployment can be increased. Shipping containers containing tube segments can be shipped in weeks to construction zone from a centralized manufacturing facility whereas manufacturing facilities can take at least a year to construct.

An embodiment is directed to a method for assembling a tubular structure in the field. The tubular structure may include interlocking modular segments that may be manufactured remotely and delivered to an assembly location. In embodiments, a tube assembling gantry may be deployed at the assembly location.

In accordance with aspects of the disclosure, embodiments of the disclosure can be deployed in a variety of terrains. Segments can be designed to desired size specifications and criteria, such as for ease and efficiency of shipping. Segments may also come pre-assembled with components. Thus, the tubular structure can be manufactured, shipped, and deployed in the field rapidly and relatively inexpensively.

By implementing aspects of the disclosure, cost savings may be achieved through centralized manufacture of the linear infrastructure. Additionally, mass production techniques and high volume manufacture reduces per pan cost, and thus, costs of the entire assembly can be significantly reduced through scales of economy. Quality is improved through a high-volume methodology.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the embodiments of the disclosure in conjunction with the following exemplary and non-limiting drawings wherein.

DETAILED DESCRIPTION OF THE EMBODIMENTS OF THE DISCLOSURE

Figure 1:
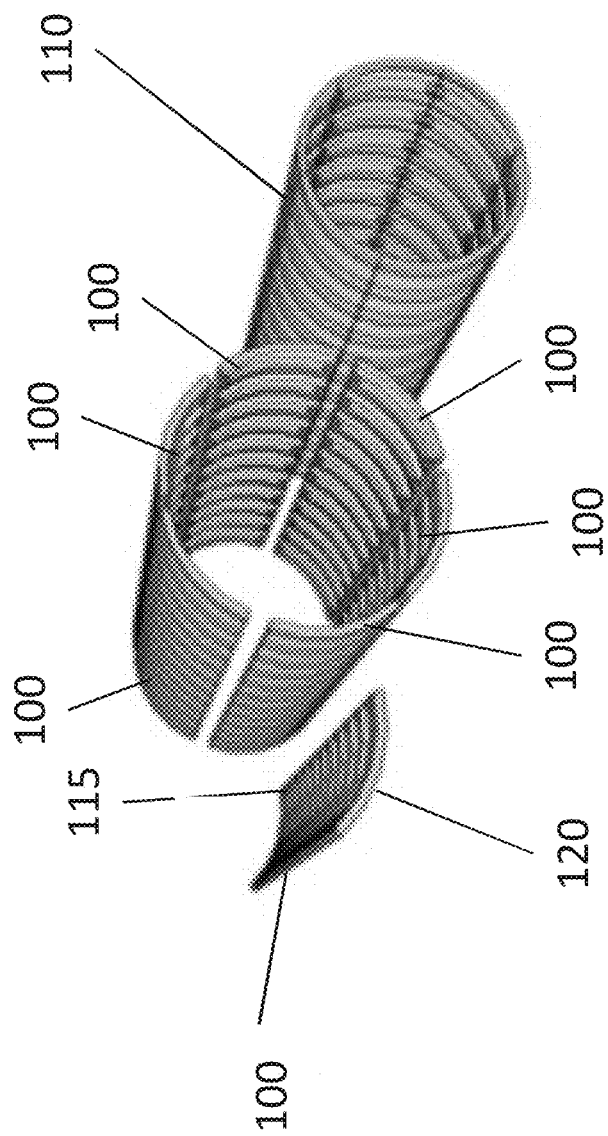
FIG. 1 shows an exemplary embodiment of a segmented tubular structure (or section) in accordance with aspects of the disclosure.

The following detailed description illustrates by way of example, not by way of limitation, the principles of the disclosure. This description will clearly enable one skilled in the art to make and use the disclosure, and describes several embodiments, adaptations, variations, alternatives and uses of the disclosure, including what is presently believed to be the best mode of carrying out the disclosure. It should be understood that the drawings are diagrammatic and schematic representations of exemplary embodiments of the disclosure, and are not limiting of the present disclosure nor are they necessarily drawn to scale.

The novel features which are characteristic of the disclosure, both as to structure and method of operation thereof, together with further aims and advantages thereof, will be understood from the following description, considered in connection with the accompanying drawings, in which an embodiment of the disclosure is illustrated by way of example. It is to be expressly understood, however, that the drawings are for the purpose of illustration and description only, and they are not intended as a definition of the limits of the disclosure.

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded. As used herein, the indefinite article "a" indicates one as well as more than one and does not necessarily limit its referent noun to the singular.

Except where otherwise indicated, all numbers expressing quantities used in the specification and claims are to be understood as being modified in all examples by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within: ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

Embodiments of the present disclosure may be used in a low-pressure high-speed transportation system, for example, as described in commonly-assigned application Ser. No. 15/007,783, titled "Transportation System," the contents of which are hereby expressly incorporated by reference herein in their entirety. For example, the segmental tube structure may be used as a transportation path for a low-pressure, high-speed transportation system. In embodiments, a low-pressure environment within a sealed tubular structure may be approximately 100 Pa.

FIG. 1 shows an exemplary embodiment of a segmental tubular structure (or section) 110 in accordance with aspects of the disclosure. Aspects of the present disclosure are directed to modular tube segments that may be attached together to form the tubular structure (or segmental tube). For example, as shown in FIG. 1, the segmental tube (or segmental tube section) 110 is formed of a plurality of (for example, six) tube segments 100. While the exemplary embodiments of the present disclosure include six tube segments or four tube segments that are connected together to form a tube section, the disclosure contemplates that the tube section may be formed of seven or eight tube segments. Additionally, while the exemplary embodiments include commonly-sized tube segments (e.g., in a direction of curvature or circumferential direction), the disclosure contemplates that one or more of the tube segments may not be commonly-sized with the remaining tube segments. For example, in some contemplated embodiments, a tube segment that includes a track assembly may be larger (e.g., in a direction of curvature or circumferential direction) then the remaining tube segments. Once arranged in place in location at an installation site, the tube segments 100 may be attached (e.g., using fasteners and/or welds) to adjacent tube segments 100 in the tube section 110 and adjacent upstream tube segments of an adjacent segmental tube section (not shown). Additionally, in embodiments as described further below, once arranged in place in location at an install site, the tube segments 100 may be attached to expansion bellows and, in embodiments, may be attached to support columns.

In some exemplary and non-limiting embodiments, a tube segment 100 may include an inner layer 115 (e.g., including in some embodiments stiffening ribs thereon), for example formed from a steel sheet or plate (e.g., with thickness of approximately 6 mm-12 mm), an outer layer 120, for example formed from a steel sheet or plate (e.g., with thickness of approximately 6 mm-13 mm), and a filling (not shown) formed or arranged between the inner layer 115 and the outer layer 120. The filling may include stiffeners and, in some embodiments, ribbing). With other contemplated embodiments, the tube segment 100 may include an outer layer (e.g., with thickness of approximately 6 mm-13 mm) with internal and/or external ribbing attached (e.g., welded) to the outer layer. In embodiments, a frequency of the ribbing can be determined using, for example, a finite analysis. The inner layer 115 may include a metal (e.g., steel) sheet. The metal sheet may be roll-formed to produce a desired curvature and adjusted for material variation. The outer layer 120 may include a metal (e.g., steel) sheet. The metal sheet may be roll-formed to produce a desired curvature. The metal sheet may be made in any of a variety of sizes that are common in the field, such as a width of approximately 3 meters. The metal sheet may be cut in any length that is desirable for the finished product, such as a length of approximately 11.5 meters. The outer layer 120 and the inner layer 115 may be substantially fixed to the filler, such that the filler (or filler layer) is nested substantially within the outer layer's radius and the inner sheet is nested substantially in the filler layer's radius. The tube segment 100 may include connectors for connecting to other a tube segments 100 radially and lengthwise, including, for example, bolt holes, hooks, and/or clamps. Desired holes may be cut from the tube segment 100. In embodiments, desired paint may be added to the tube segment 100. Additionally, desired accessories may be attached to the tube segments 100 (or at least some of the tube segments 100), such as a track section if the tube segment 100 is used to form a transportation system.

Figure 2:
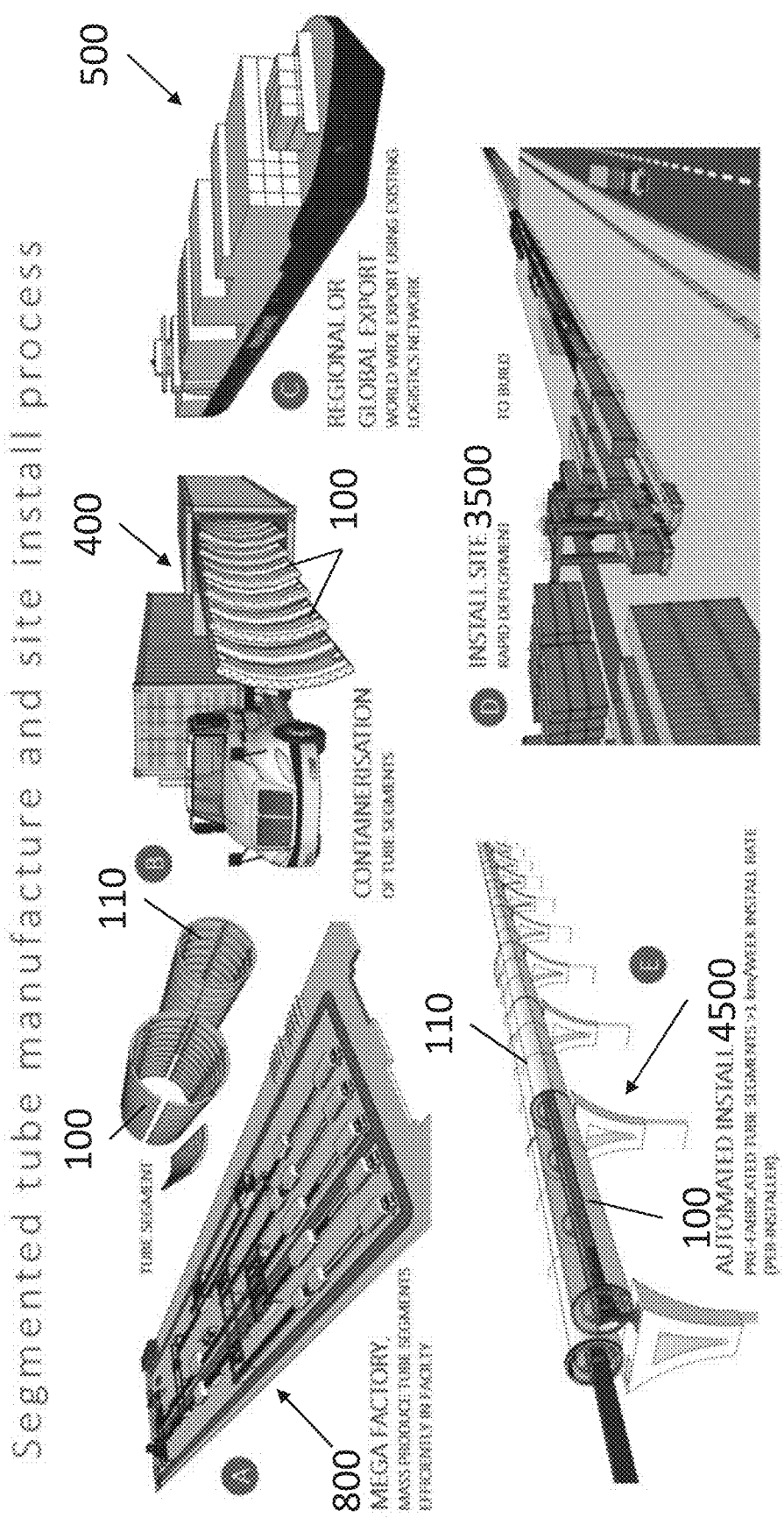
FIG. 2 shows an exemplary overview of a segmented tube manufacture, tube transportation, and on-site tubular structure deployment in accordance with aspects of the disclosure.

FIG. 2 shows an exemplary overview of a segmented tube manufacture, tube transportation, and on-site tubular structure deployment in accordance with aspects of the disclosure. As shown in FIG. 2, aspects of the disclosure include: (A) manufacture of the tube segments 100 at a manufacturing facility 800; (B) a containerization process 400 of the tube segments 100 in transportation containers; (C) a transportation 500 of the transportation containers via shipping, automobile, ship, etc.; (D) de-containerization and pre-staging process 3500 of the tube segments 100 at an assembly location; and (E) an installation/assembly process 4500 at the assembly location, wherein the tube segments 100 are installed and assembled to form a plurality of the segmental tubes (or segmental tube sections) 110.

Figure 3:
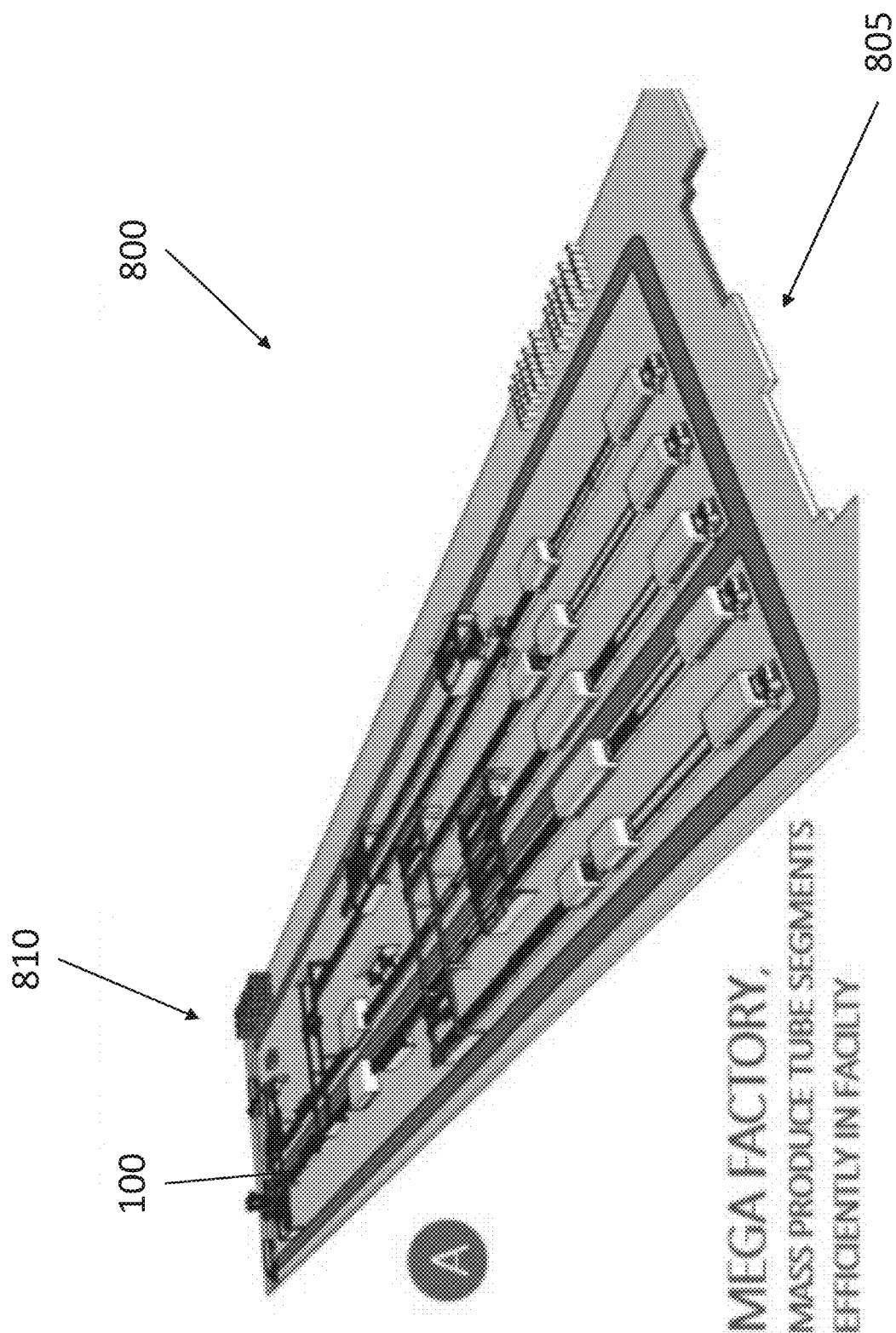
FIG. 3 shows an exemplary embodiment of a segmented tube manufacturing facility for manufacturing tube segments in accordance with aspects of the disclosure.

FIG. 3 shows an exemplary and non-limiting embodiment of a segmented (or segmental) tube manufacturing facility 800 for manufacturing tube segments in accordance with aspects of the disclosure. As shown in FIG. 3, the segmented tube manufacturing facility 800 includes a process starting side 805 at one end of the facility 800 and a process ending side 810 at the other end of the facility 800. As shown in FIG. 3, the segmented tube manufacturing facility 800 outputs the tube segments 100 at the process ending side 810.

Figure 4:
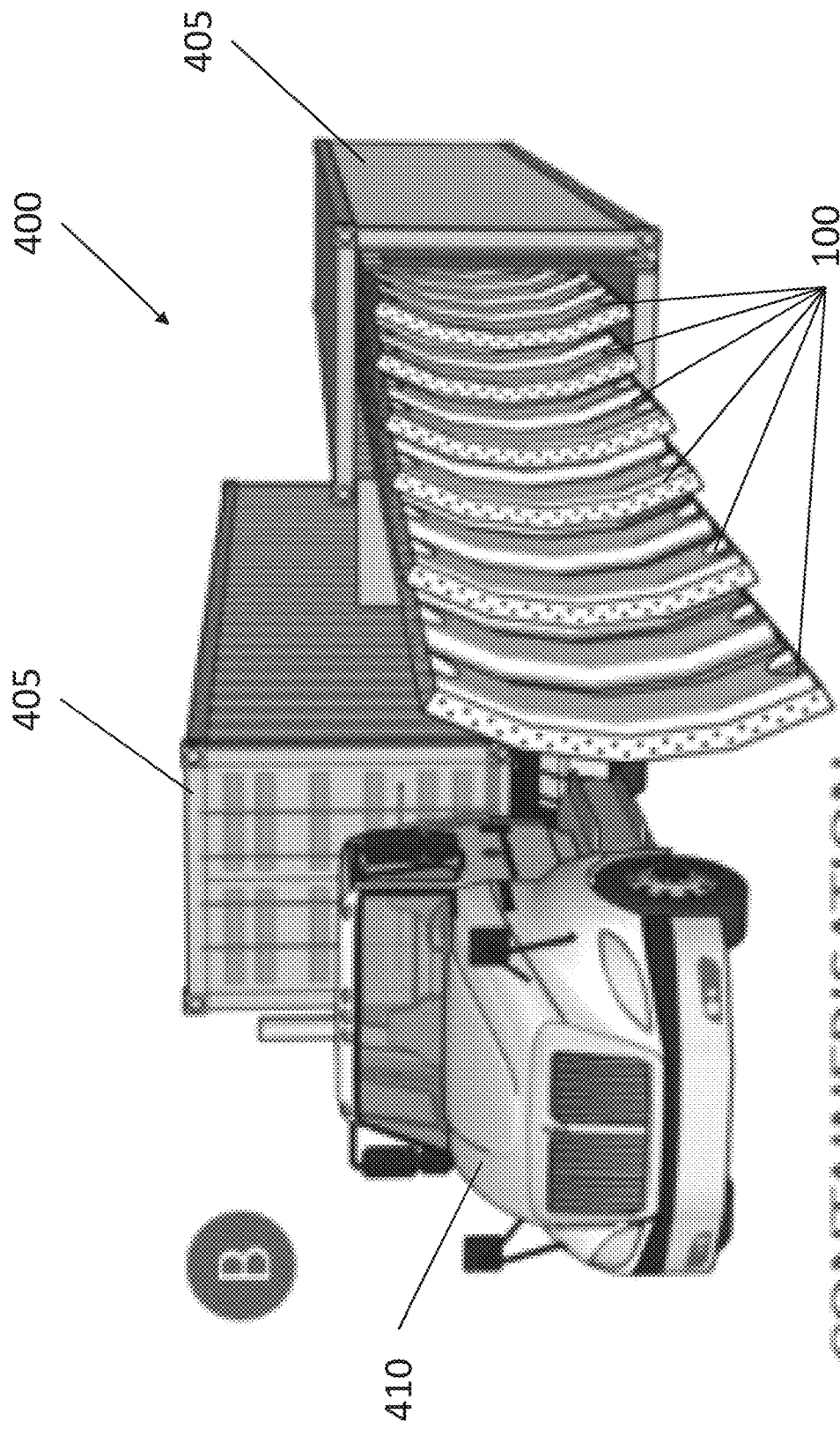
FIG. 4 shows an exemplary embodiment of containerization of tube segments for transportation to an on-site tubular structure deployment in accordance with aspects of the disclosure.

FIG. 4 shows an exemplary embodiment of containerization process 400 of tube segments 100 for transportation to an on-site tubular structure deployment location in accordance with aspects of the disclosure. As shown in FIG. 4, a transportation container 405 is loaded with tube segments 100. In accordance with aspects of the disclosure, by nesting the tube segments 100 in adjacent tube segments 100, the space necessary for transporting the tube segments 100 is minimized, such that costs of moving the tube segments 100 to an installation location are significantly reduced (e.g., as compared to transporting an already-formed tube section), and the and efficiencies for moving the tube segments 100 to an installation location are significantly increased. As shown in FIG. 4, the transportation container 405 may be arranged on a vehicle (e.g., a truck 410) for moving the tube segments 100 to an installation location. As additionally, shown in the exemplary embodiment of FIG. 4, in embodiments, the transportation container 405 is loaded with a number of tube segments 100 to form a single segmental tube section 110. Thus, with this exemplary and non-limiting embodiment, the transportation container 405 is loaded with six tube segments 100.

Figure 5:
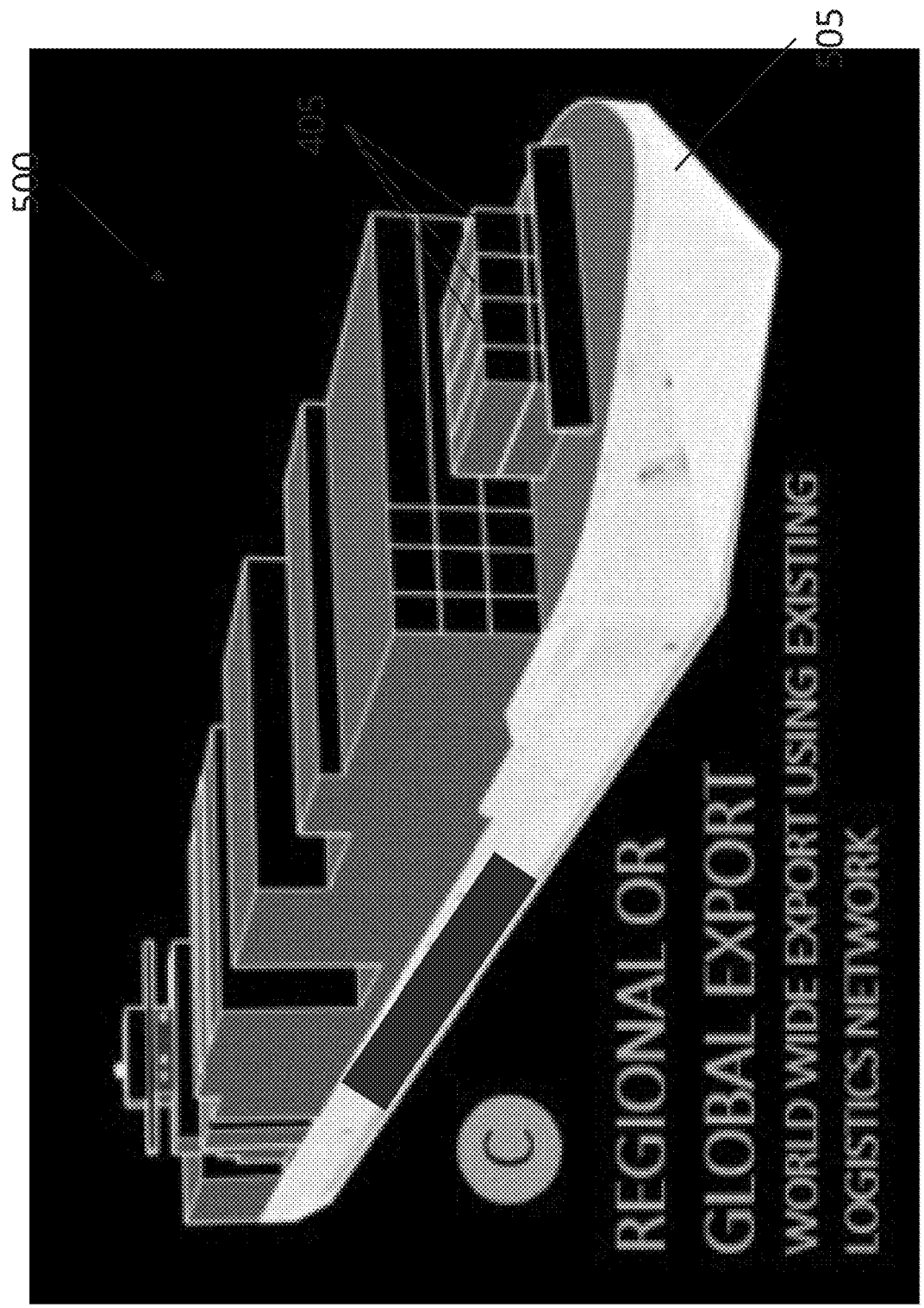
FIG. 5 shows an exemplary embodiment of an on-site tubular structure deployment in accordance with aspects of the disclosure.

FIG. 5 shows an exemplary embodiment of transportation 500 of the transportation containers 405 (each containing a number of tube segments 100, e.g., to form a single segmental tube section 110) in accordance with aspects of the disclosure. As shown in the FIG. 5, a cargo ship 505 may be used transport the transportation containers 405, for example, regionally and/or globally. As should be understood, however, a variety of transportation modes may be utilized to transport the transportation containers 405, including, for example, ships, trains, trucks, etc. Moreover, world-wide export of the transportation containers 405 may utilize existing logistics networks.

Figure 6:
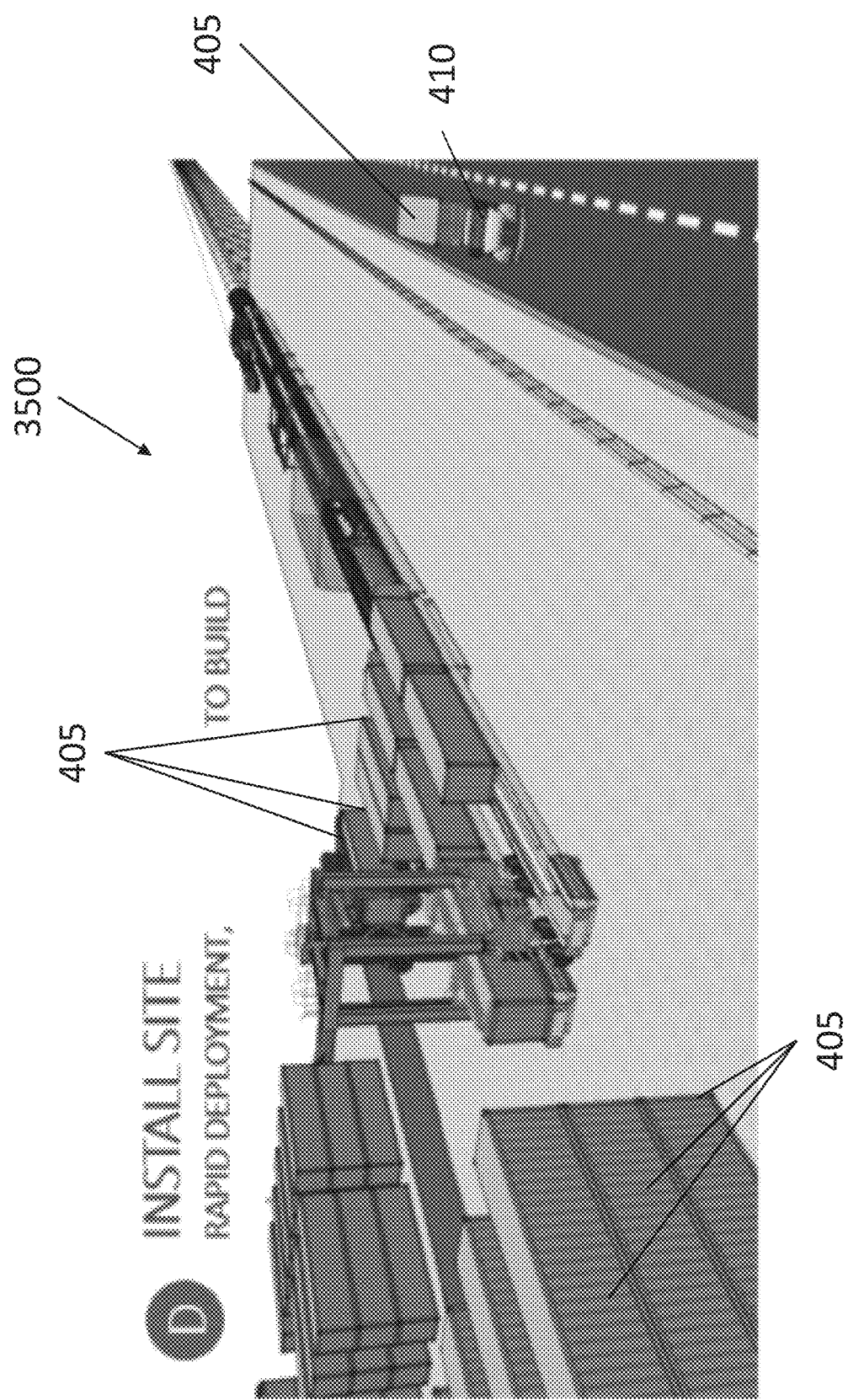
FIG. 6 shows an exemplary embodiment of an on-site tubular structure deployment in accordance with aspects of the disclosure.

FIG. 6 shows an exemplary embodiment of an on-site tubular structure deployment process 3500 at an installation site in accordance with aspects of the disclosure. As shown in FIG. 6, in embodiments, trucks 410 may transport the transportation container 405 to the installation site. The transportation containers 405 may be stacked and stored in a storage area at the installation site, and may be arranged at an unload station for removal (e.g., serial removal) of the tube segments 100 from the transportation container 405. The removed tube segments 100 are then assembled to form a segmental tube section.

Figure 7:
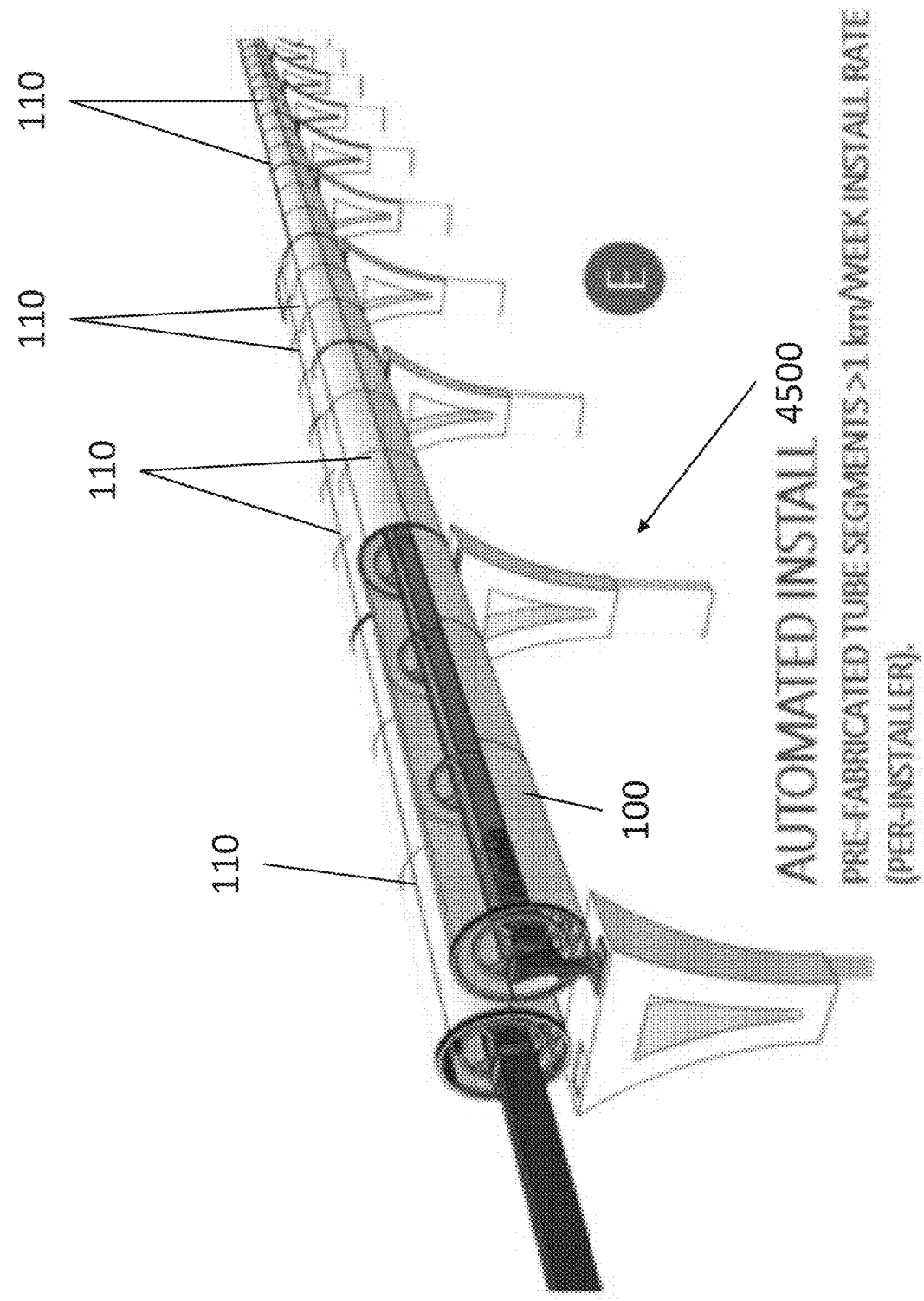
FIG. 7 shows an exemplary embodiment of an on-site tubular structure assembly and installation in accordance with aspects of the disclosure.

FIG. 7 shows an exemplary embodiment of an on-site tubular structure assembly and installation process 4500 in accordance with aspects of the disclosure. As shown in FIG. 7, a plurality of tube segments 100 are transported to an install position and assembled (e.g., fastened and/or welded) with adjacent tube segments 100 to form a segmental tube section 110. Once a segmental tube section 110 is formed, as shown in FIG. 7, the installation process 4500 continues by forming a next downstream segmental tube section 110. Additionally, in accordance with aspects of the disclosure, as shown in FIG. 7, the installation process 4500 may proceed in parallel, with two tube pathways formed side-by-side.

Aspects of the present disclosure are directed to a method for assembling/manufacturing a segmental tube segment. At least one plate (or tube segment layer) is formed by roll-forming a metal sheet into desired characteristics, including thickness, width, length, and radius of curvature. (While the description refers to a plate, it should be understood that the "plate" or tube layer is not planar, but rather is curved). In embodiments, ribbing, holes, and/or paint may be added to the plate. With some contemplated embodiments, a filling may be attached to a face of the plate, such as ribbing and/or stiffeners. In some contemplated embodiments, a second plate may be attached to the opposing side of the filling, such that the first plate, filling, and second plate substantially form a "sandwich" structure. Additionally layers of filling and plates may be added. In other contemplated embodiments, the tube segment may only have one outer layer with ribs attached thereto. This manufacturing/assembly process substantially forms a plate (or tube) segment. In some contemplated embodiments, attachment points, such as bolt holes, brackets, hooks, and/or clamps, may be added to the outer edges of the plates and/or filling to allow multiple plate segments to connect to one another in the direction of length and in the direction of curvature.

Figure 8:
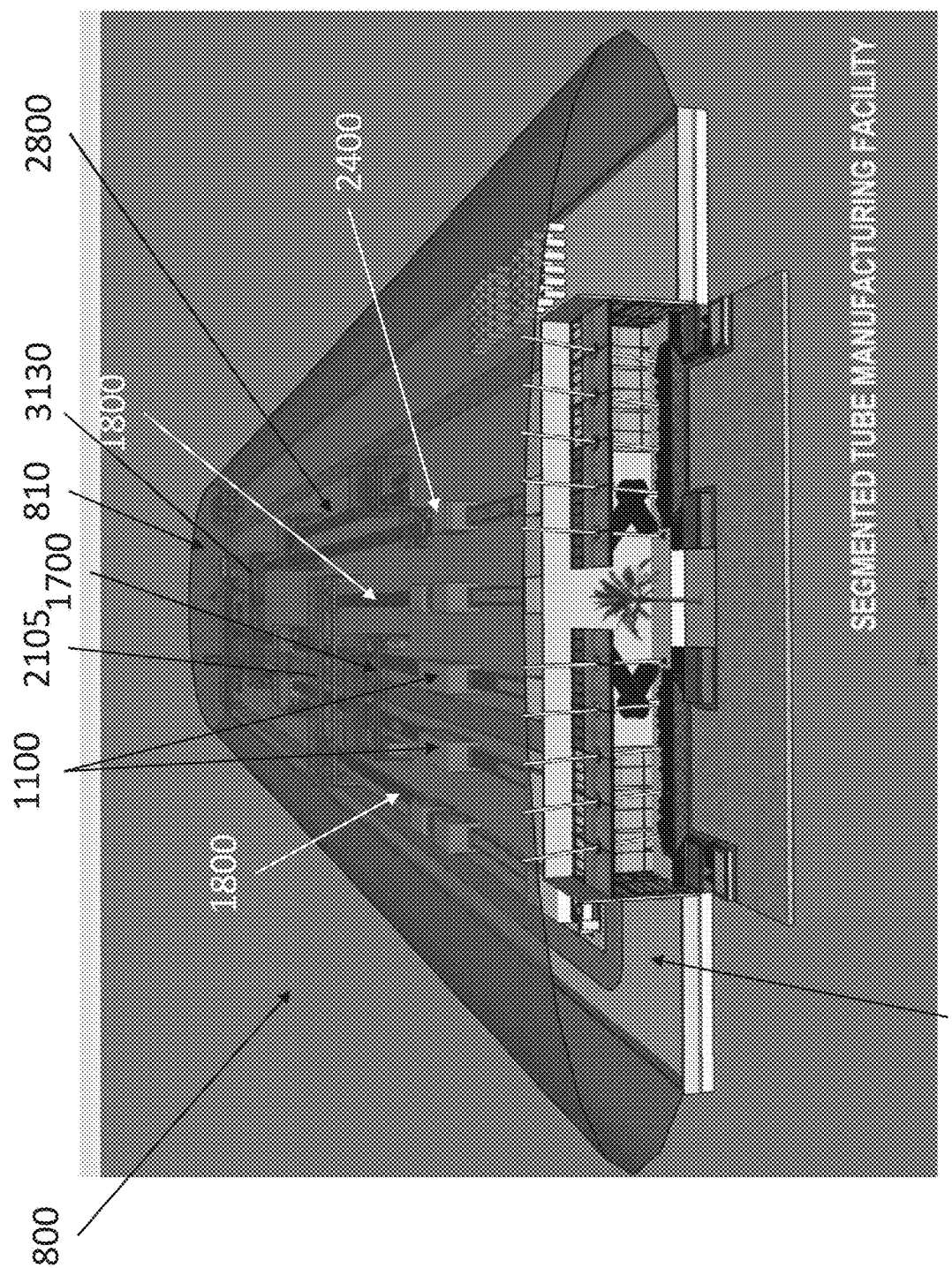
FIG. 8 shows an exemplary overview depiction of a segmented tube manufacturing facility for manufacturing tube segments from a first end of the manufacturing facility in accordance with aspects of the disclosure.

FIG. 8 shows an exemplary overview depiction of a segmented (or segmental) tube manufacturing facility 800 for manufacturing tube segments in accordance with aspects of the disclosure. The segmented tube manufacturing facility 800 includes a process starting side 805 at one end of the facility 800 and a process ending side 810 at the other end of the facility 800. As shown in FIG. 8, the perspective of the facility 800 is from the process starting side 805 of the manufacturing facility. As further shown in FIG. 8, the exemplary and non-limiting segmented tube manufacturing facility 800 includes two side-by-side tube segment manufacturing lines 1100 for manufacturing the tube segments 100. Each of the manufacturing lines 1100 includes an adjacently-arranged circumferential rib stiffener manufacturing line 1800 for forming circumferential rib stiffeners for assembling the tube segments 100. The segmented tube manufacturing facility 800 additionally includes a propulsion track fabrication line 2400 and a levitation track assembly line 2800 for manufacturing the propulsion track and levitation track.

Figure 9:
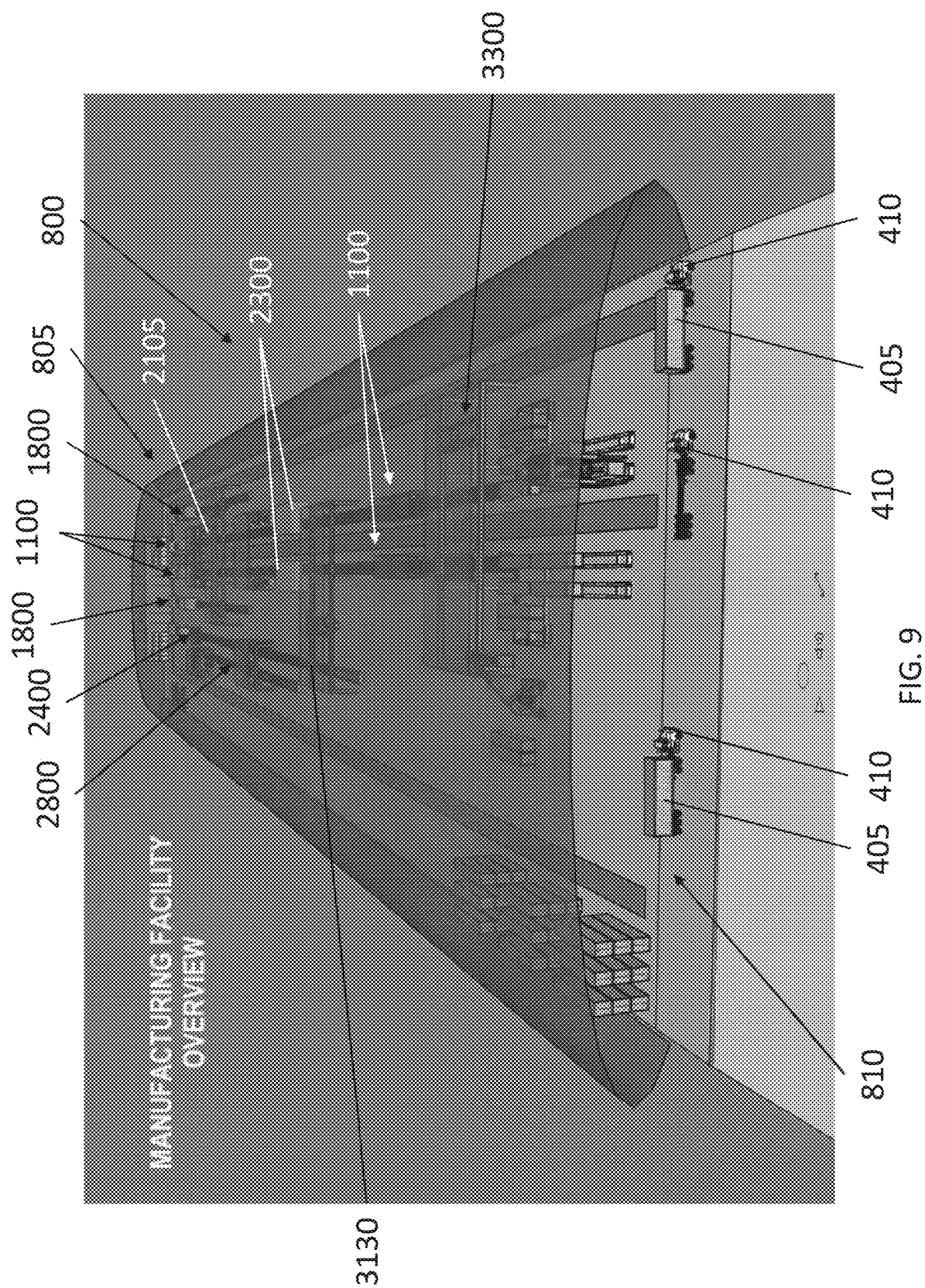
FIG. 9 shows an exemplary overview depiction of a segmented tube manufacturing facility for manufacturing tube segments from a second end of the manufacturing facility in accordance with aspects of the disclosure.

FIG. 9 shows another exemplary overview depiction of the segmented tube manufacturing facility 800 for manufacturing tube segments in accordance with aspects of the disclosure. The segmented tube manufacturing facility 800 includes the process starting side 805 at one end of the facility 800 and the process ending side 810 at the other end of the facility 800. As shown in FIG. 9, the perspective of the facility 800 is from the process ending side 810 of the manufacturing facility. Additionally, as shown in FIG. 9, at the process ending side 810, transportation vehicles 410 are arranged for receiving loaded transportation containers 405 for transportation to an installation site (and for delivering unloaded transportation containers 405 for subsequent loading with tube segments 100). As shown in FIG. 9, the exemplary and non-limiting segmented tube manufacturing facility 800 includes two side-by-side tube segment manufacturing lines 1100. Each of the manufacturing lines 1100 includes a circumferential rib stiffener manufacturing line 1800 for forming circumferential rib stiffeners adjacent to each respective manufacturing line 1100. The segmented tube manufacturing facility additionally 800 includes a propulsion track fabrication line 2400 and a levitation track assembly line 2800.

Figure 10:
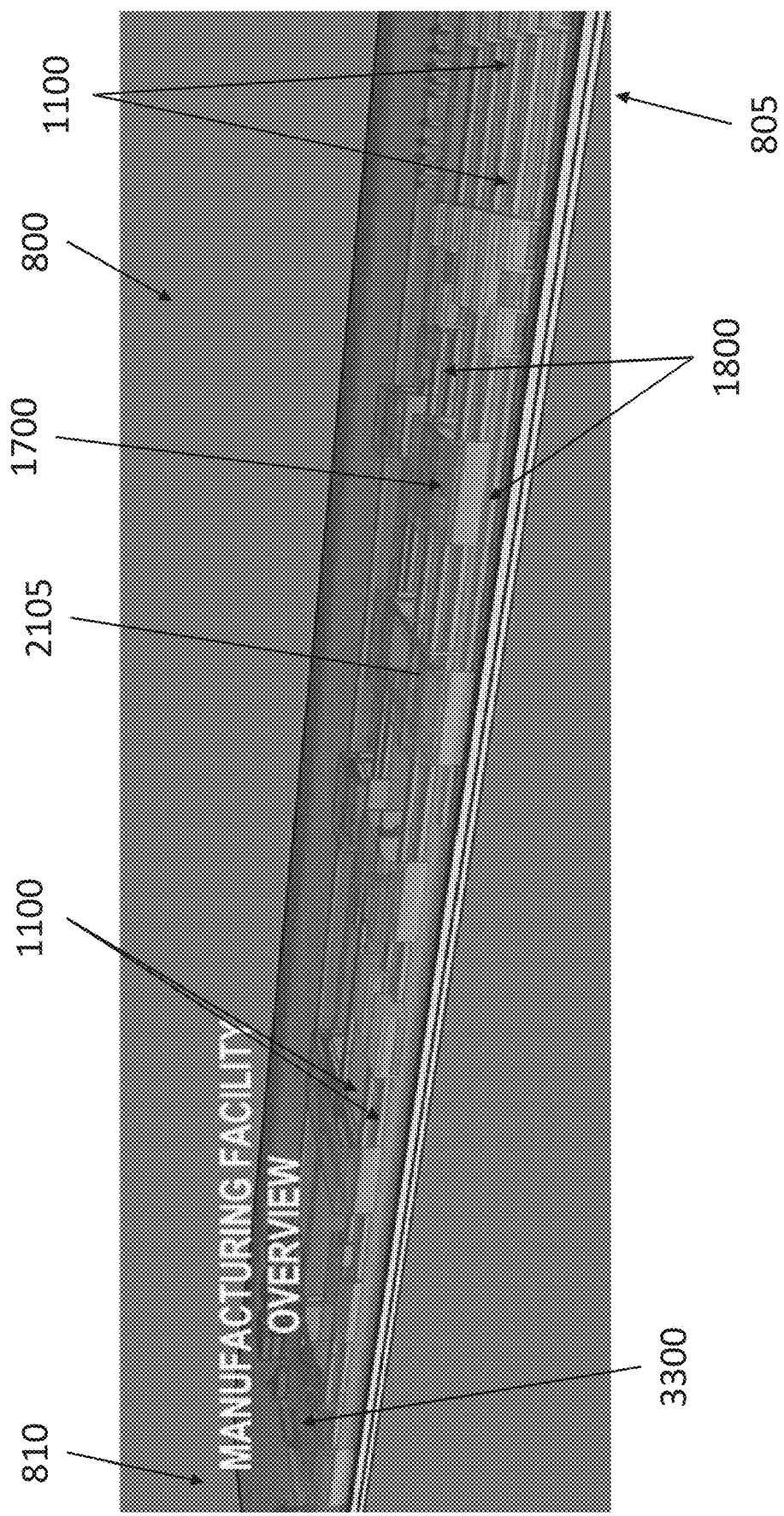
FIG. 10 shows an exemplary side view of an overview depiction of a segmented tube manufacturing facility for manufacturing tube segments in accordance with aspects of the disclosure.

FIG. 10 shows an exemplary side view of an overview depiction of the segmented tube manufacturing tube facility 800 for manufacturing tube segments in accordance with aspects of the disclosure. As shown in FIG. 10, the segmented tube manufacturing facility 800 includes the process starting side 805 at one end of the facility 800 and the process ending side 810 at the other end of the facility 800.

Figure 11:
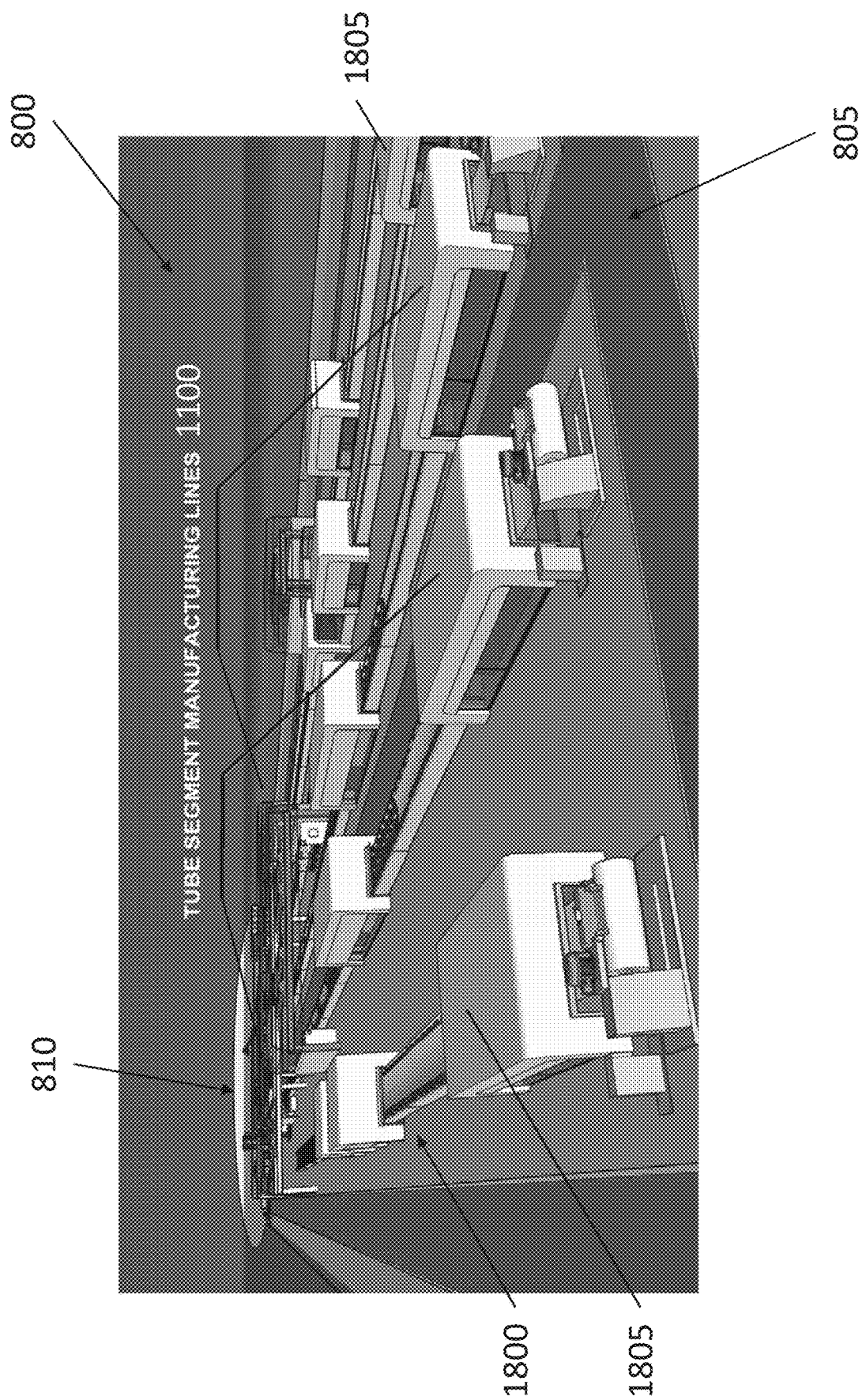
FIG. 11 shows an exemplary depiction of tube segment manufacturing lines of a segmented tube manufacturing facility for manufacturing tube segments in accordance with aspects of the disclosure.

FIG. 11 shows an exemplary depiction of two side-by-side tube segment manufacturing lines 1100 of a segmented tube manufacturing facility 800 for manufacturing tube segments in accordance with aspects of the disclosure. As shown in FIG. 11, the tube segment manufacturing lines 1100 start near the process starting side 805 at one end of the facility 800 and extend through the facility 800 to the process ending side 810 at the other end of the facility 800. FIG. 11 also shows one of the circumferential rib stiffener manufacturing lines 1800 arranged adjacent one of the tube segment manufacturing lines 1100.

Figure 12:
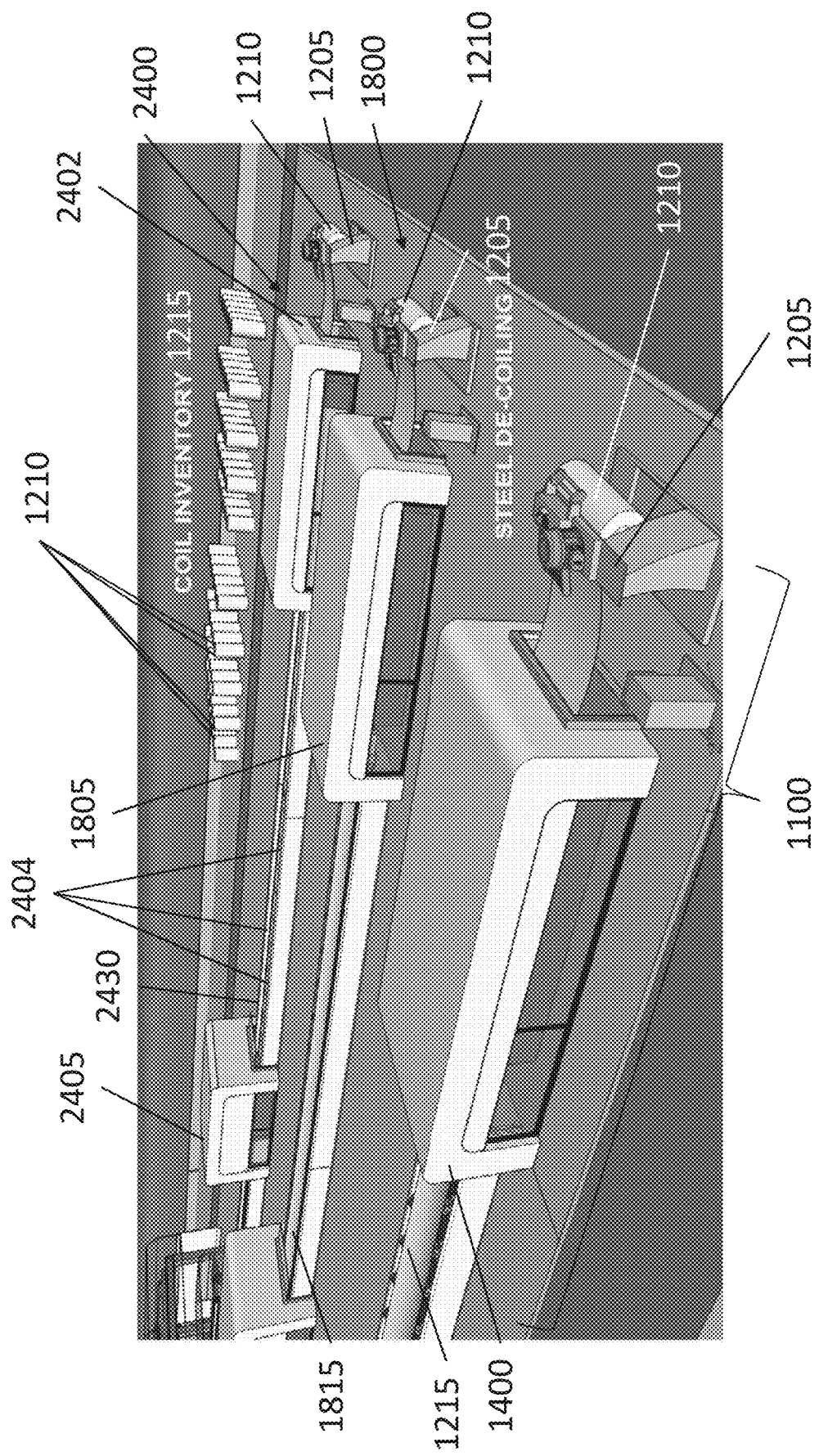
FIG. 12 shows an exemplary depiction of a steel decoiling and a coil inventory area of the tube segment manufacturing lines in accordance with aspects of the disclosure.

FIG. 12 shows an exemplary depiction of a steel de-coiler 1205 and a coil inventory area 1215 of the tube segment manufacturing lines 110 in accordance with aspects of the disclosure. As shown in FIG. 12, the process for each manufacturing line 1100 begins with a de-coiling of metal (e.g., steel) rolls 1210 using a de-coiler 1205. As shown in FIG. 12, coils (or metal rolls) 1210 may be stored in a coil inventory area 1215 of the facility 800. Once the steel is de-coiled, the metal layer is feed down the respective tube segment manufacturing lines 1100. FIG. 12 also depicts a steel de-coiling for one of the circumferential rib stiffener manufacturing lines 1800, which is arranged adjacent to one of the tube segment manufacturing lines 1100.

Figure 13:
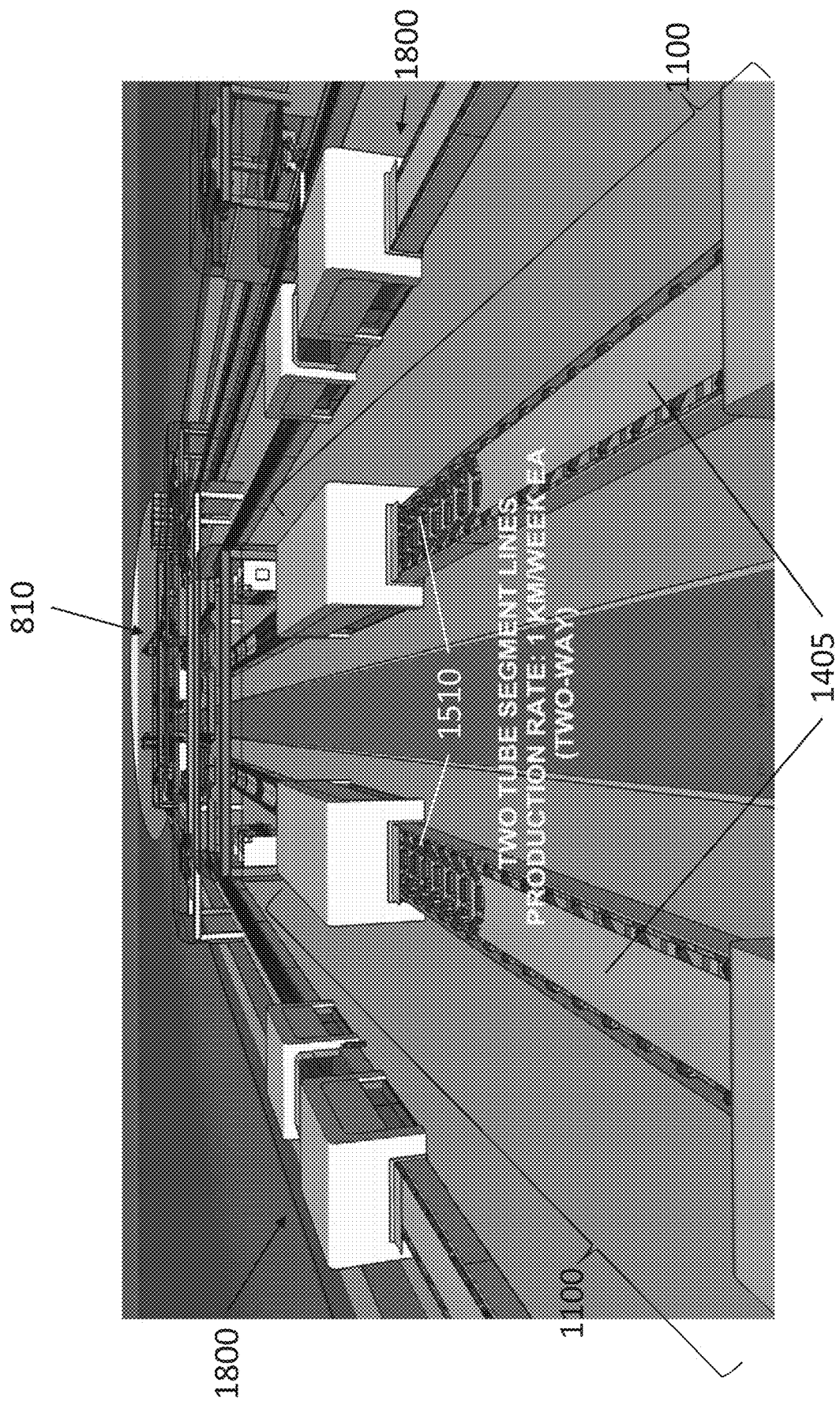
FIG. 13 shows an exemplary overview depiction of the tube segment manufacturing lines of a segmented tube manufacturing facility from a first end of the of the tube segment manufacturing lines in accordance with aspects of the disclosure.

FIG. 13 shows an exemplary overview depiction of the tube segment manufacturing lines 1100 of the segmented tube manufacturing facility 800 from a first end of the of the tube segment manufacturing lines in accordance with aspects of the disclosure. As shown in FIG. 13, the tube segment manufacturing lines 1100 start near the process starting side 805 at one end of the facility 800 and extend through the facility 800 to the process ending side 810 at the other end of the facility 800. Each of the manufacturing lines 1100 includes a conveyor 1510 structured and arranged for conveying the components of the tube segments 100 along the respective manufacturing lines 1100. As shown in FIG. 13, the conveyors 1510 may include rollers (e.g., driven rollers) and the conveyors may be curved to support the formed curved metal layer 1405 during formation of the tube segments. FIG. 13 also shows the two circumferential rib stiffener manufacturing lines 1800 arranged adjacent each of the tube segment manufacturing lines 1100.

Figure 14:
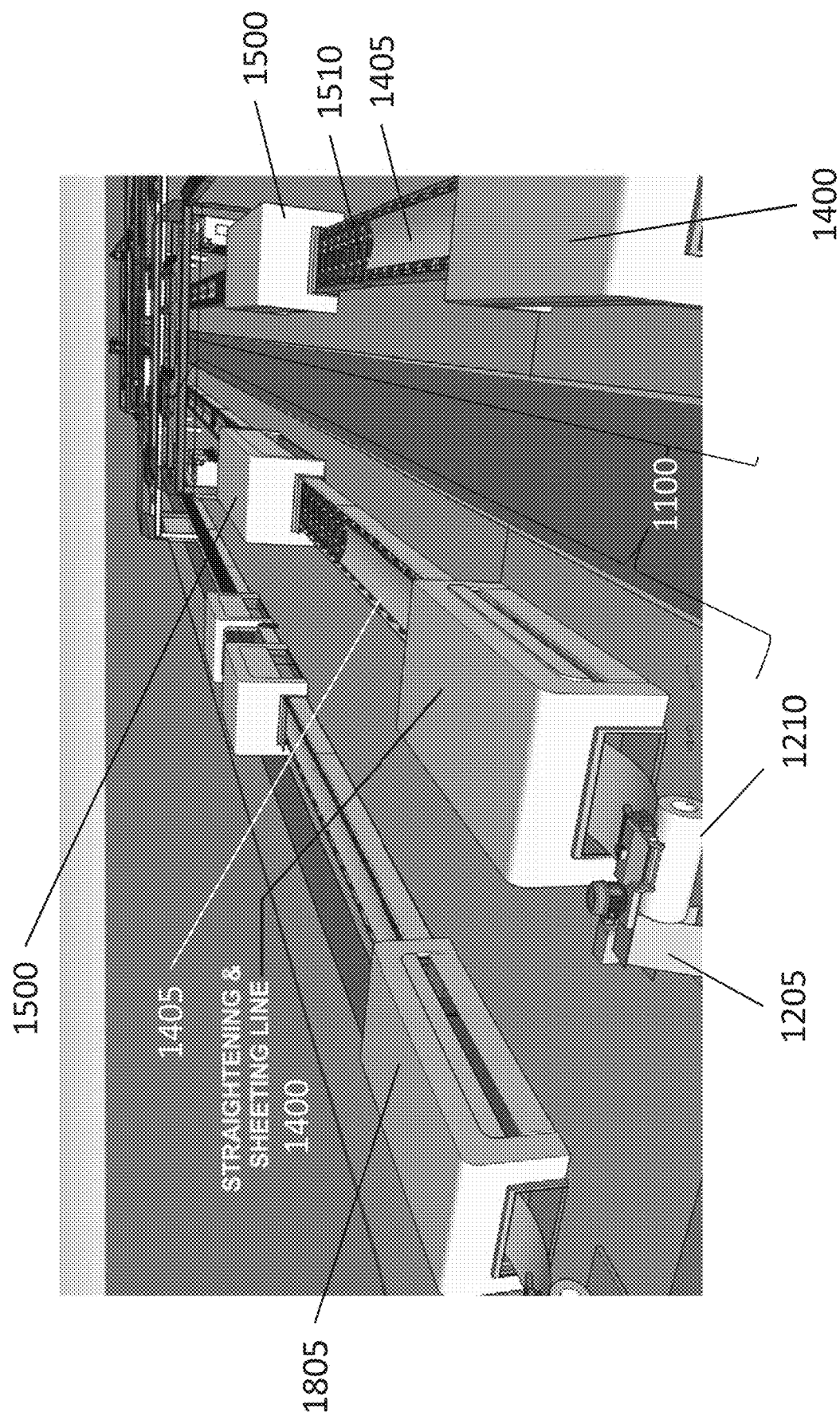
FIG. 14 shows an exemplary depiction of a straightening and sheeting line manufacturing process of the tube segment manufacturing lines in accordance with aspects of the disclosure.

FIG. 14 shows an exemplary depiction of a straightening and sheeting line manufacturing process of the tube segment manufacturing lines in accordance with aspects of the disclosure. As shown in FIG. 14, after the de-coiling of metal (e.g., steel) rolls 1210 using a de-coiler 1205, the metal layer is feed down the respective tube segment manufacturing lines 1100 to a straightening and sheeting apparatuses 1400. In the straightening and sheeting apparatus 1400, the metal layer is formed into the curved metal layer 1405 (e.g., continuous sheet), which moves down the conveyer 1510. FIG. 14 also depicts one of the circumferential rib stiffener manufacturing lines 1800, which is arranged adjacent to one of the tube segment manufacturing lines 1100.

Figure 15:
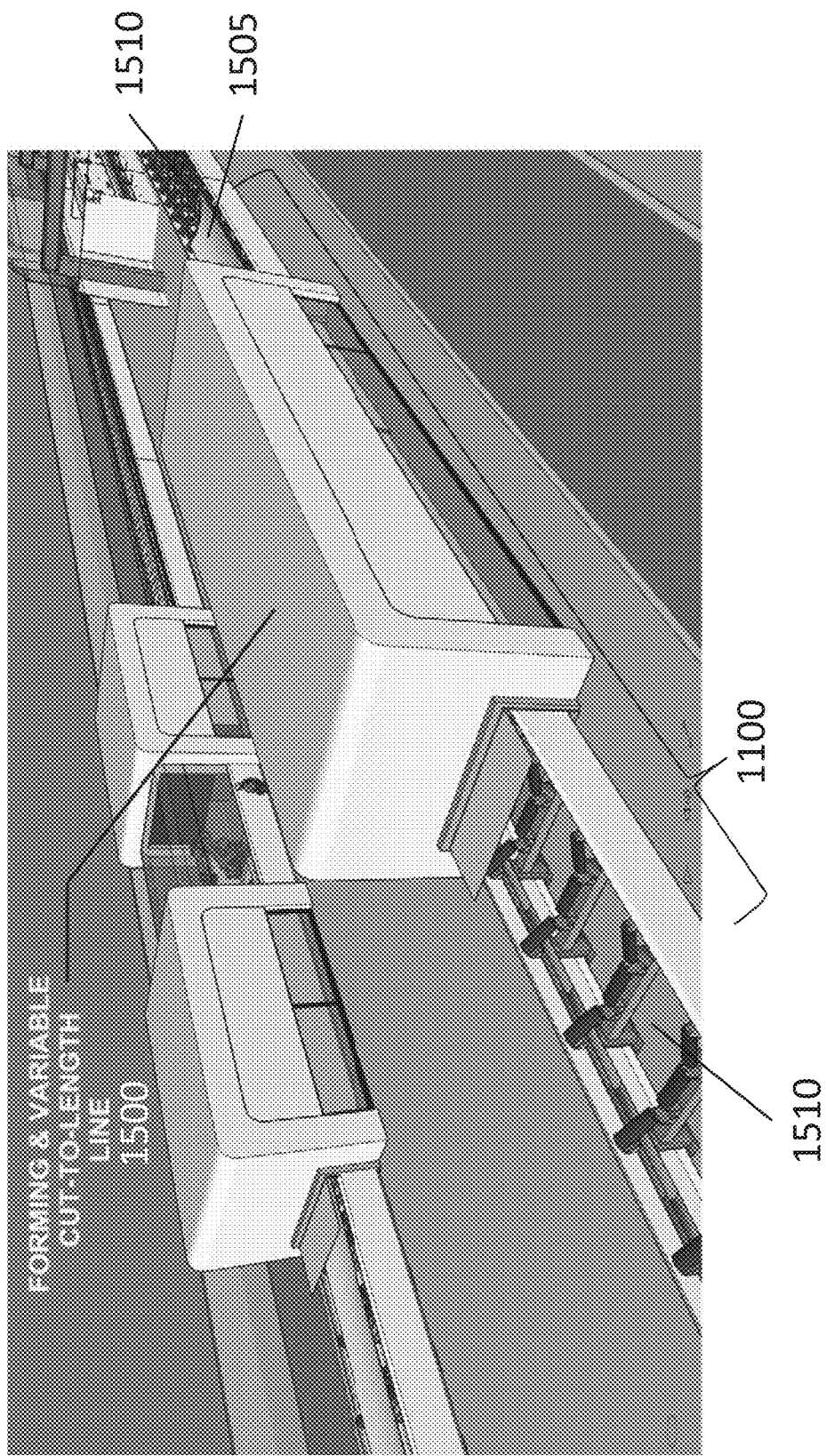
FIG. 15 shows an exemplary depiction of a forming and variable cut-to-length line of the tube segment manufacturing lines in accordance with aspects of the disclosure.

FIG. 15 shows an exemplary depiction of a forming and variable cut-to-length apparatus 1500 of the tube segment manufacturing lines in accordance with aspects of the disclosure. After the straightening and sheeting apparatus 1400, the curved metal sheet 1405 (e.g., continuous sheet) is fed along the conveyor 1510 into the forming and variable cut-to-length apparatus 1500, in which the curved metal sheet 1405 is formed (e.g. cut) into a tube segment outer skin (or layer) 1505. As should be understood, the forming and variable cut-to-length apparatus 1500 is operable to cut (e.g., using a laser, water, mechanical shearing, etc.) the curved metal sheet 1405 (e.g., continuous sheet) into the outer skin (or layer) 1505 of a selectable predetermined length.

Figure 16:
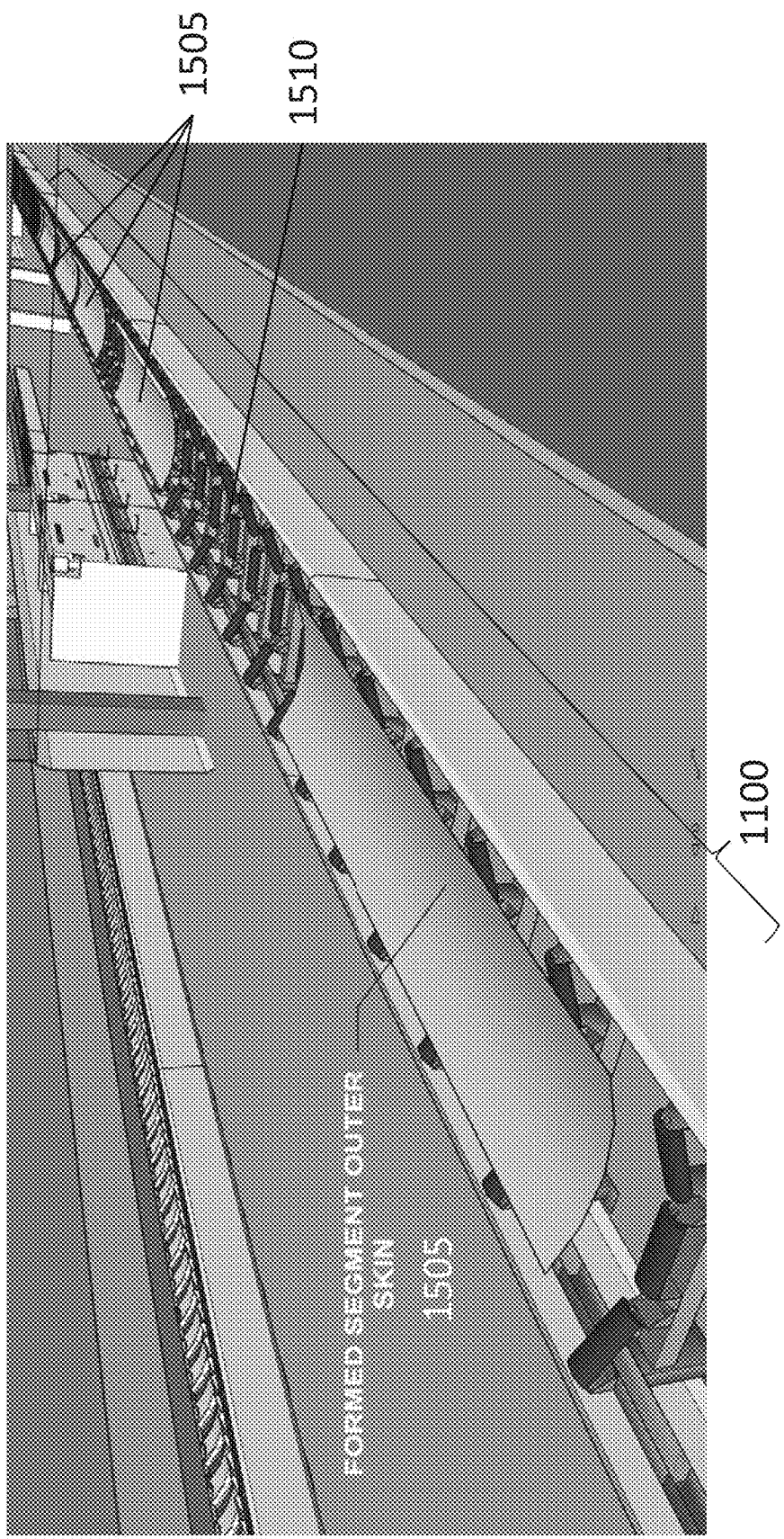
FIG. 16 shows an exemplary depiction of a formed segment outer skin in accordance with aspects of the disclosure.

FIG. 16 shows an exemplary depiction of a formed segment outer skin 1505 fed along the conveyor 1510 after leaving the forming and variable cut-to-length apparatus 1500 in accordance with aspects of the disclosure. As shown in FIG. 16, a queue of segment outer skins 1505 are proceeding down the conveyor 1510.

Figure 17:
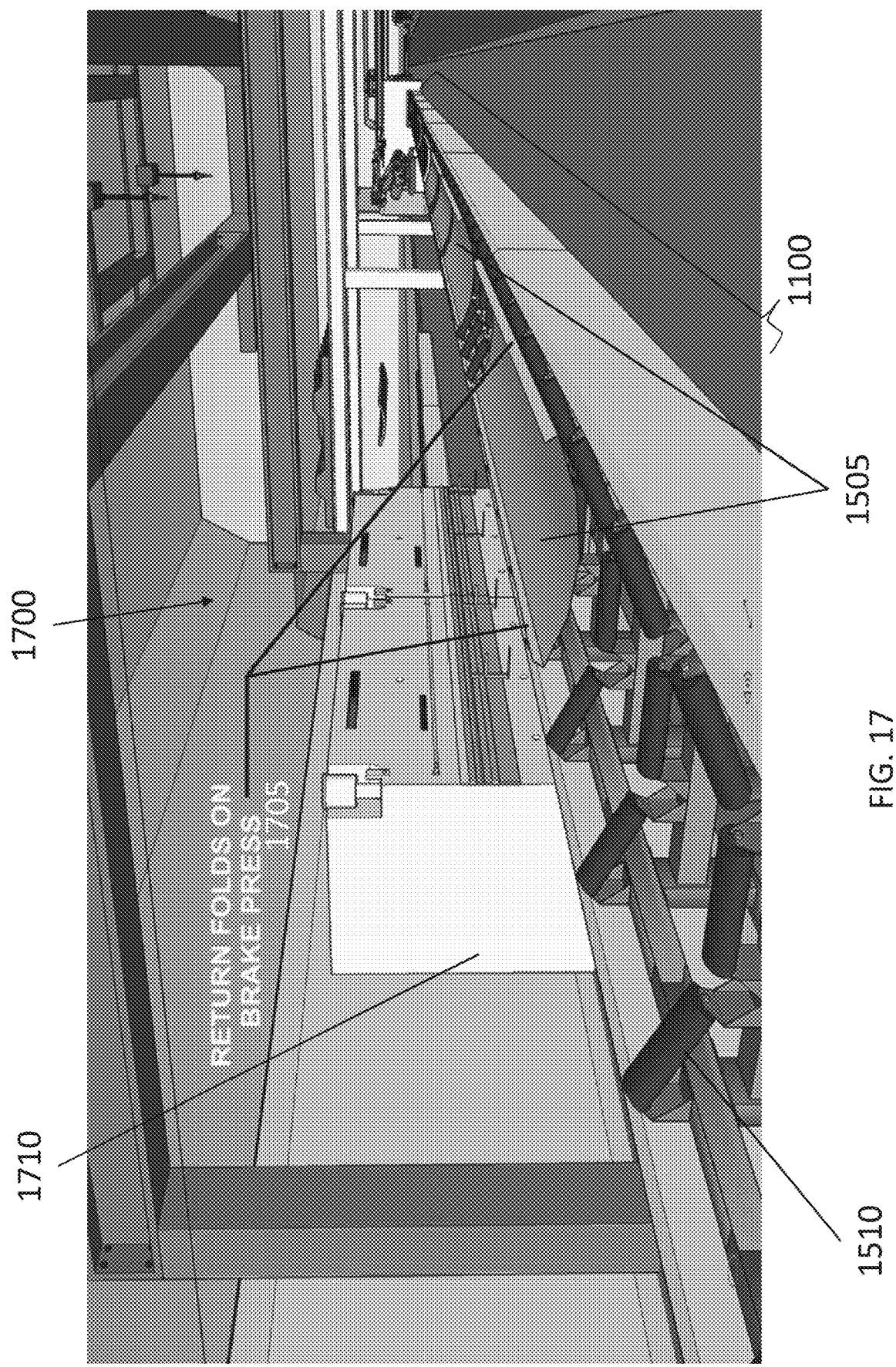
FIG. 17 shows an exemplary depiction of a return folds manufacturing process of the tube segment manufacturing line in accordance with aspects of the disclosure.

FIG. 17 shows an exemplary depiction of an optional return folds manufacturing process/station 1700 of the tube segment manufacturing line 1100 in accordance with aspects of the disclosure. With some contemplated embodiments, after the segment outer skin 1505 is conveyed from the forming and variable cut-to-length apparatus 1500, the segment outer skin 1505 is formed (e.g., via press 1710) to provide folds (or flanges) 1705 on the longitudinal sides of the segment outer skin 1505. As shown in FIG. 17, a queue of segment outer skins 1505 with folds 1705 are proceeding down the conveyor 1510. With other contemplated embodiments, however, folds (or flanges) may not be provided to the tube segments for connecting to adjacent tube segments, and the tube segments are securely connected to each other by a laser welding process, in which a butt weld is formed between adjacent tube segments. In such a manner, materials for forming the flange may be saved, and costs for manufacturing the tube segments may be reduced. With such embodiments, there would not be any return folds manufacturing process/station 1700 needed.

Figure 18:
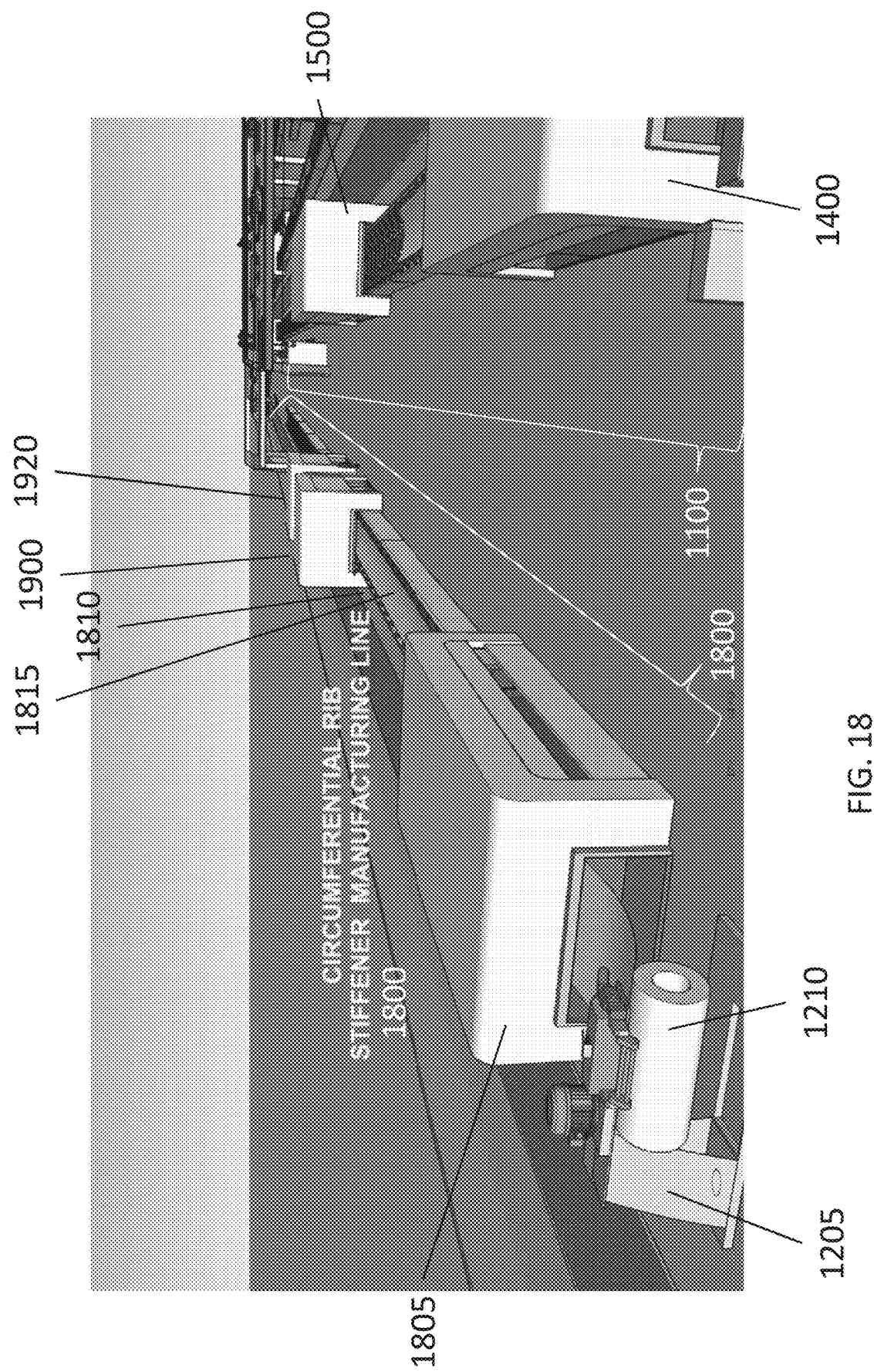
FIG. 18 shows an exemplary overview depiction of the circumferential rib stiffener manufacturing line of the segmented tube manufacturing facility from a first end of the of the circumferential rib stiffener manufacturing line in accordance with aspects of the disclosure.

FIG. 18 shows an exemplary overview depiction of the circumferential rib stiffener manufacturing line 1800 of the segmented tube manufacturing facility 800 from a first end of the of the circumferential rib stiffener manufacturing line 1800 in accordance with aspects of the disclosure. As shown in FIG. 18, after the dc-coiling of metal (e.g., steel) rolls 1210 using a de-coiler 1205, the metal layer is feed down the circumferential rib stiffener manufacturing line 1800 to a straightening and sheeting apparatus 1805. In the straightening and sheeting apparatus 1805, the metal layer is formed into a flat metal sheet 115, which moves further down the conveyer 1810.

Figure 19:
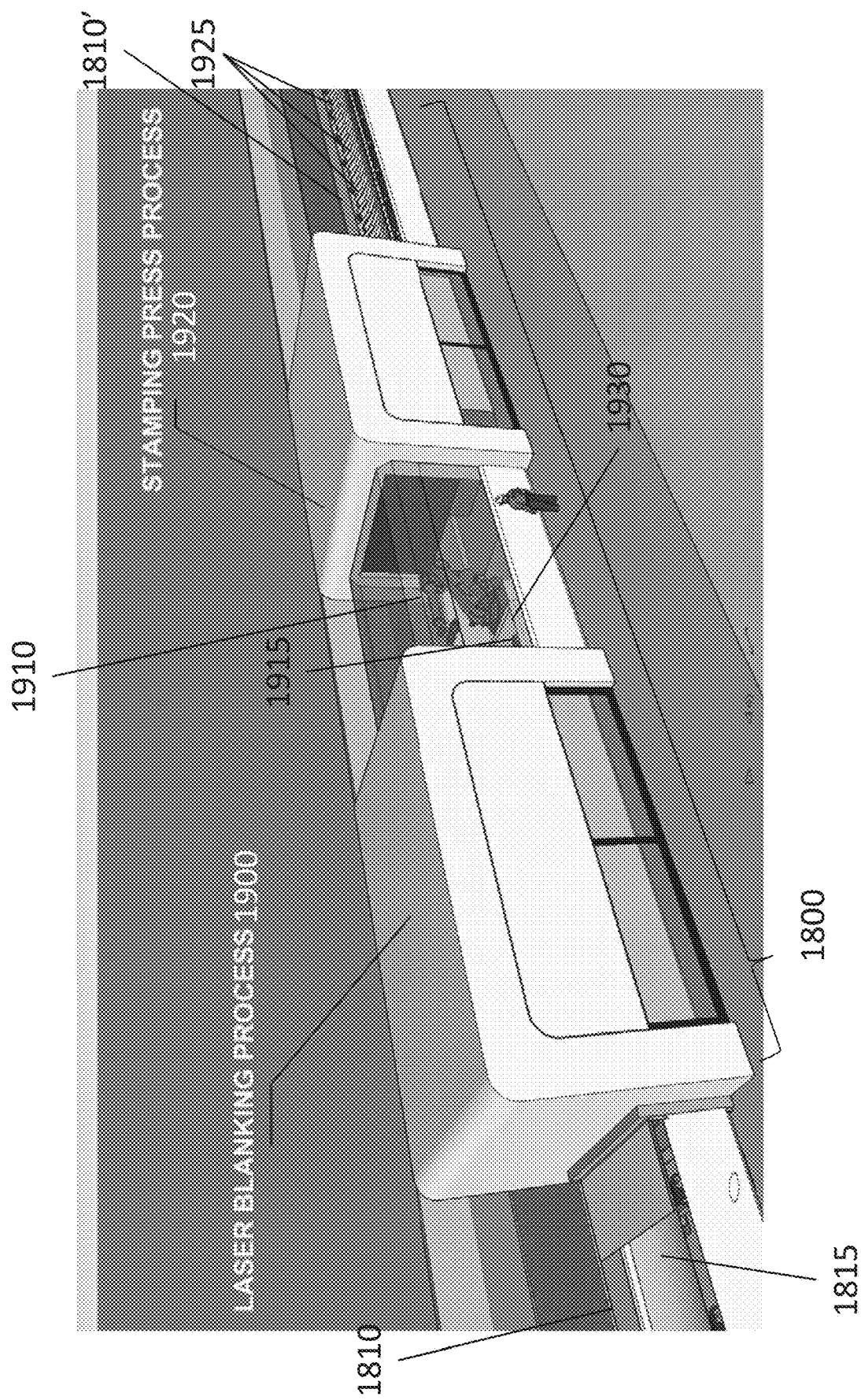
FIG. 19 shows an exemplary depiction of a laser blanking manufacturing process and stamp press process of the circumferential rib stiffener manufacturing line in accordance with aspects of the disclosure.

FIG. 19 shows an exemplary depiction of a laser blanking manufacturing process/station 1900 and stamp press process/station 1920 of the circumferential rib stiffener manufacturing line 1800 in accordance with aspects of the disclosure. After the fat metal sheet 1815 leaves the straightening and sheeting apparatus 1805, the flat metal sheet 1815 is fed into a laser blanking process/station 1900, in which the flat metal sheet 1815 is cut into blanks 1915 using, e.g., a laser. The blanks 1915 may be temporarily stored in a receiving bin 1930 prior to placement in the stamp press process/station 1920. While the exemplary embodiment utilizes a laser blanking process/station 1900, it should be understood that the disclosure contemplates other known blank cutting methods and techniques.

As shown in FIG. 19, a robot 1910 (or a plurality of robots) may be configured to remove the blanks 1915 from the receiving bin 1930 (e.g., individually) for placement in the stamp press process/station 1920. In the stamping press process/station 1920, the blanks 1915 are formed into sheet metal ribs 1925. For example, the stamp press process/station 1920 includes presses and molds configured to form one or more of the blanks 1915 into ribs 1925, remove the ribs 1925 from the press, and one or more manipulation devices configured to arrange the formed ribs 1925 on the conveyor 1810' in a predetermined orientation.

While described above as individual ribs, in contemplated embodiments, the ribbed structure stamping press process/ station 1920 may be configured (e.g., the stamping presses may be configured) to form a ribbed structure comprising a plurality of ribs. In embodiments, the ribbed structure may be of approximately equal length to the outer layer 1505 (or a factor thereof, in a mathematical sense; that is the length of the outer layer 1505 is a multiple of the length of the ribbed structure).

Figure 20:
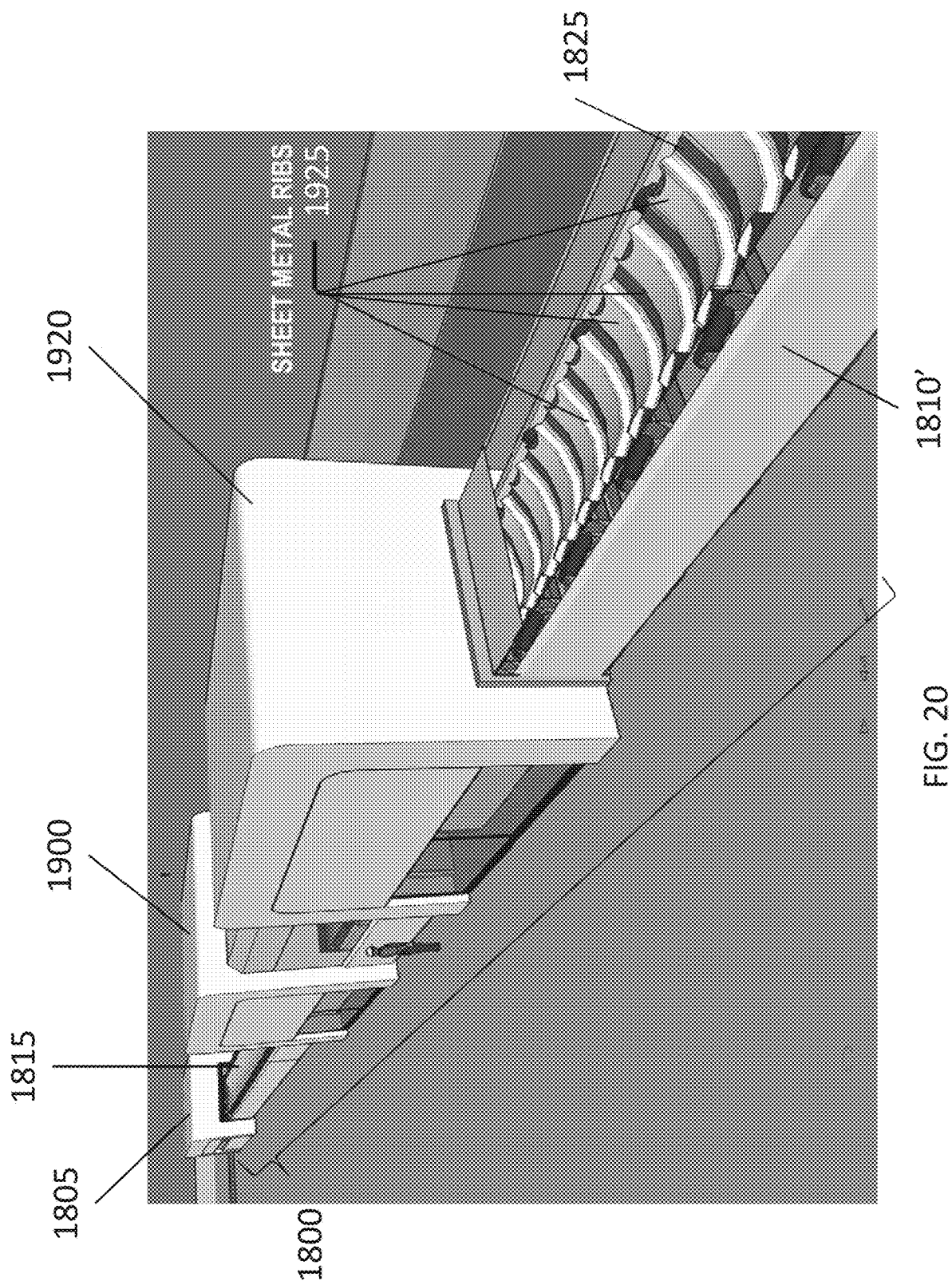
FIG. 20 shows an exemplary depiction of formed sheet metal ribs on the circumferential rib stiffener manufacturing line in accordance with aspects of the disclosure.
Figure 21:
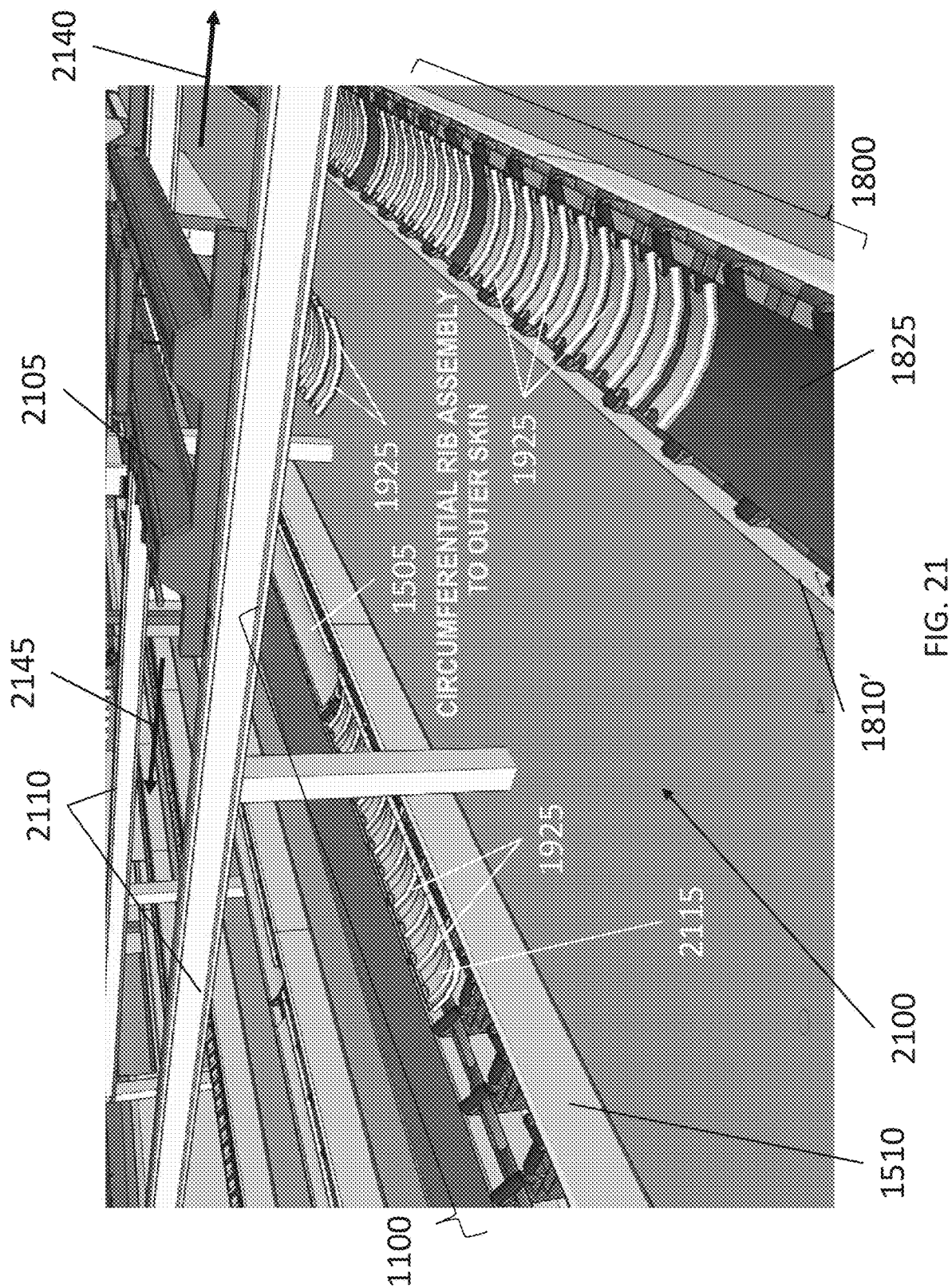
FIG. 21 shows an exemplary depiction of a circumferential rib assembly to outer skin manufacturing process in accordance with aspects of the disclosure.

FIG. 20 shows an exemplary depiction of formed sheet metal ribs 1925 on the circumferential rib stiffener manufacturing line 1800 in accordance with aspects of the disclosure. As shown in FIG. 20, after the laser blanking process and the stamping press process 1920, the curved metal sheet 1815 is formed into a plurality of sheet metal ribs 1925, which continue along the conveyor 1810'. In embodiments (e.g., when transporting the individual ribs 1925 as opposed to a ribbed structure comprising a plurality of ribs), the conveyor 1810' may include a belt surface 1825 to support the individual ribs 1925 during transport along the conveyor 1810', FIG. 21 shows an exemplary depiction of a circumferential rib assembly to outer skin manufacturing process 2100 in accordance with aspects of the disclosure. As shown in FIG. 21, the formed ribs 1925 are moved down the circumferential rib stiffener manufacturing line 1800 on conveyor 1810' to a rib-skin assembly area of the manufacturing facility 800. Adjacent to the conveyor 1810, outer skins 1505 with folds 1705 (as used with some contemplated embodiments) are proceeding down the tube segment manufacturing line 1100 on conveyor 1510 to the rib-skin assembly area of the manufacturing facility 800.

As shown in FIG. 21, an overhead crane 2105 is moveable along tracks 2110 back-and-forth in directions 2140, 2145. The overhead crane 2105 is operable to carry and raise/lower one or more (e.g., an array of) the formed ribs 1925 from the circumferential rib stiffener manufacturing line 1800 to the tube segment manufacturing line 1100. For example, in embodiments, the overhead crane 2105 may be configured to carry a number of formed ribs 1925 necessary for a single outer skin 1505. Additionally, the overhead crane 2105 may be operable to move the plurality of ribs 1925 while maintaining an orientation and spacing of the ribs 1925 relative to one another. In embodiments, the overhead crane 2105 may secure the one or more formed ribs 1925 for transport to the tube segment manufacturing line 1100 using magnets, actuating grips, and/or vacuums, for example.

As shown in FIG. 21, with the circumferential rib assembly-to-outer skin manufacturing process 2100, the overhead crane 2105 is operable to position itself over the circumferential rib stiffener manufacturing line 1800, and lower a rib securing mechanism (e.g., that utilizes, magnets, actuating grips, and/or vacuums, for example) over one or more ribs 1925 arranged (e.g., in a predetermined relative spacing) on the rib stiffener manufacturing line 1800. The overhead crane 2105 is further operable to secure one or more ribs 1925 arranged (e.g., in a predetermined relative spacing) on the rib stiffener manufacturing line 1800 and raise the one or more ribs 1925 vertically off the rib stiffener manufacturing line 1800. The overhead crane 2105 is further operable to move the one or more ribs 1925 in direction 2145 so as to position the one or more ribs 1925 over the tube segment manufacturing line 1100. The overhead crane 2105 is further operable to lower the one or more ribs 1925 vertically onto an outer skin 1505 arranged on the tube segment manufacturing line 1100. The overhead crane 2105 is further operable to release the rib securing mechanism so as to release the one or more ribs 1925 arranged (e.g., in the predetermined relative spacing) on the outer skin 1505. The overhead crane 2105 is further operable to raise the rib securing mechanism and position itself over the circumferential rib stiffener manufacturing line 1800 to begin the next cycle of the circumferential rib assembly-to-outer skin manufacturing process 2100.

As should be understood (see, e.g., FIG. 8), the same overhead crane 2105 has a movement range in directions 2140, 2145 so as to be operable for both of the tube segment manufacturing lines 1100 and both of the rib stiffener manufacturing lines 1800. Additionally, in contemplated embodiments, the overhead crane 2105 may have two rib securing mechanisms and may be operable to carry a plurality of rib arrays (e.g., ribs arranged in the predetermined relative spacing) for example in a side-by-side arrangement on a left side and a right side of the overhead crane 2105. For example, as depicted in the exemplary and non-limiting depiction of FIG. 21, the overhead crane 2105 may be transporting a plurality of ribs in a right-side rib securing mechanism of the overhead crane 2105.

As noted above, while described above as individual ribs, in contemplated embodiments, the ribbed structure stamping press process 1920 may be configured (e.g., the stamping presses may be configured) to form a ribbed inner layer structure comprising a plurality of ribs. With such embodiments, for example, the disclosure contemplates the circumferential rib assembly-to-outer skin manufacturing process 2100 may be configured for such ribbed inner layer structure comprising a plurality of ribs. For example, the overhead crane 2105 may have rib securing mechanisms configured for the ribbed inner layer structure comprising a plurality of ribs.

In embodiments, operation and control of the circumferential rib assembly-to-outer skin manufacturing process 2100 may be performed in an automatic/autonomous manner using computer-aided manufacturing. In other contemplated embodiments, manual control may be utilized for one or more steps of the circumferential rib assembly-to-outer skin manufacturing process 2100 (e.g., transport in direction 2145).

Figure 22:
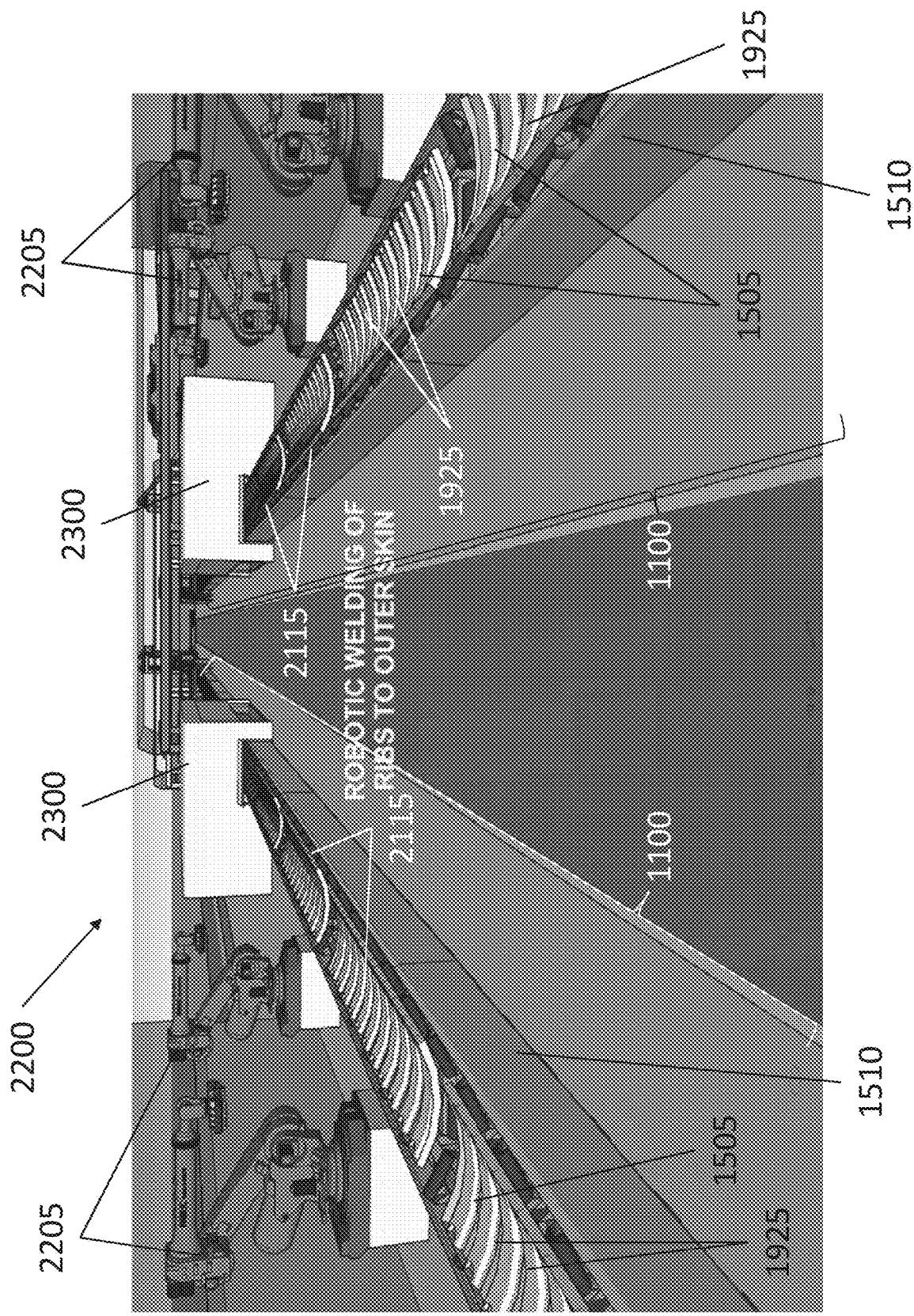
FIG. 22 shows an exemplary depiction of a robotic welding of ribs to outer skin of the circumferential rib assembly to outer skin manufacturing process in accordance with aspects of the disclosure.

FIG. 22 shows an exemplary depiction of a robotic welding process/station 2200, in which the ribs 1925 are welded to outer skins 1505 as the outer skins 1505 are processed in the side-by-side tube segment manufacturing lines 1100 in accordance with aspects of the disclosure. As shown in the exemplary depiction of FIG. 22, the robotic welding process/station 2200 may include four robotic welders 2205, with two of each dedicated to each of the tube segment manufacturing lines 1100. The robotic welding process/station 2200 is operable to receive the outer skin 1505 having the ribs 1925 arranged thereon (e.g., in the predetermined relative spacing), which is moved on the conveyor 1510 into position for welding. The robotic welding process/station 2200 is further operable to control the robotic welders 2205 to move into proper position and to perform the welds connecting the outer skin 1505 and the ribs 1925. As shown in FIG. 22, after the welding is performed, the outer skin 1505 and the ribs 1925 together form the layered panel 2115, which continues down the conveyor 1510.

Figure 23:
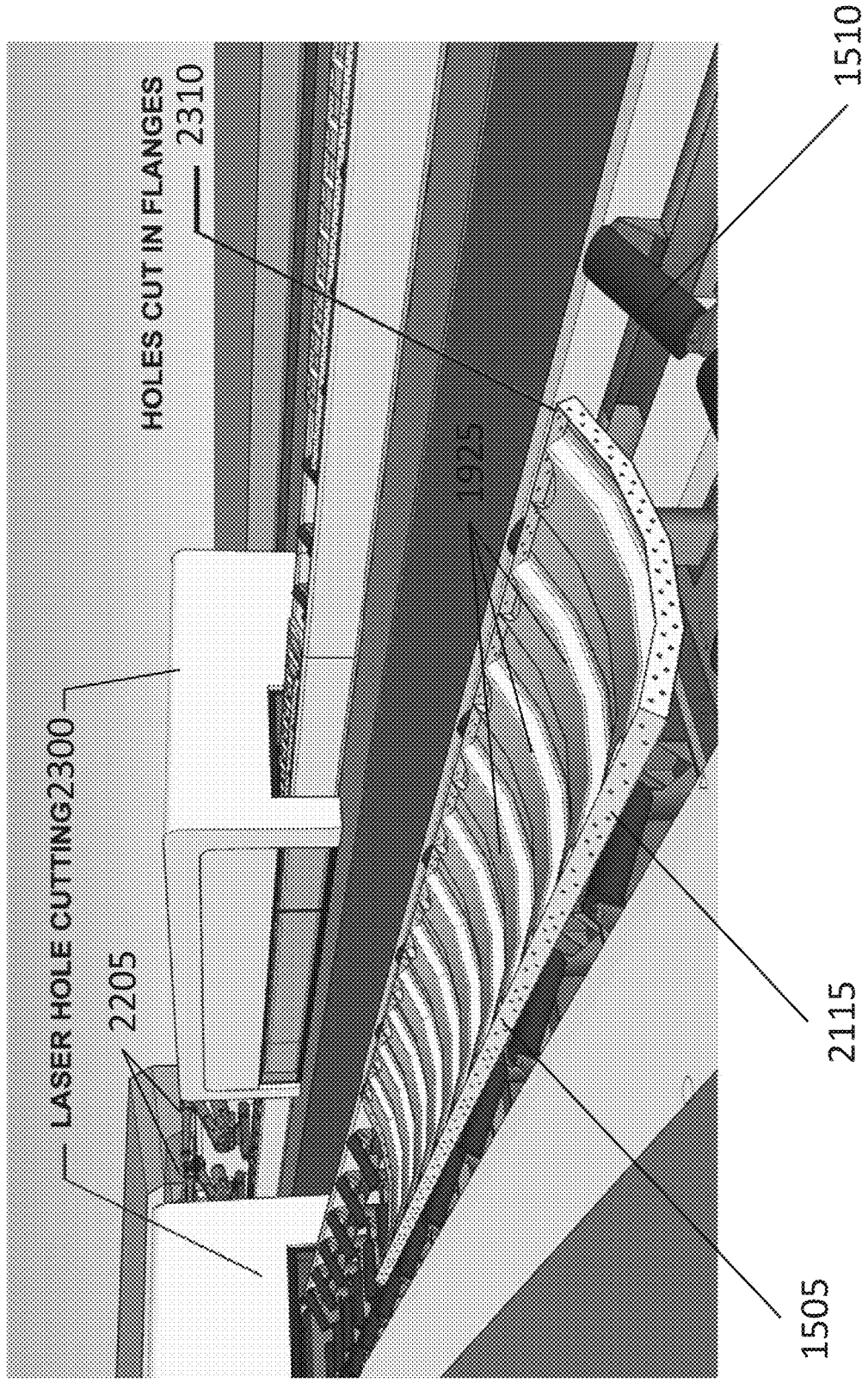
FIG. 23 shows an exemplary depiction of a laser hole cutting manufacturing process of the tube segment manufacturing line in accordance with aspects of the disclosure.

FIG. 23 shows an exemplary depiction of a laser hole cutting manufacturing process/station 2300 of the tube segment manufacturing line 1100 in accordance with aspects of the disclosure. Some embodiments of the present disclosure contemplate providing the layered panel 2115 with holes 2310 for connecting the layered panel 2115 to adjacent panels (e.g., layered panels 2115 in a same tube segment and layered panel 2115 upstream and downstream). Other contemplated embodiments, due to, for example, potential difficulties maintaining a low-pressure environment that may be encountered with providing the layered panel 2115 with holes 2310 (or too many holes) or logistics of fastening a large number of fastener connections, may not utilize a laser hole cutting manufacturing process/station 2300 (or may use a laser hole cutting manufacturing process/station 2300 to provide fewer holes 2310 than depicted in the exemplary embodiment of FIG. 23.

In accordance with aspects of the disclosure, in some contemplated embodiments, the laser hole cutting manufacturing station 2300 includes laser configured and positioned to provide the layered panel 2115 with holes 2310 in the flange portions of the layered panel 2115. In embodiments, the holes 2310 for connecting the layered panel 2115 to adjacent panels may be used to receive bolts for securely connecting adjacent panels 2115. In other contemplated embodiments, the holes 2310 for connecting the layered panel 2115 to adjacent panels may be used to receive bolts for connecting adjacent panels 2115 for positioning, after which the adjacent panels 2115 are welded together to securely connect the adjacent panels 2115. As noted above, with other contemplated embodiments, the adjacent tube segments may be connected by laser welds, such that holes in the layered panel 2115 for accommodating connection bolts may not be necessary.

Figure 24:
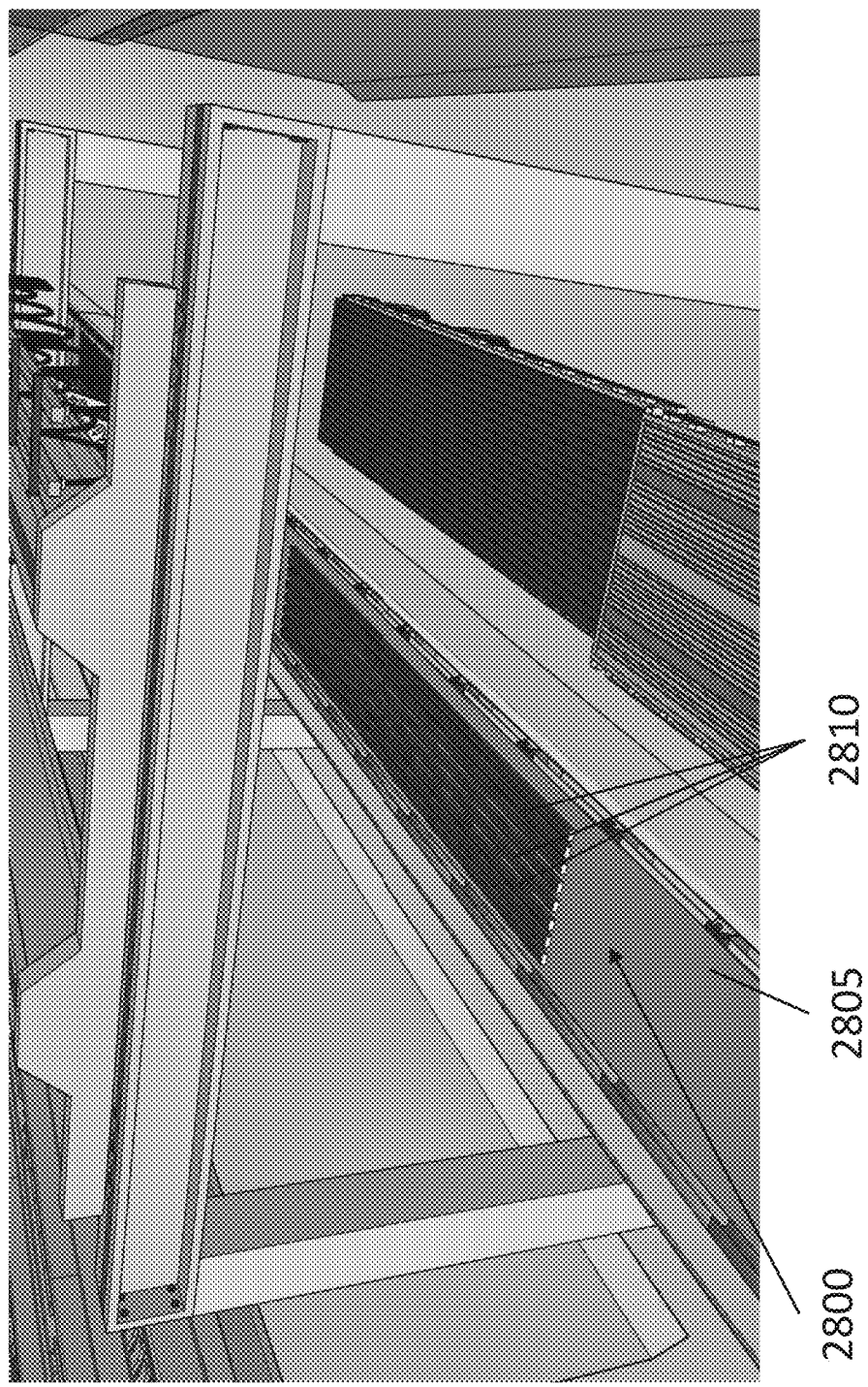
FIG. 24 shows an exemplary depiction of a levitation track assembly line of the segmented tube manufacturing facility in accordance with aspects of the disclosure.

FIG. 24 shows an exemplary depiction of a levitation track assembly line 2800 of the segmented tube manufacturing facility 800 in accordance with aspects of the disclosure. As shown in FIG. 24, the levitation track assembly line 2800 includes a conveyor 2805 operable to move a plurality of levitation track tracks 2810.

Figure 25:
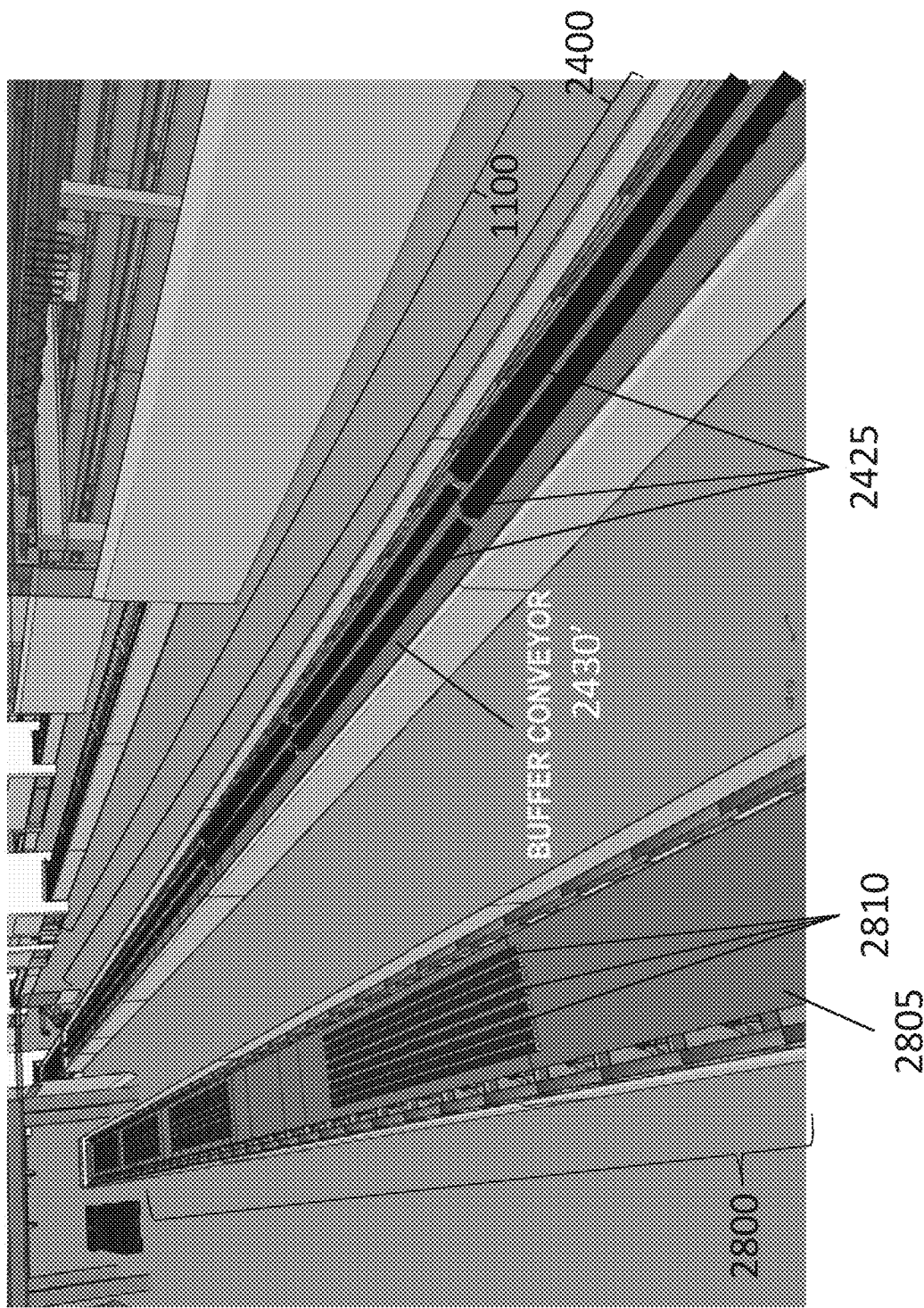
FIG. 25 shows an exemplary depiction of a buffer conveyor of the segmented tube manufacturing facility in accordance with aspects of the disclosure.
Figure 26:
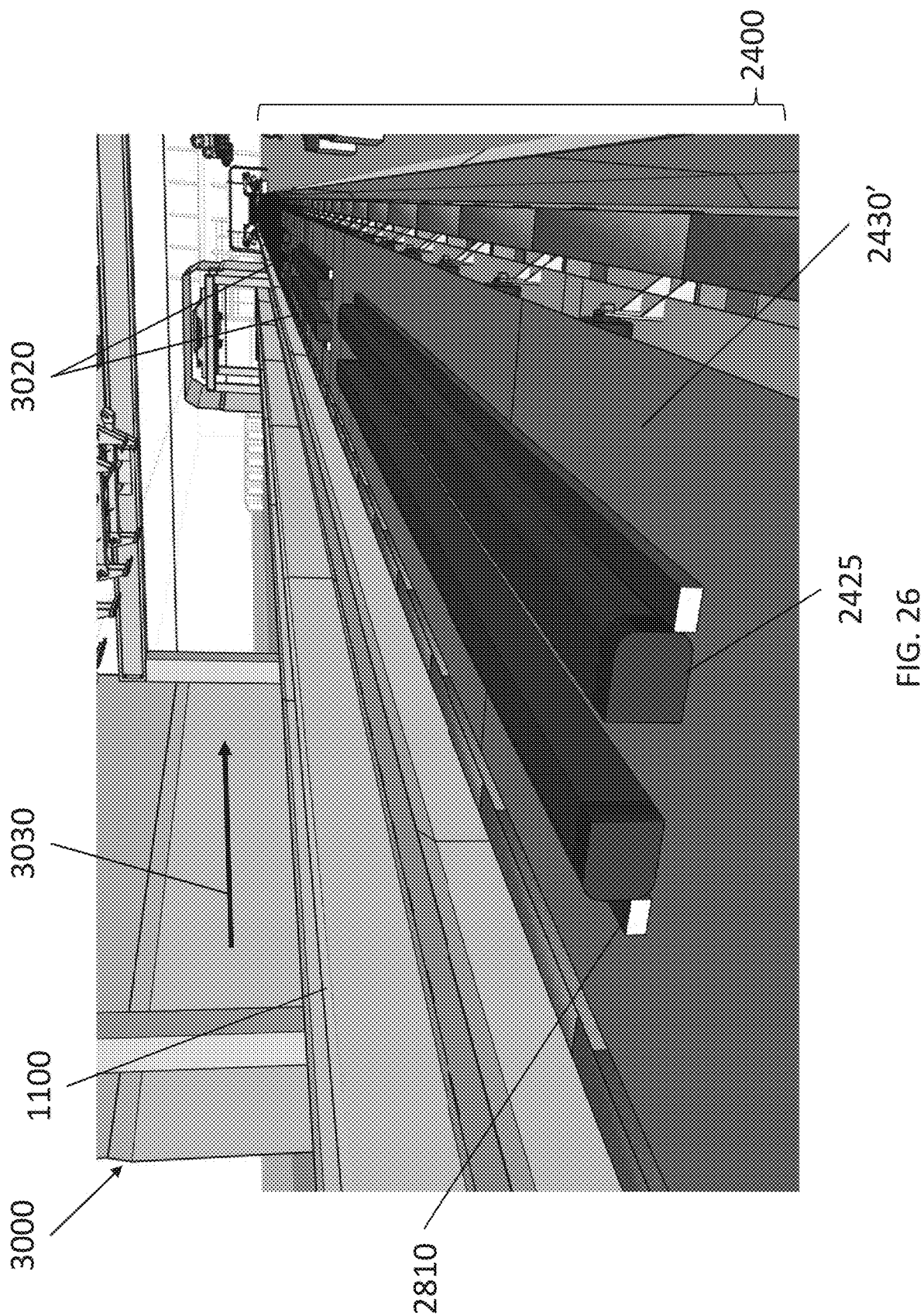
FIG. 26 shows an exemplary depiction of a levitation and propulsion track chassis welding manufacturing process in accordance with aspects of the disclosure.

As further shown in FIG. 25, the conveyor 2805 transports a plurality of levitation track tracks 2810 downstream, for example, in a predetermined arrangement (e.g., of 8 tracks 2810). The levitation track tracks 2810 are then removed from the conveyor 2805 and arranged (e.g., using robots and/or manually) on the conveyor 2430' adjacent a propulsion track assembly propulsion track 2425 (for example, as shown in FIG. 26). As shown in FIG. 25, in embodiments, the propulsion track fabrication line 2400 may be arranged adjacent to a tube segment manufacturing line 1100.

FIG. 26 shows an exemplary depiction of a levitation track-to-propulsion track welding manufacturing process 3000 in accordance with aspects of the disclosure. As shown in FIG. 26, after the levitation track tracks 2810 are removed from the conveyor 2805 and arranged on the conveyor 2430' adjacent a plurality of propulsion track propulsion track assemblies 2425, the conveyor 2430' transports a plurality of levitation track 2810 in a downstream direction 3030 with the welded propulsion track assembly propulsion track 2425 arranged adjacent the levitation tracks 2810 in a welding arrangement (e.g., with this exemplary embodiment in which the welded propulsion track assemblies 2425 are placed on their side and opening inwardly with respect to the approximate propulsion track profile and the levitation track tracks 2810 are placed outwardly of the welded propulsion track assemblies 2425). As shown in FIG. 26, a plurality of robotic welders (not shown) are arranged adjacent the conveyor 2430' and are operable to weld the levitation track tracks 2810 to the plurality of propulsion track assemblies 2425 to form levitation track/propulsion tracks 3020. The conveyor 2430' then transports the track/propulsion tracks 3020 in a downstream direction 3030. As shown in FIG. 26, in embodiments, the propulsion track line 2400 may be arranged adjacent to a tube segment manufacturing line 1100.

Figure 27:
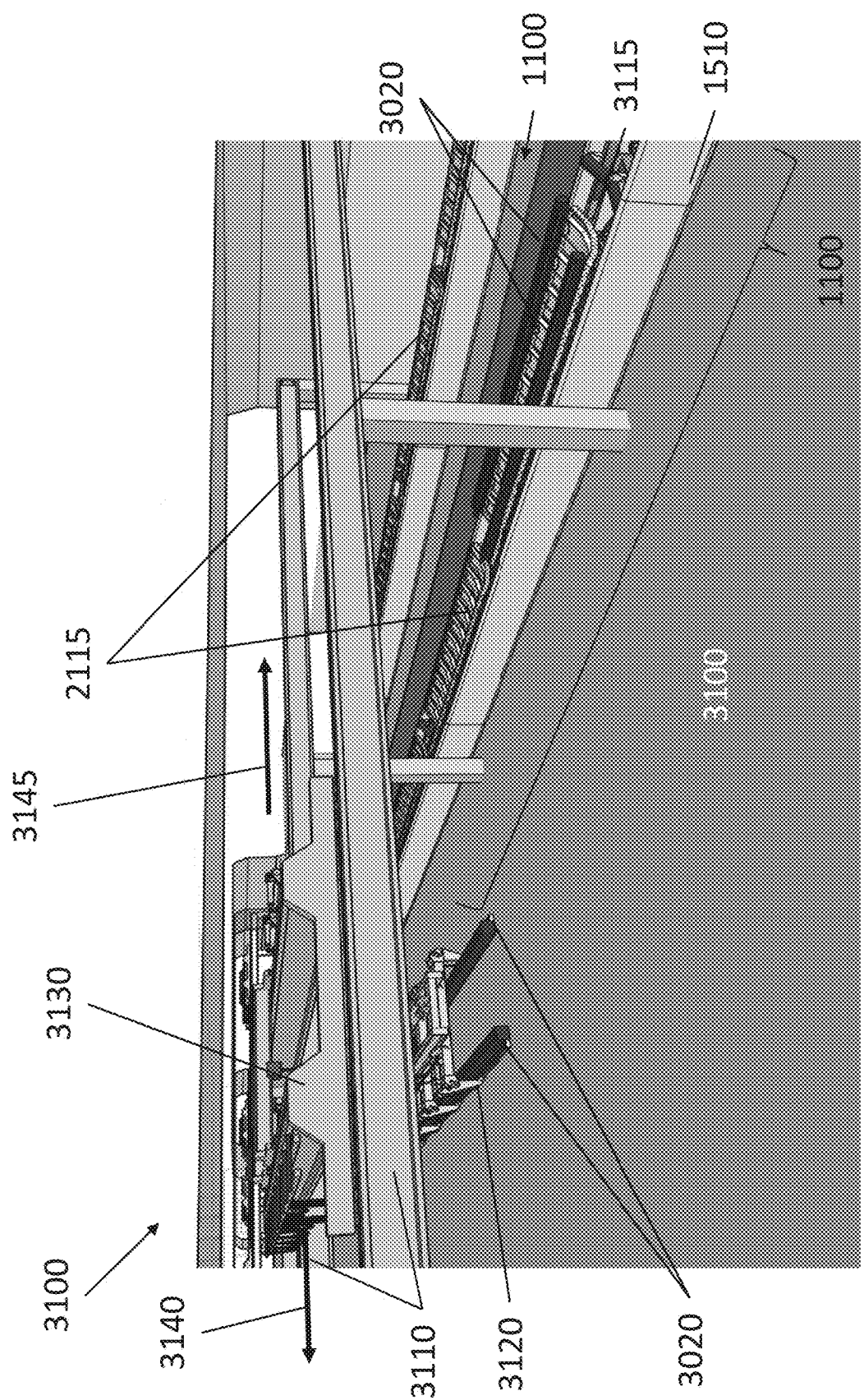
FIG. 27 shows an exemplary depiction of a levitation track/propulsion track to tube segment manufacturing process of the tube segment manufacturing line in accordance with aspects of the disclosure.

FIG. 27 shows an exemplary depiction of a levitation track/propulsion track-to-tube segment manufacturing station/process 3100 of the tube segment manufacturing line 1100 in accordance with aspects of the disclosure. As shown in FIG. 27, an overhead crane 3130 is moveable along tracks 3110 back-and-forth in directions 3140, 3145. The overhead crane 3130 is operable to carry and raise/lower one or more (e.g., a parallel arrangement of two) track/propulsion tracks 3020 from the propulsion track line 2400 to the tube segment manufacturing line 1100. For example, in embodiments, the overhead crane 3130 may be configured to carry a number of track/propulsion tracks 3020 necessary for a single layered panel 2115. Additionally, the overhead crane 3130 may be operable to move the track/propulsion tracks 3020 while maintaining an orientation and spacing of the track/propulsion tracks 3020 relative to one another. In embodiments, the overhead crane 3130 may secure the one or more track/propulsion tracks 3020 for transport to the tube segment manufacturing line 1100 using a track holder 3120 comprising magnets, actuating grips, and/or vacuums, for example.

As shown in FIG. 27 (and FIG. 26), with the levitation track/propulsion track-to-tube segment manufacturing station/process 3100, the overhead crane 3120 is operable to position itself over the propulsion track line 2400, and lower a track securing mechanism or track holder 3120 (e.g., that utilizes, magnets, actuating grips, and/or vacuums, for example) over one or more track/propulsion tracks 3020 arranged (e.g., in a predetermined relative spacing) on the propulsion track line 2400. The overhead crane 3130 is further operable to secure one or more track/propulsion tracks 3020 arranged (e.g., in a predetermined relative spacing) on the propulsion track line 2400 and raise the one or more track/propulsion tracks 3020 vertically off the propulsion track line 2400. The overhead crane 3130 is further operable to move the one or more track/propulsion tracks 3020 in direction 3145 so as to position the one or more track/propulsion tracks 3020 over the tube segment manufacturing line 1100. The overhead crane 3130 is further operable to lower the one or more track/propulsion tracks 3020 vertically onto an layered panel 2115 arranged on the tube segment manufacturing line 1100. The overhead crane 3130 is further operable to release the track holders 3120 so as to release the one or more track/propulsion tracks 3020 arranged (e.g., in the predetermined relative spacing) on the layered panel 2115. The overhead crane 3130 is further operable to raise the track holders 3120 and position itself over the propulsion track line 2400 to begin the next cycle of the levitation track/propulsion track-to-tube segment manufacturing process 3100.

As should be understood (see, e.g., FIGS. 8 and 9), the same overhead crane 3130 has a movement range in directions 3140, 3145 so as to be operable for both of the tube segment manufacturing lines 1100 and the propulsion track line 2400. Additionally, as shown in FIG. 27 the overhead crane 3130 may have two track/propulsion track securing mechanisms 3120 and may be operable to carry a plurality of track/propulsion tracks 3020 for example in aside-by-side arrangement on a left side and a right side of the overhead crane 3130.

Once the track/propulsion tracks 3020 are arranged (e.g., in the predetermined relative spacing) on the layered panel 2115, the track/propulsion tracks 3020 may be attached to the layered panel 2115, for example, using robotic welders (not shown) to form a track layered panel 3115. As with this exemplary and non-liming embodiment, six layered panels 2115 may form a group to be assembled together to form a segmental tube section, and as track/propulsion tracks 3020 may only be necessary for one (or two, for example) of the six layered panels 2115 of the group, the levitation track/propulsion track-to-tube segment manufacturing station/process 3100 may be configured to attach track/propulsion tracks 3020 to form a track layered panel 3115 for every sixth layered panel 2115 proceeding on the conveyor 1510.

Figure 28:
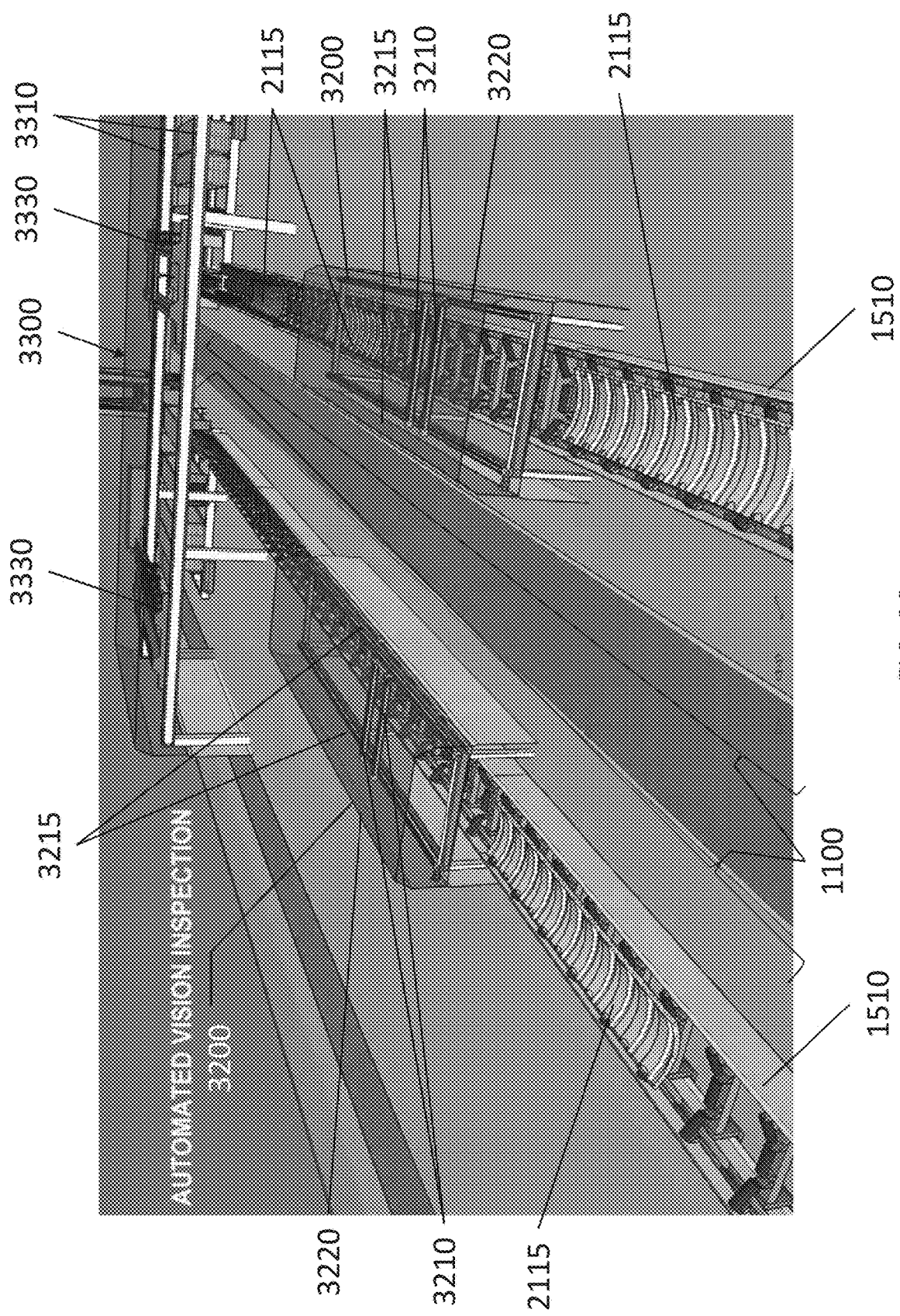
FIG. 28 shows an exemplary depiction of an automated vision inspection process of the tube segment manufacturing line in accordance with aspects of the disclosure.

FIG. 28 shows an exemplary depiction of an automated vision inspection process/station 3200 of the tube segment manufacturing line 1100 in accordance with aspects of the disclosure. In accordance with aspects of the disclosure, the tube segments (e.g., the layered panels 2115 and track layered panels 3115) may be inspected just prior to containerization for subsequent delivery, for example, to ensure conformance with specifications and quality control. As shown in FIG. 28, the depicted exemplary automated vision inspection station 3200 includes one or more sensors, cameras, and/or scanners 3210 moveable along tracks 3215 above one of the layered panels 2115 and track layered panels 3115 and operable to perform a vision inspection of the layered panels 2115 and track layered panels 3115. As shown in FIG. 28, the vision inspection station 3200 may include a hood 3220 to, for example, reduce outside interference during the inspection process.

Figure 29:
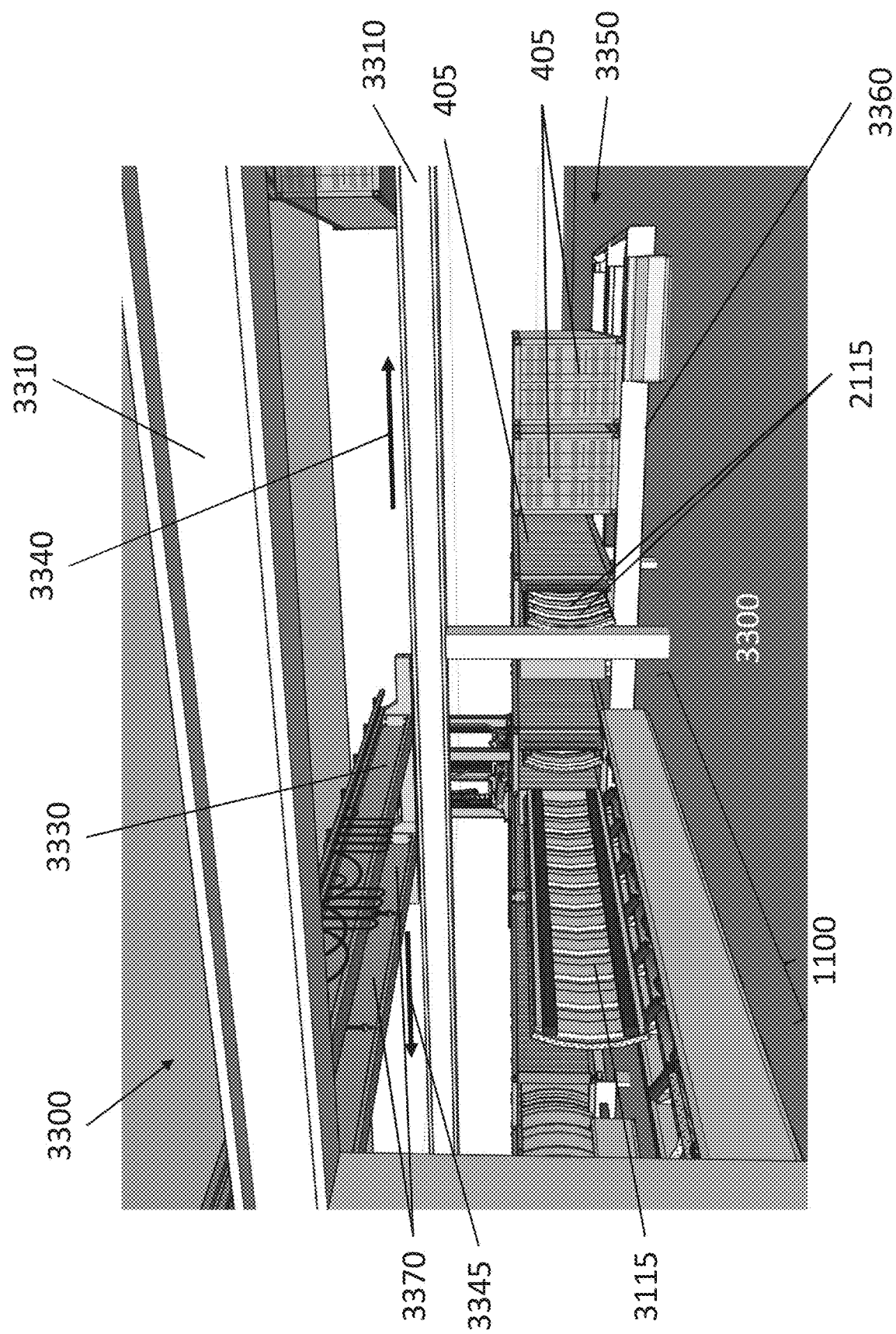
FIG. 29 shows an exemplary depiction of an automated containerization process of the tube segments in accordance with aspects of the disclosure.

FIG. 29 shows an exemplary depiction of an automated containerization process/station 3300 of the tube segments (e.g., the layered panels 2115 and track layered panels 3115) in accordance with aspects of the disclosure. As shown in FIG. 29, one or more overhead cranes 3330 are moveable along tracks 3310 back-and-forth in directions 3340, 3345. The overhead cranes 3330 are operable to carry and raise/lower one or more tube segments (e.g., the layered panels 2115 and track layered panels 3115) from the tube segment manufacturing lines 1100 into a container 405. For example, in embodiments, the cranes 3330 may raise one side of the tube segments (e.g., layered panels 2115 and track layered panels 3115) into a vertical orientation on the conveyor 1510 for insertion into a container 405, which is arranged (e.g., via tracks 3360) into alignment with the end of the manufacturing lines 1100. Additional containers 405 (e.g., ready to be loaded with tube segments) may be arranged in a container holding/queueing area 3350. In embodiments, the overhead crane 3130 may secure the one or more tube segments (e.g., the layered panels 2115 and track layered panels 3115) for transport from the tube segment manufacturing line 1100 to the container 405 using one or more tube segment holders 3370 (comprising for example, hooks, chains, magnets, actuating grips, and/or vacuums, for example). As shown in FIG. 29, in accordance with aspects of the disclosure, the layered panels 2115 and track layered panels 3115 are nested within adjacent panels for efficient containerization. In an exemplary embodiment, each container may be configured to accommodate five layered panels 2115 and one track layered panel 3115 in each container 405 (e.g., a standard shipping container).

Figure 30:
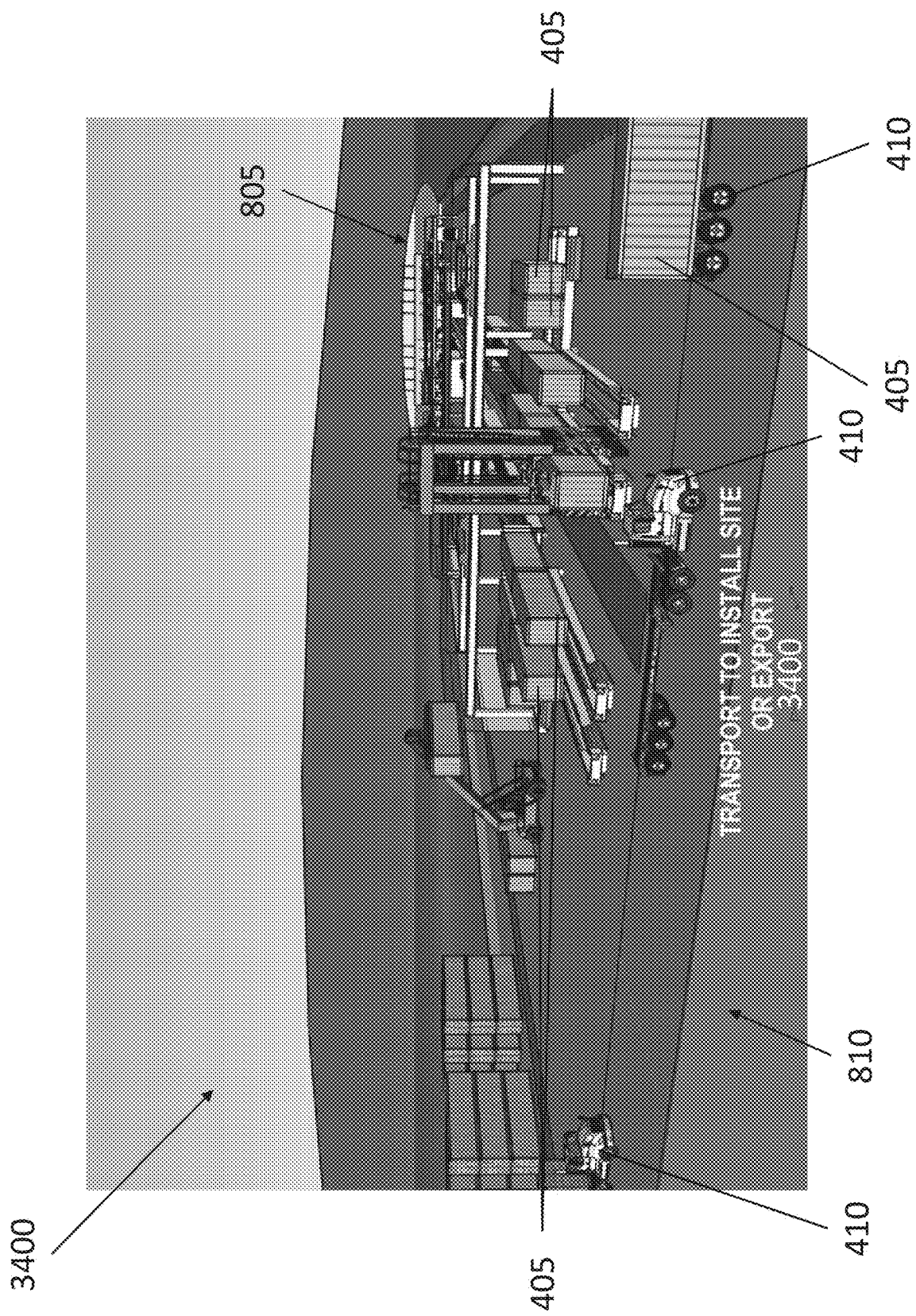
FIG. 30 shows an exemplary depiction of loading of the tube segments for transport to an install site in accordance with aspects of the disclosure.

FIG. 30 shows an exemplary depiction of a loading process station 3400 of the tube segments for transport to an install site in accordance with aspects of the disclosure. As shown in FIG. 30, trucks 410 may queue near the process ending side 810 of the facility 800 to receive containers 405 for transport to an install site.

Additional aspects of the disclosure are directed to an assembly system and method for connecting a plurality of tube segments in the direction of curvature such that a tube section (e.g., a cylindrical tube section or approximated cylindrical tube section) is formed. The tube segments may be welded or attached by any of known approaches. Additional elements, such as a track for a transportation system, may be attached to an internal face of a tube segment at a point during assembly, such as before tube segments have been attached to sufficiently close the tube section and/or during initial assembly of the plate (or tube) segments. Additionally, in some contemplated embodiments, concrete may be added to the filling. A plurality of tube sections may be connected in the direction of length to form a segmented tube, e.g., a first tube section and a second tube section may be connected at a first open end and a second open end such that the first tube section and the second tube section form a continuous tube.

Figure 31:
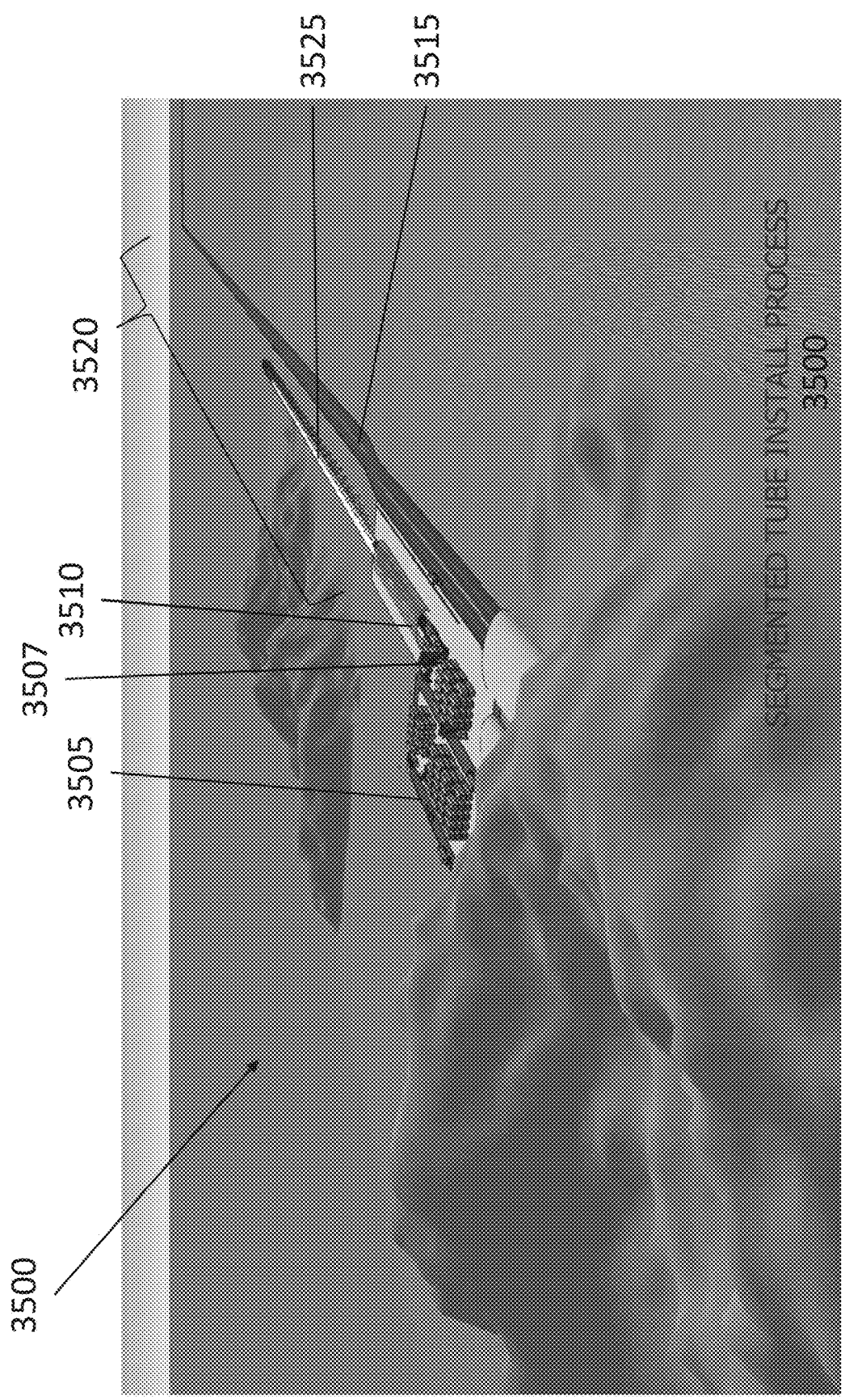
FIG. 31 shows an exemplary overview depiction of a segmented tube installation process at an install site in accordance with aspects of the disclosure.

FIG. 31 shows an exemplary overview depiction of a segmented tube installation process at an installation site 3500 in accordance with aspects of the disclosure. As shown in the exemplary depiction of FIG. 31, in embodiments the installation site 3500 may include a storage area 3505, a de-containerization area 3507, a pre-staging area 3510, a track assembly area 3520, along which a track is being assembled 3525. As shown in FIG. 31, the track assembly area 3520 may be arranged along a roadway 3515, which may be used to deliver construction materials, such as, tube segments (e.g., the layered panels 2115 and track layered panels 3115) to the installation site 3500.

Figure 32:
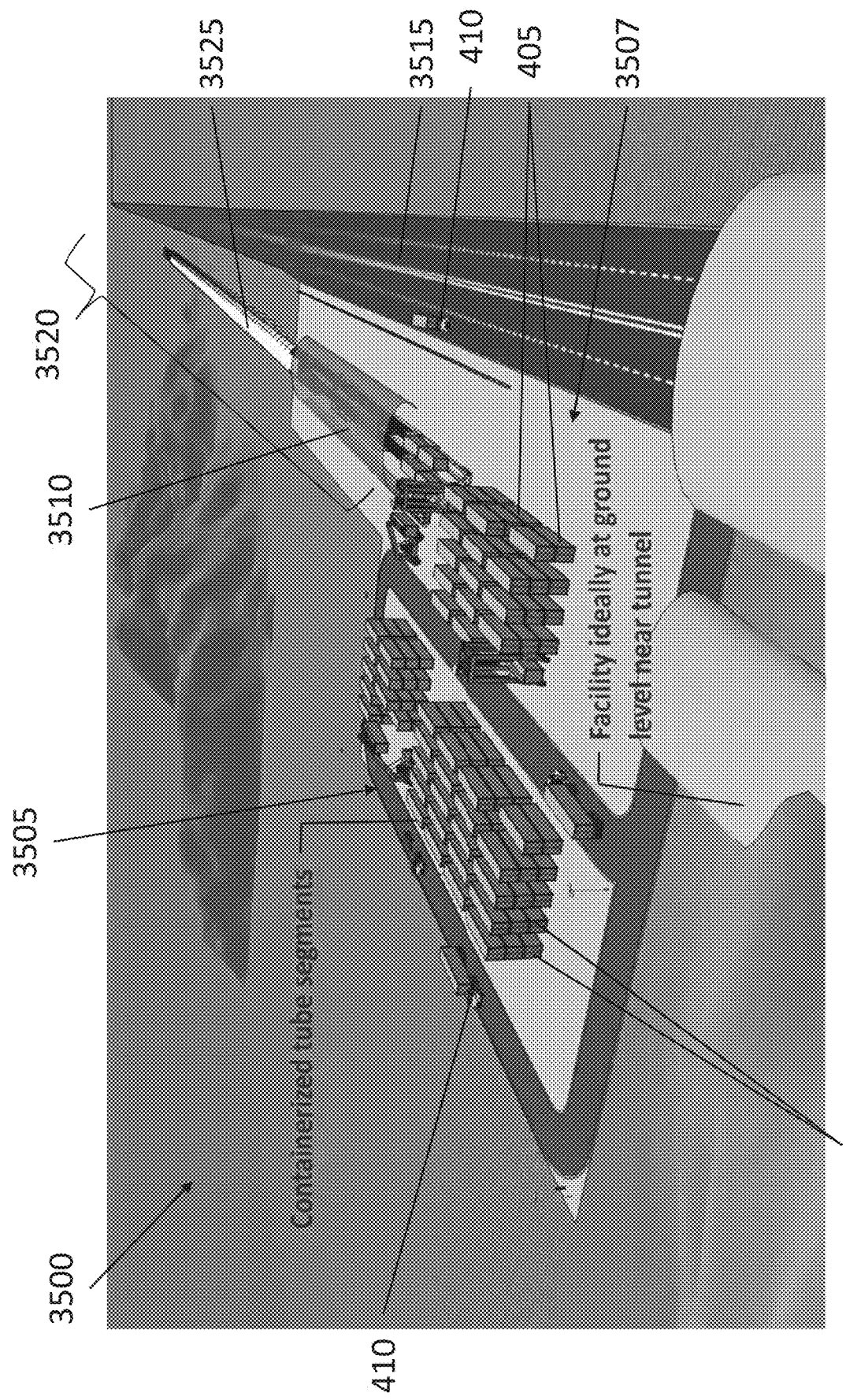
FIG. 32 shows an exemplary overview depiction of a segmented tube installation process from a first side at an install site in accordance with aspects of the disclosure.

FIG. 32 shows an exemplary overview depiction of a segmented (or segmental) tube installation process 3500 from a first side at an installation site in accordance with aspects of the disclosure. As shown in the exemplary depiction of FIG. 32, the installation site 3500 includes a storage area 3505 for containers 405 holding containerized tube segments. As shown in the exemplary depiction of FIG. 32, the installation site 3500 includes a de-containerization area 3507 for removing the tube segments from the containers 405. As shown in the exemplary depiction of FIG. 32, roadways are arranged around the storage area 3505 and the de-containerization area 3507 to provide access for trucks 410 (e.g., carrying containers 405). As shown in the exemplary depiction of FIG. 32, the installation site 3500 includes a pre-staging area 3510 for pre-staging the tube segments removed from the containers 405.

As shown in FIG. 32, the installation site 3500 also includes a track assembly area 3520, along which a track is being assembled 3525. As shown in FIG. 32, the track assembly area 3520 may be arranged along a roadway 3515, which may be used to deliver construction materials, such as, tube segments (e.g., the layered panels 2115 and track layered panels 3115) to the installation site 3500. In an exemplary embodiment, the installation site 3500 may be located at ground level near a transportation tunnel 3540 (e.g., of a high-speed, low-pressure tube transportation system).

Figure 33:
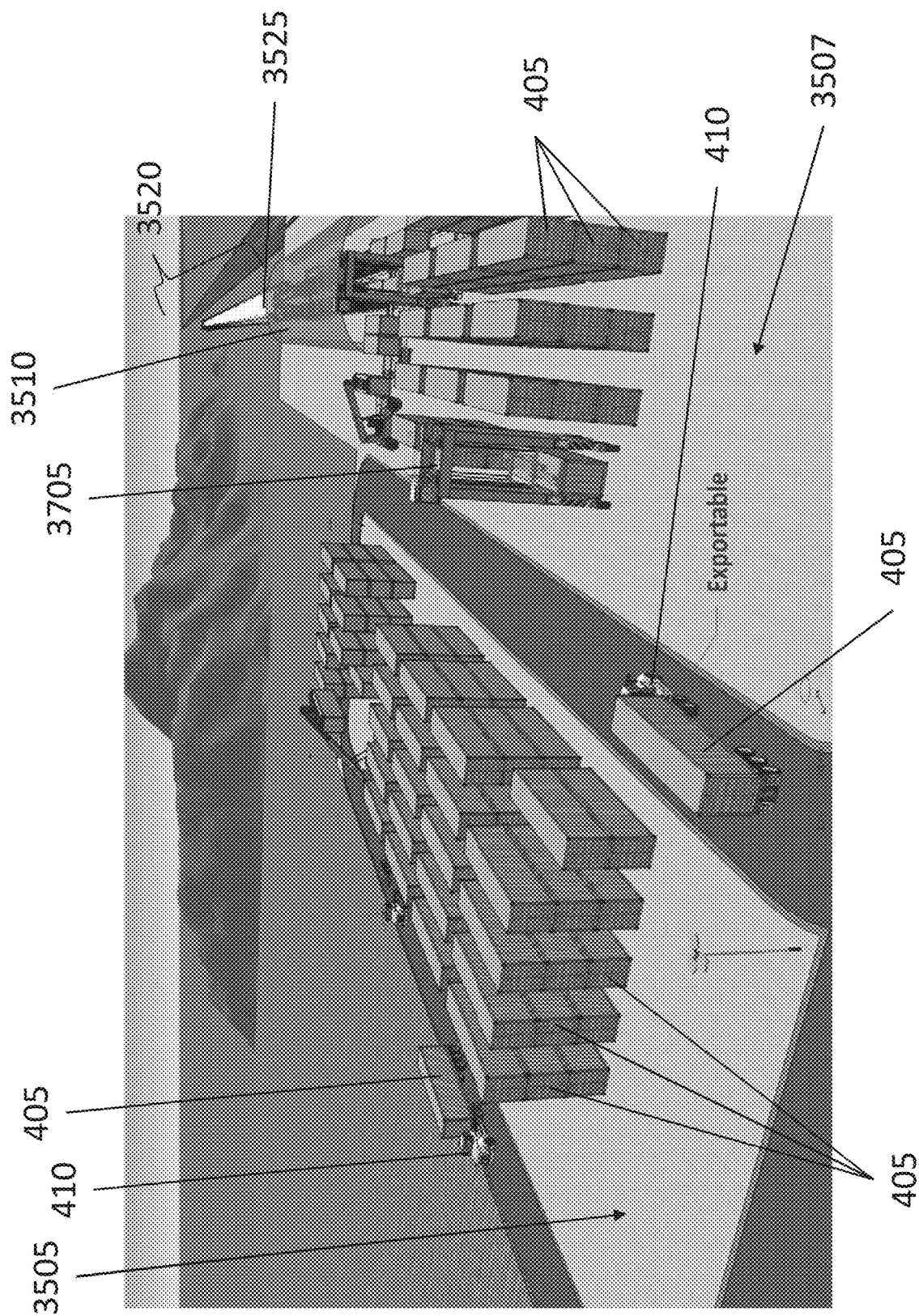
FIG. 33 shows an exemplary depiction of a tube segment container storage area and vehicle unloading process at an install site in accordance with aspects of the disclosure.

FIG. 33 shows an exemplary depiction of a tube segment container storage area 3505 and vehicle unloading process at an install site 3500 in accordance with aspects of the disclosure. As shown in the exemplary depiction of FIG. 33, the installation site 3500 includes a storage area 3505 for containers 405 holding containerized tube segments. As shown in FIG. 33, the installation site 3500 includes a de-containerization area 3507 for removing the tube segments from the containers 405 adjacent the storage area 3505. Container handling vehicles 3705 (e.g., lifts, mobile cranes, etc.) may be utilized to move containers 405 from the vehicles 410 and/or the container storage area 3505. As shown in FIG. 33, roadways are arranged around the storage area 3505 and the de-containerization area 3507 to provide access for trucks 410 (e.g., carrying containers 405) that may be inbound (e.g., containing tube segments (e.g., the layered panels 2115 and track layered panels 3115). As shown in the exemplary depiction of FIG. 33, the installation site 3500 includes a pre-staging area 3510 for pre-staging the tube segments removed from the containers 405. As shown in FIG. 33, the installation site 3500 also includes a track assembly area 3520, along which a track is being assembled 3525.

Figure 34:
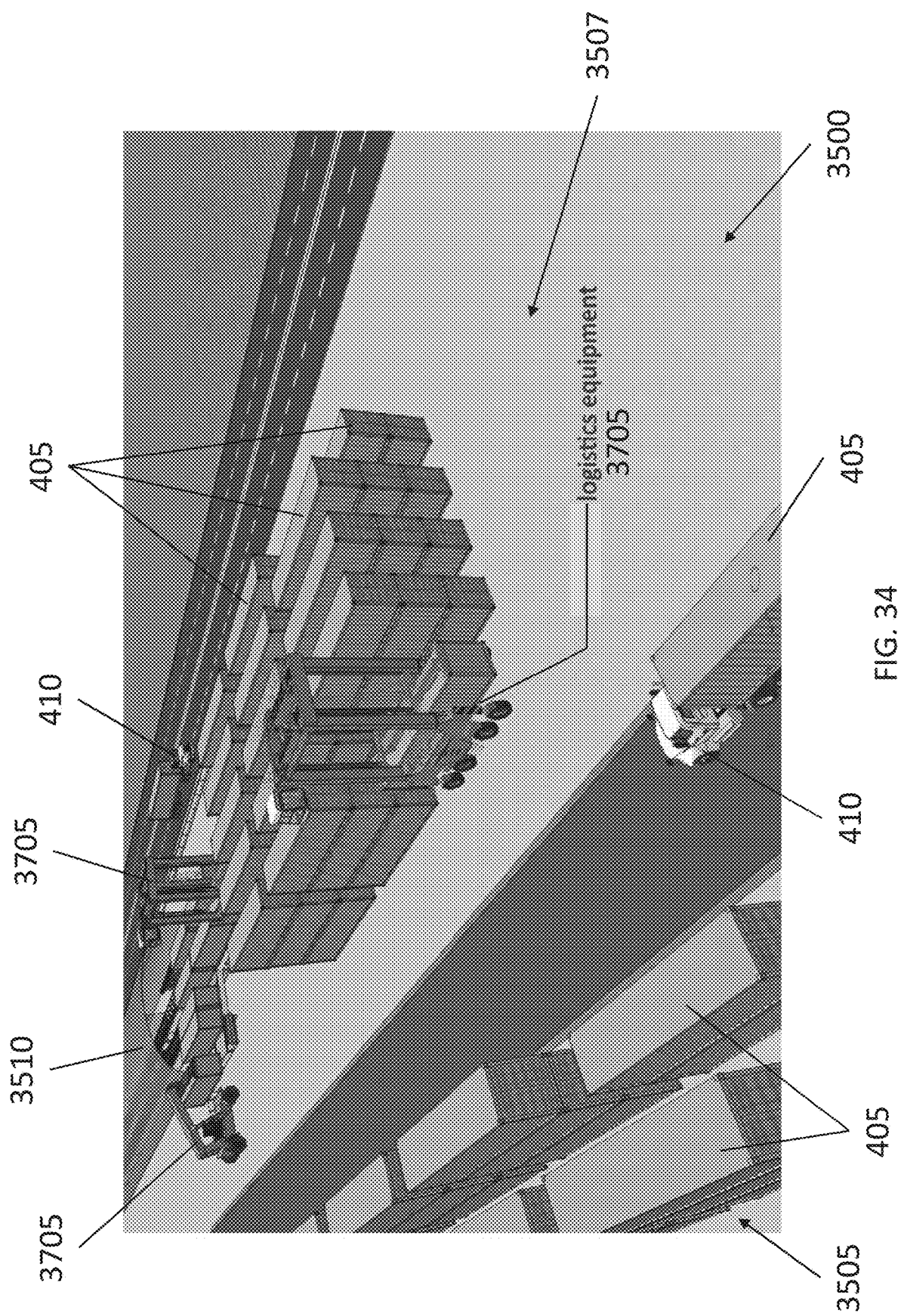
FIG. 34 shows another exemplary depiction of a tube segment container storage area and vehicle unloading process at an install site in accordance with aspects of the disclosure.

FIG. 34 shows another exemplary depiction of a tube segment container storage area and vehicle unloading process at an install site in accordance with aspects of the disclosure. As shown in the exemplary depiction of FIG. 34, the installation site 3500 includes the de-containerization area 3507 for removing the tube segments from the containers 405 adjacent the storage area 3505. Container handling vehicles 3705 (e.g., lifts, mobile cranes, other logistics equipment, etc.) may be utilized to move containers 405 from the vehicles 410 and/or within the de-containerization area 3507. As shown in FIG. 34, roadways are arranged around the de-containerization area 3507 to provide access for trucks 410 (e.g., carrying containers 405) that may be inbound (e.g., containing tube segments (e.g., the layered panels 2115 and track layered panels 3115)) or outbound (e.g., empty). As shown in FIG. 34, the installation site 3500 includes the pre-staging area 3510 for pre-staging the tube segments removed from the containers 405.

Figure 35:
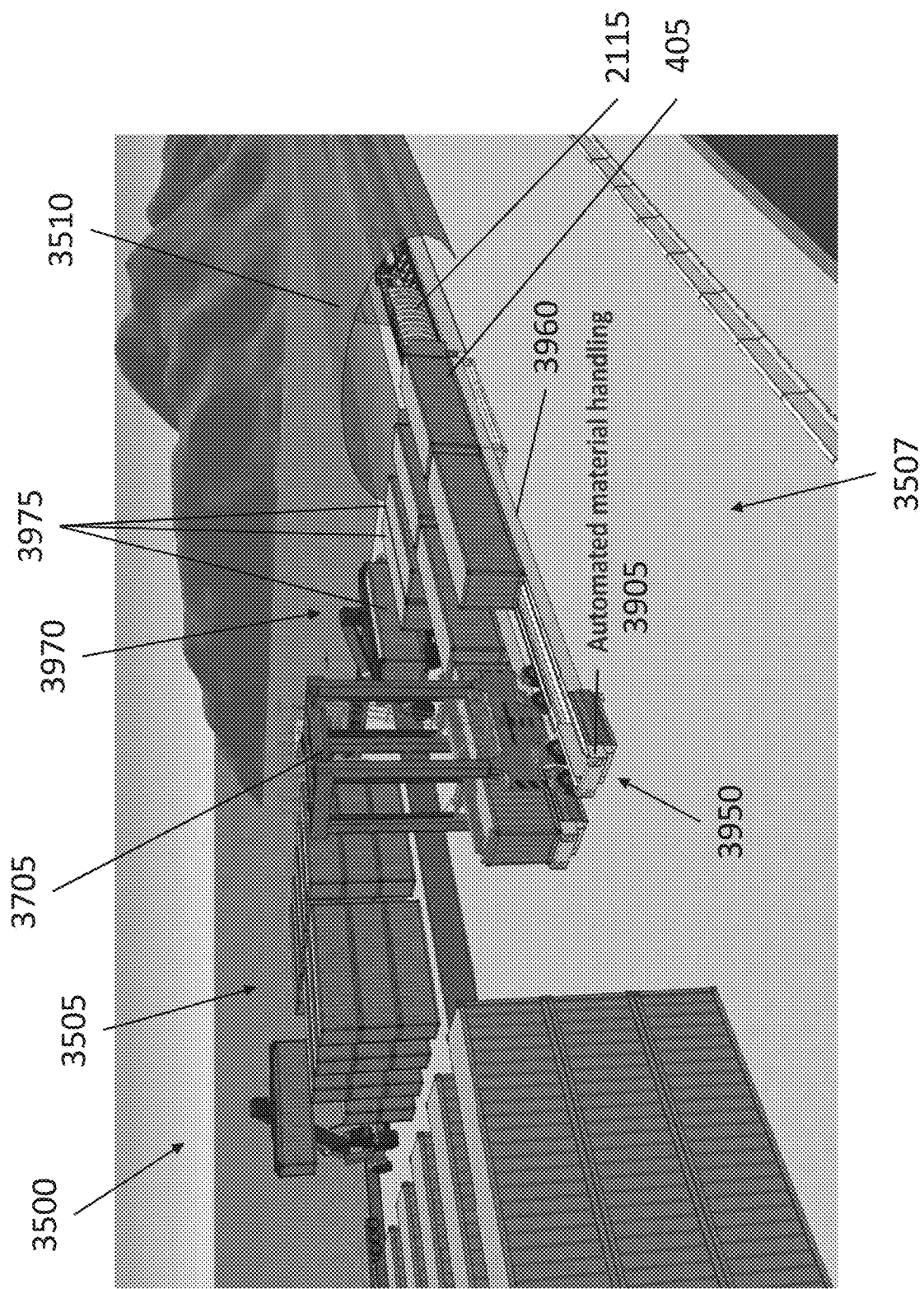
FIG. 35 shows another exemplary depiction of a tube segment container storage area and vehicle unloading process at an install site in accordance with aspects of the disclosure.

FIG. 35 shows another exemplary depiction of a tube segment container storage area and vehicle unloading process at an install site in accordance with aspects of the disclosure. As shown in the exemplary depiction of FIG. 35, the installation site 3500 includes the de-containerization area 3507 for removing the tube segments from the containers 405 adjacent the storage area 3505. Container handling vehicles 3705 (e.g., lifts, mobile cranes, other logistics equipment, etc.) may be utilized to move containers 405 from the vehicles 410 and/or within the de-containerization area 3507. As shown in FIG. 35, the installation site 3500 includes the pre-staging area 3510 for pre-staging the tube segments (e.g., the layered panels 2115) removed from the containers 405. As shown in FIG. 35, a container 405 may be arranged (e.g., via tracks 3960) into alignment with the starts of the assembly lines (e.g., side-by-side assembly lines). Additional containers 405 (e.g., ready to de-containerized or be unloaded of tube segments) may be arranged in a container holding/queueing area 3950 having automated material/container handlers 3905. Empty containers 3975 can be moved to a removal queueing area 3970 for subsequent loading on vehicles for transport.

Figure 36:
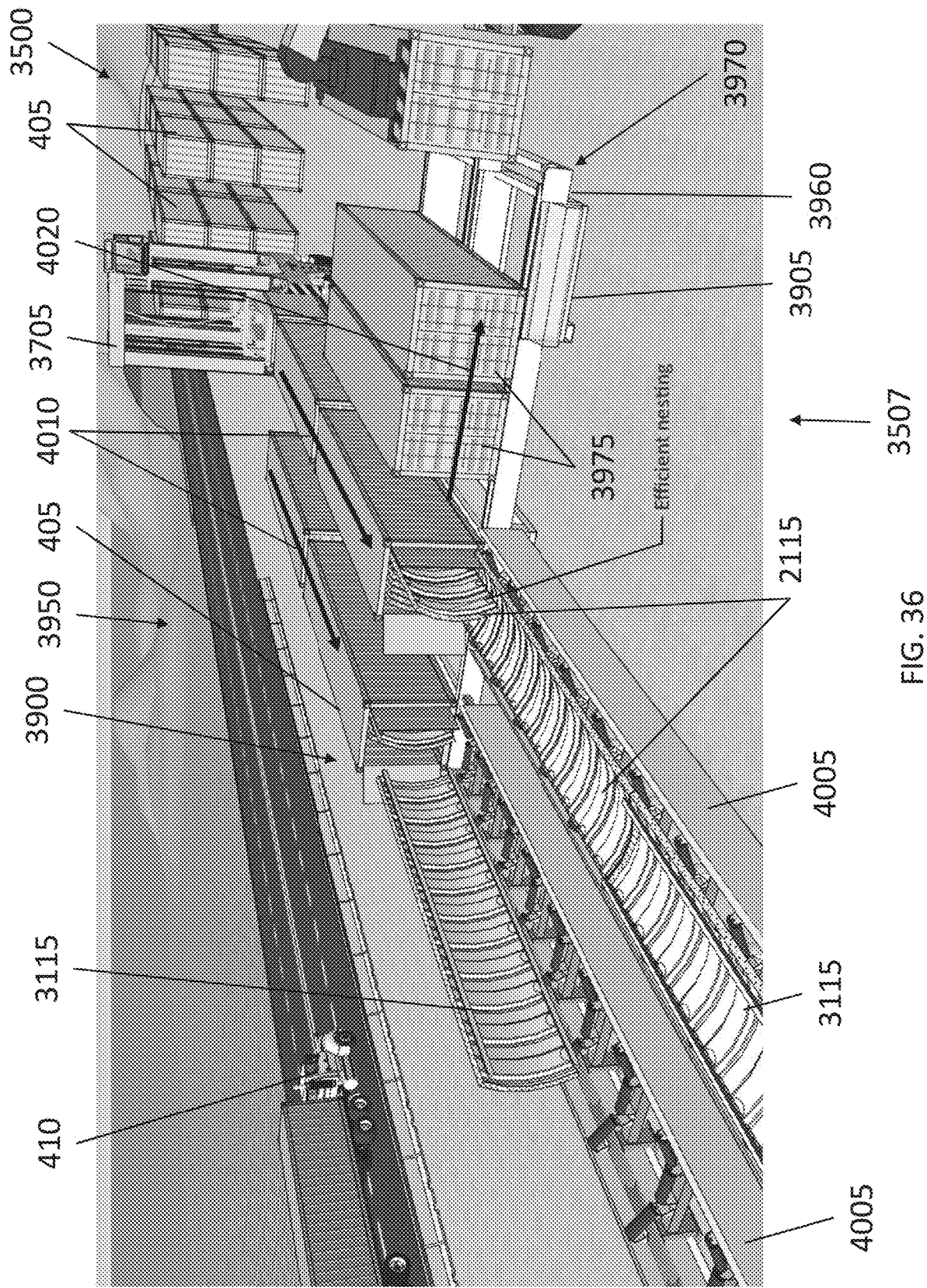
FIG. 36 shows an exemplary depiction of a tube segment unloading process at an install site in accordance with aspects of the disclosure.

FIG. 36 shows an exemplary depiction of a tube segment unloading process 390 at an installation/assembly site 3500 in accordance with aspects of the disclosure. As shown in FIG. 36, the installation site 3500 includes the de-containerization area 3507 for removing the tube segments (e.g., the layered panels 2115) from the containers 405. Container handling vehicles 3705 (e.g., lifts, mobile cranes, other logistics equipment, etc.) may be utilized to move containers from the vehicles 410 and/or within the de-containerization area 3507. As shown in FIG. 36, the installation site 3500 includes the pre-staging area 3510 for pre-staging the tube segments (e.g., the layered panels 2115 and track layered panels 3115) removed from the containers 405. As shown in FIG. 36, a container 405 may be arranged (e.g., via tracks 3960) into alignment with the starts of the assembly lines 4005 (e.g., side-by-side assembly lines). Additional containers 405 (e.g., ready to de-containerized or be unloaded of tube segments) may be arranged in a container holding/ queueing area 3950 having automated material/container handlers 3905, for example, moving the container in direction 4010. Empty containers 3975 can be moved in direction 4020 to a removal queueing area 3970 for subsequent loading on vehicles for transport.

Figure 37:
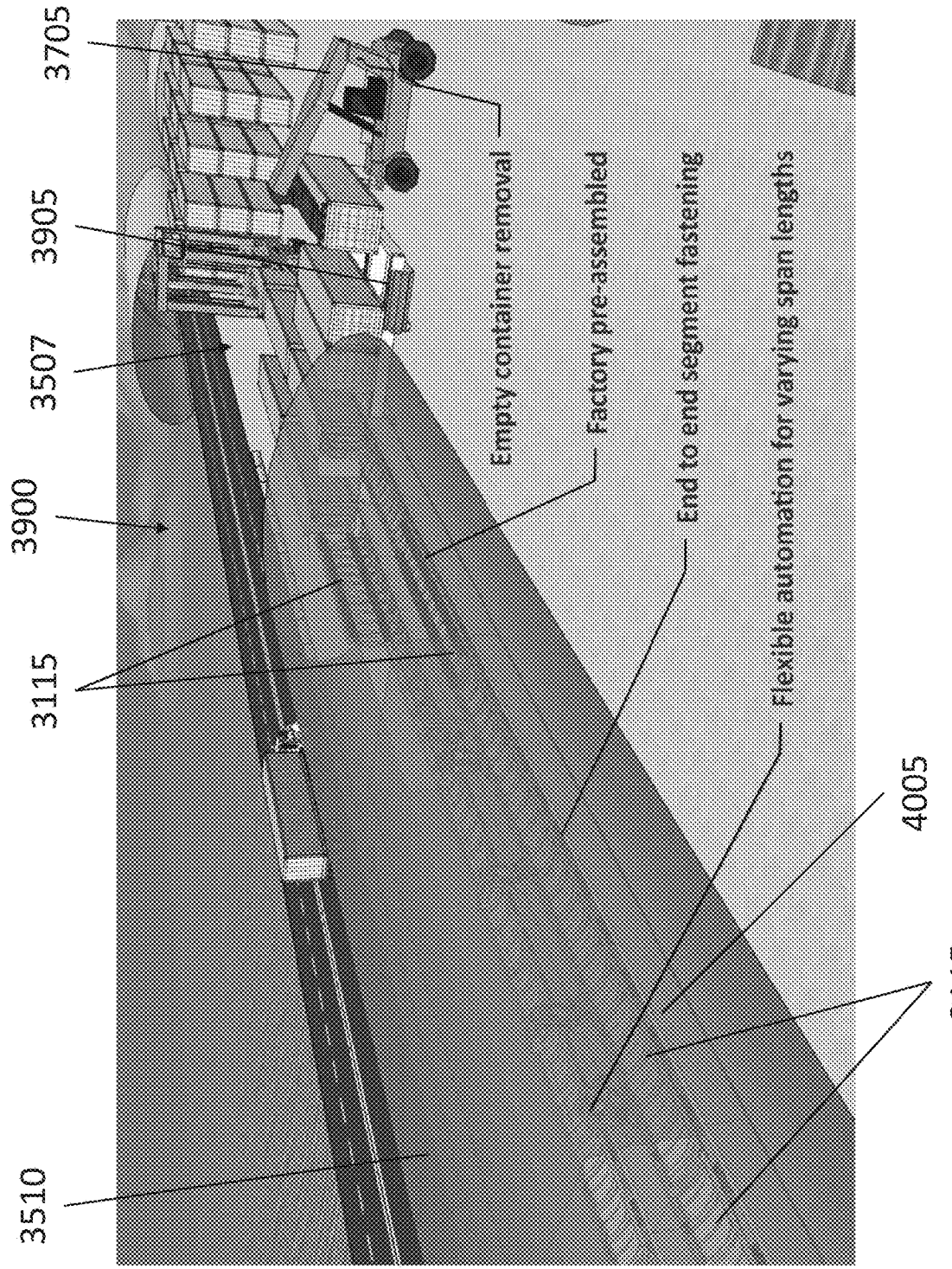
FIG. 37 shows another exemplary depiction of a tube segment unloading process at an install site in accordance with aspects of the disclosure.

FIG. 37 shows another exemplary depiction of the tube segment unloading process 3900 at an installation site 3500 in accordance with aspects of the disclosure. As shown in FIG. 37, the installation site 3500 includes the de-containerization area 3507 for removing the tube segments (e.g., the track layered panels 3115) from the containers 405. Container handling vehicles 3705 (e.g., lifts, mobile cranes, other logistics equipment, etc.) may be utilized to move containers 405 from the vehicles 410 and/or within the de-containerization area 3507. As shown in FIG. 37, the installation site 3500 includes the pre-staging area 3510 for pre-staging the tube segments (e.g., the layered panels 2115 and track layered panels 3115) removed from the containers 405. As shown in FIG. 37, once unloaded from their nested configuration in the containers 405, the tube segments (e.g., the layered panels 2115 and track layered panels 3115) are lowered from their containerization orientation and arranged on an assembly conveyor 4005. While on the assembly conveyor 4005, the pre-assembled tube segments (e.g., layered panels 2115 and track layered panels 3115 can be positioned for downstream handling. In accordance with aspects of the disclosure, the arrangement of the tube segments on the assembly conveyor 4005 allows for flexible automation, e.g., for varying span lengths, and may allow for end-to-end segment fastening, as necessary.

Figure 38:
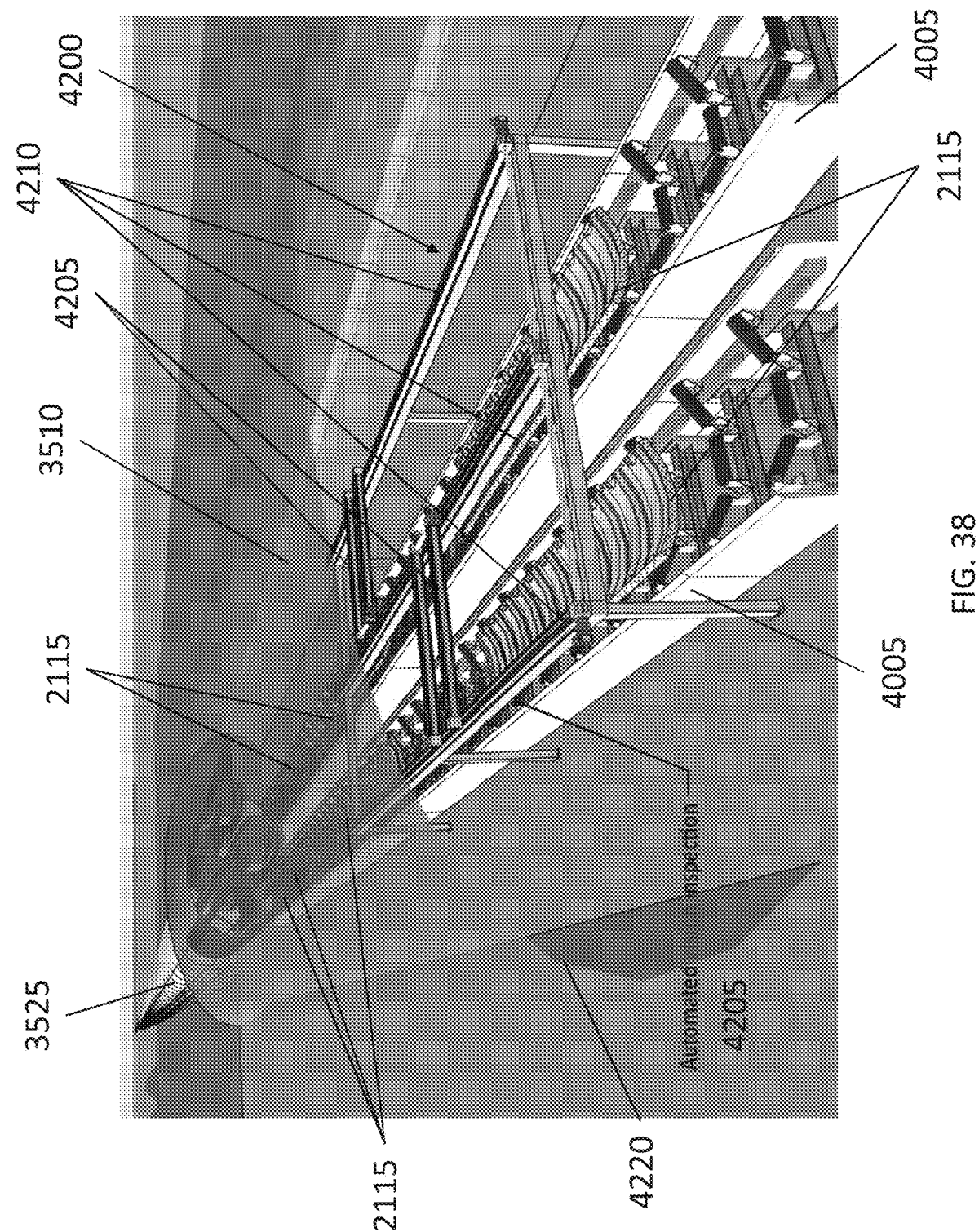
FIG. 38 shows an exemplary depiction of a tube segment automated vision inspection process at an install site in accordance with aspects of the disclosure.

FIG. 38 shows an exemplary depiction of a tube segment automated vision inspection process/station 4200 at an install site in accordance with aspects of the disclosure. In accordance with aspects of the disclosure, the tube segments (e.g., the layered panels 2115 and track layered panels 3115) may be inspected just prior to installation to, for example, ensure conformance with specifications. As shown in FIG. 38, the installation site 3500 includes the pre-staging area 3510 for pre-staging the tube segments (e.g., the layered panels 2115 and track layered panels 3115) removed from the containers 405. As shown in FIG. 38, once unloaded from their nested configuration in the containers 405, the tube segments (e.g., the layered panels 2115 and track layered panels 3115) are lowered from their containerization orientation and arranged on an assembly conveyor 4005. While on the assembly conveyor 4005, the pre-assembled tube segments (e.g., layered panels 2115 and track layered panels 3115) are passed through an inspection station 4200 arranged along and above the assembly conveyor 4005. In an exemplary embodiment, the assembly conveyor 4005 utilizes an automated vision inspection apparatus 4200.

As shown in FIG. 38, the depicted exemplary automated vision inspection apparatus 4200 may include one or more sensors, cameras, and/or scanners 4205 moveable along tracks 4210 above the layered panels 2115 and track layered panels 3115 and operable to perform a vision inspection of the layered panels 2115 and track layered panels 3115. As shown in FIG. 38, the vision inspection station 4200 may include a hood 4220 to, for example, reduce outside interference during the inspection process.

Figure 39:
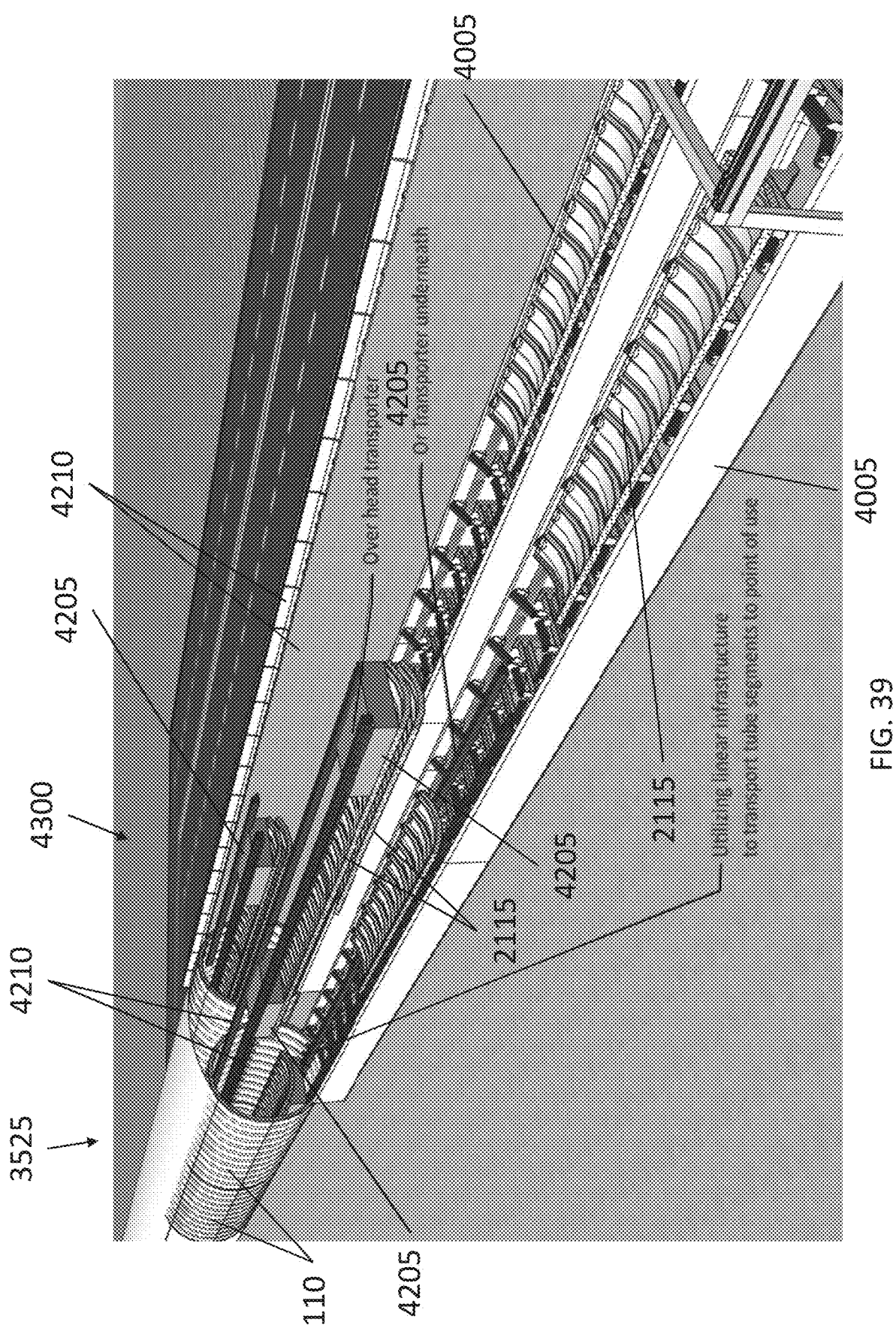
FIG. 39 shows an exemplary depiction of a tube segment queueing conveyor and tube segment transporter for transporting tube segments to point of use at an install site in accordance with aspects of the disclosure.

FIG. 39 shows an exemplary depiction of a tube segment queueing assembly conveyor 4005 and tube segment transporter system 4300 for transporting tube segments (e.g., layered panels 2115) to point of use at a track installation site in accordance with aspects of the disclosure. As shown in FIG. 39, once passed through an inspection station 4200, the tube segments (e.g., the layered panels 2115 and track layered panels 3115) are conveyed along the assembly conveyor 4005 to the tube segment transporter system 4300 for transporting the tube segments (e.g., layered panels 2115) to the point of use at a track installation site. As shown in FIG. 39, the tube segment transporter system 4300 include overhead levitation/propulsion tracks 4210 that are arranged along the track installation path 3525 from the current installation/assembly site 3500 to the current point of use at a track installation site downstream. The tube segment transporter system 4300 additionally includes carriers 4205 configured to travel on the overhead levitation/propulsion tracks 4210 and operable to carrier a plurality of tube segments (e.g., layered panels 2115). In embodiments, the carriers 4205 may secure the tube segments (e.g., the layered panels 2115 and track layered panels 3115) for transport to the track installation site with a segment holder comprising magnets, actuating grips, hooks, chains, and/or vacuums, for example.

As shown in FIG. 39, once the tube segments (e.g., two or more segments) are attached to the carriers 4205, the carriers 4205 are directed to travel down the overhead levitation/propulsion tracks 4210 to deliver the tube segments to the track installation site downstream. As further shown in FIG. 39, already-formed tubes comprising tube segments 110 (e.g., the layered panels 2115 and track layered panels 3115) are constructed along the track installation path 3525 from the assembly conveyor 4005 of the current installation/assembly site 3500 to the current point of use at a track installation site downstream.

Figure 40:
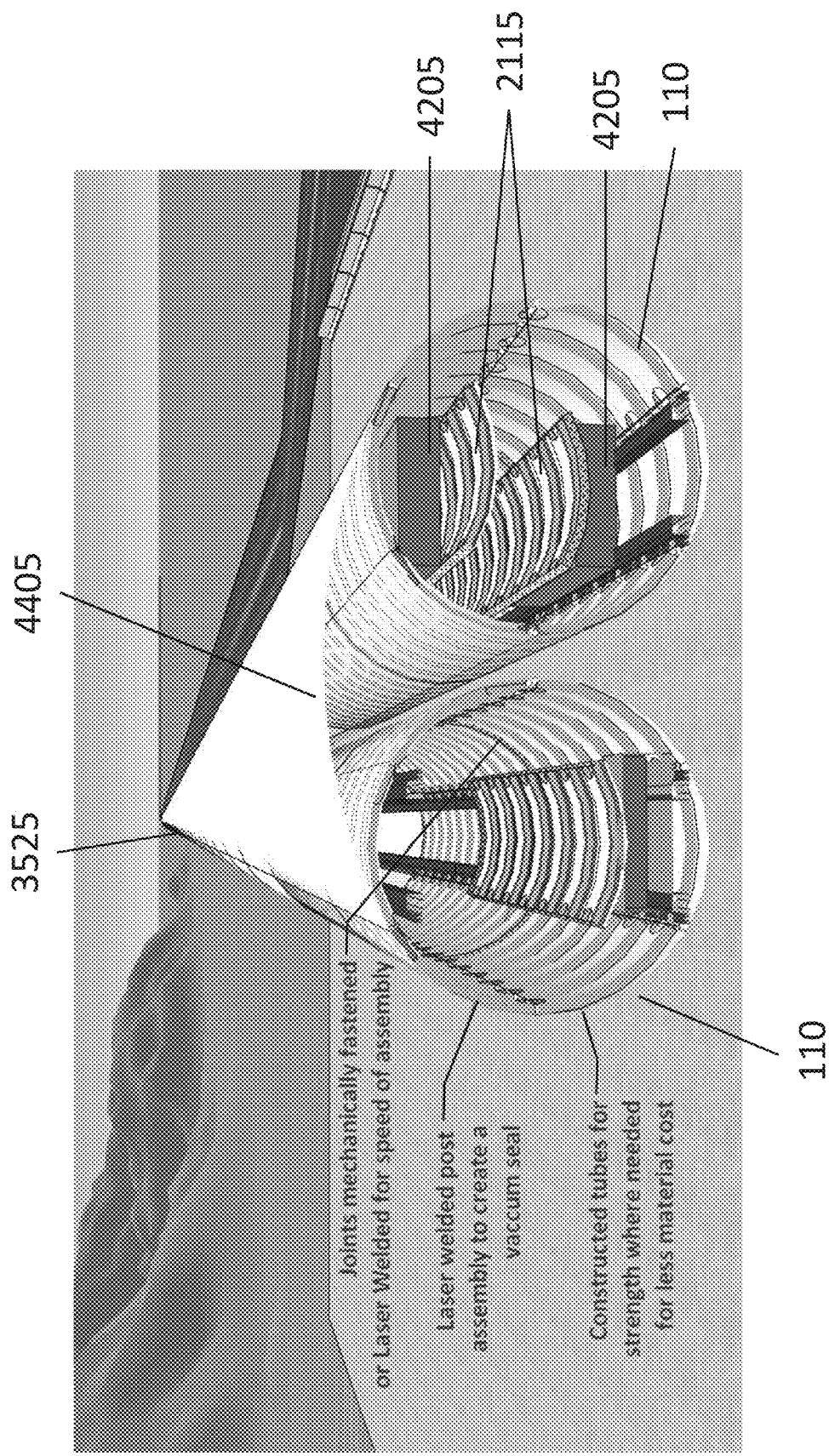
FIG. 40 shows an exemplary depiction of a tube segment queueing conveyor transporting tube segments within already constructed segmental tubes to a downstream point of use at the install site in accordance with aspects of the disclosure.

FIG. 40 shows an exemplary depiction of a tube segment transporter system 4300 transporting tube segments 2115 within already constructed segmental tubes comprising tube segments 110 to a downstream point of use at the install site in accordance with aspects of the disclosure. As shown in FIG. 40, carriers 4205 are configured to travel on the overhead or underneath levitation/propulsion tracks 4210 and operable to carrier a plurality of tube segments (e.g., layered panels 2115). As shown in FIG. 40, the carriers 4205 (one shown) are directed (e.g., semi-autonomously, under computer control, and/or under manual (human) control) to travel down the overhead levitation/propulsion tracks 4210 to deliver the tube segments to the track installation site downstream. It should be understood, that the present disclosure contemplates track arrangements, including an overhead track or an underneath track. As further shown in FIG. 40, already-formed tubes comprising tube segments 110 (e.g., the layered panels 2115 and track layered panels 3115) are constructed along the track installation path 3525 to the current point of use at a track installation site downstream. As the tube segments 110 are arranged in place, joints may be mechanically fastened (e.g., using the formed holes in the tube segments) for speed of assembly. Once the joints are mechanically-fastened, the seams between adjacent tube segments 110 may be welded together to create a vacuum-sealable structure. In accordance with aspects of the disclosure, the tubes are designed and constructed to optimally provide strength in the tube segments where needed in an effort to reduce material costs. As also depicted in FIG. 40, a tube cover layer 4405 (e.g., metal layer, tensioned fabric, composite material, etc.) may be provided to cover the tubes of the track after assembly of the tube sections and connection to the tube.

Figure 41:
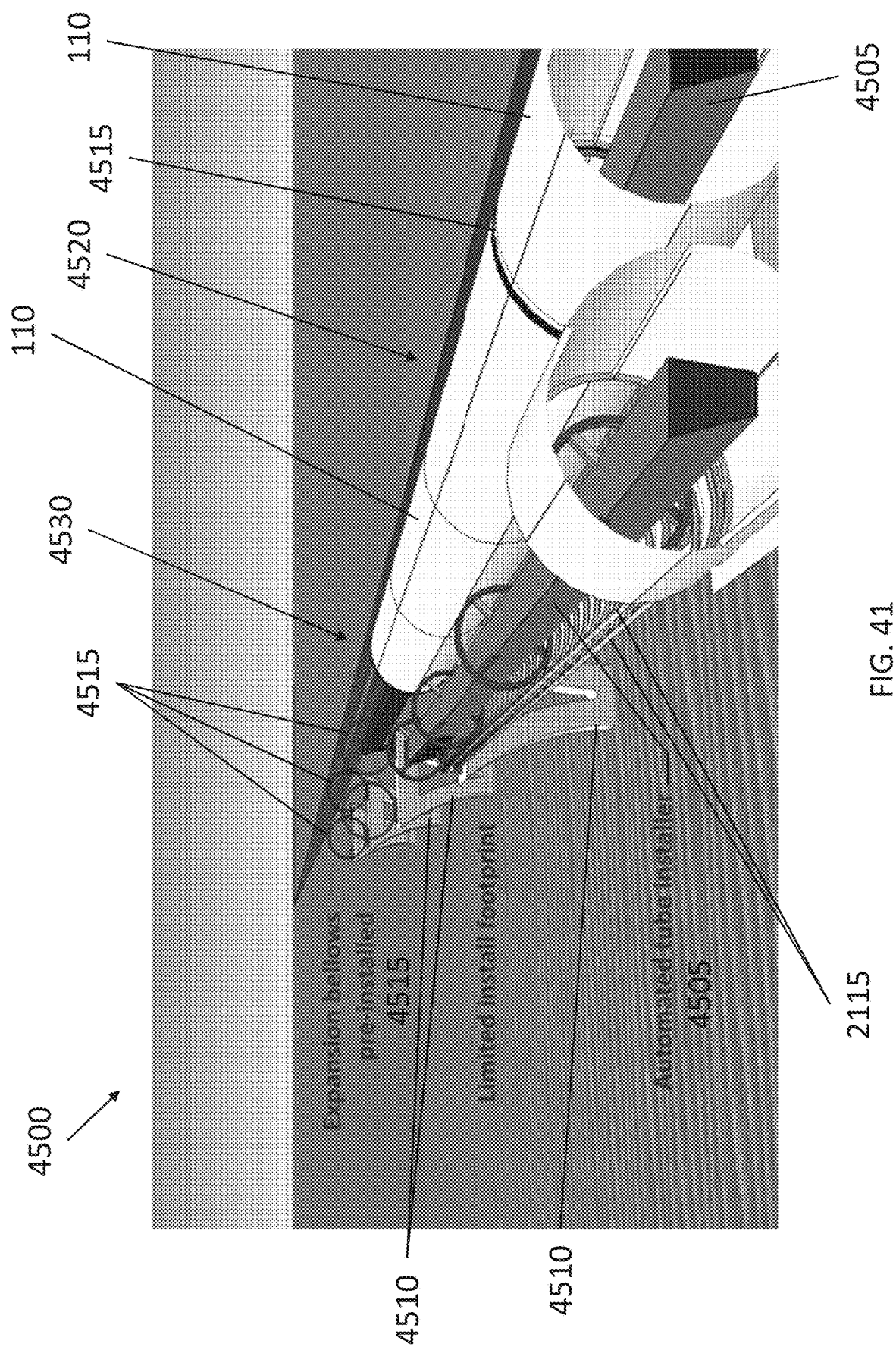
FIG. 41 shows an exemplary depiction of an automated tube segment installer for constructing segmental tubes at the install site in accordance with aspects of the disclosure.

FIG. 41 shows an exemplary depiction of an automated tube segment installer 4505 and installation process 4500 for constructing segmental tubes 4520 at the track installation site 4530 in accordance with aspects of the disclosure. As shown in FIG. 41, the automated tube segment installer 4505 is operable to move layered panels 2115 (e.g., one or more layered panels 2115 and track layered panels 3115) into location along the transportation path between pre-installed expansion bellows 4515 arranged on pillars 4510, for example. As shown in FIG. 41, by implementing aspects of the disclosure, the installation can utilize a limited install footprint, and reduce costs. Once the automated tube segment installer 4505 moves the tube segments 100 (e.g., one or more layered panels 2115 and track layered panels 3115) into location (e.g., longitudinally along the transportation path and in a circumferential direction of the tube transportation path), the tube segments 100 may be welded (and in some embodiments, fastened) to one another (and to the bellows 4515) to form individual tube sections 110 of the segmental tubes 4520.

Figure 42:
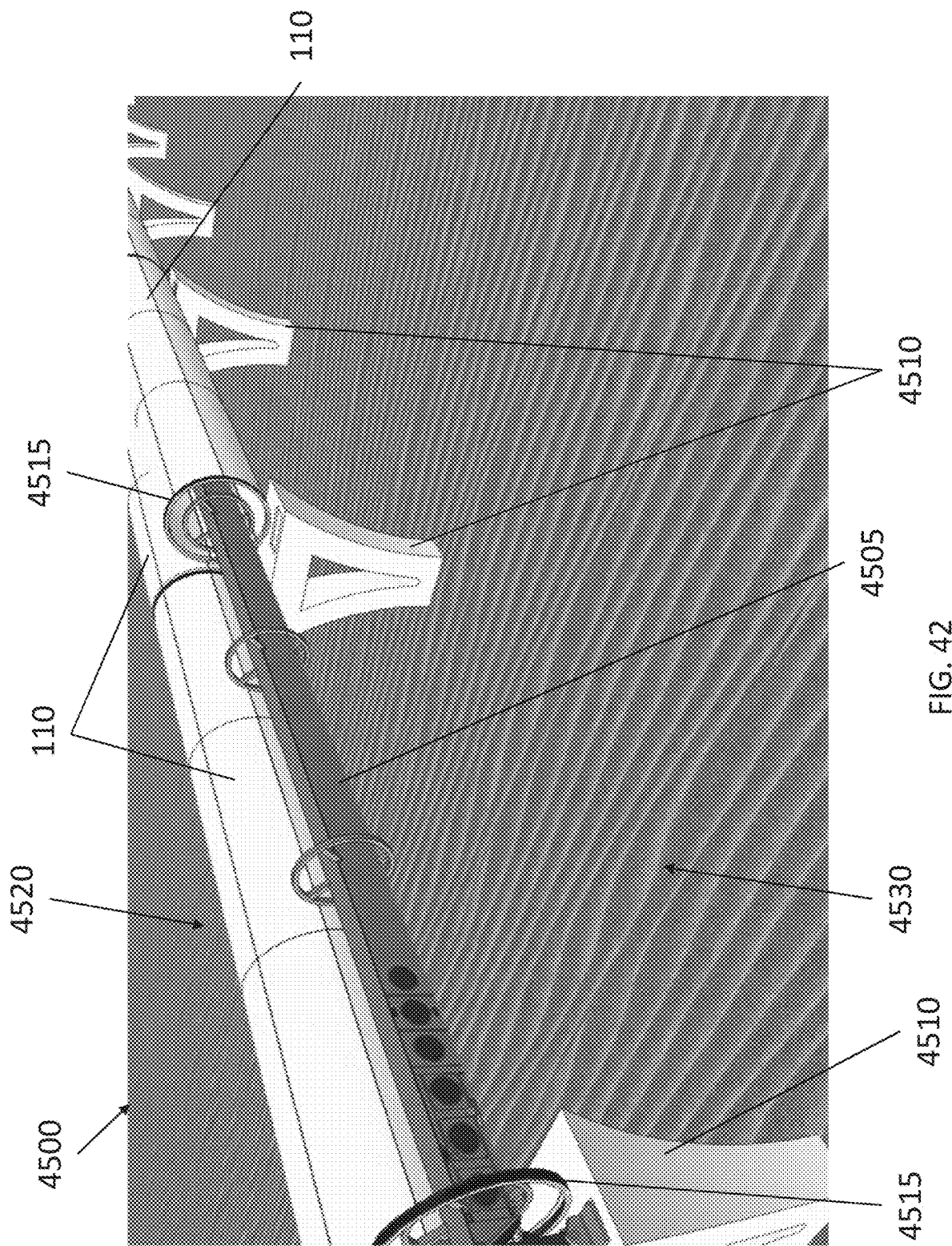
FIG. 42 shows another exemplary depiction of the automated tube segment installer for constructing segmental tubes at the install site in accordance with aspects of the disclosure.

FIG. 42 shows another an exemplary depiction of an automated tube segment installer 4505 and installation process 4500 for constructing segmental tubes 4520 at the track installation site 4530 in accordance with aspects of the disclosure. As shown in FIG. 42, the automated tube segment installer 4505 may be arranged via a mounting arrangement, for example between two pillars 4510 (e.g., adjacent pillars or non-adjacent pillars). The automated tube segment installer 4505 is operable to move layered panels 2115 (e.g., one or more layered panels 2115 and track layered panels 3115) into location along the transportation path between pre-installed expansion bellows 4515 arranged on pillars 4510, for example.

Figure 43:
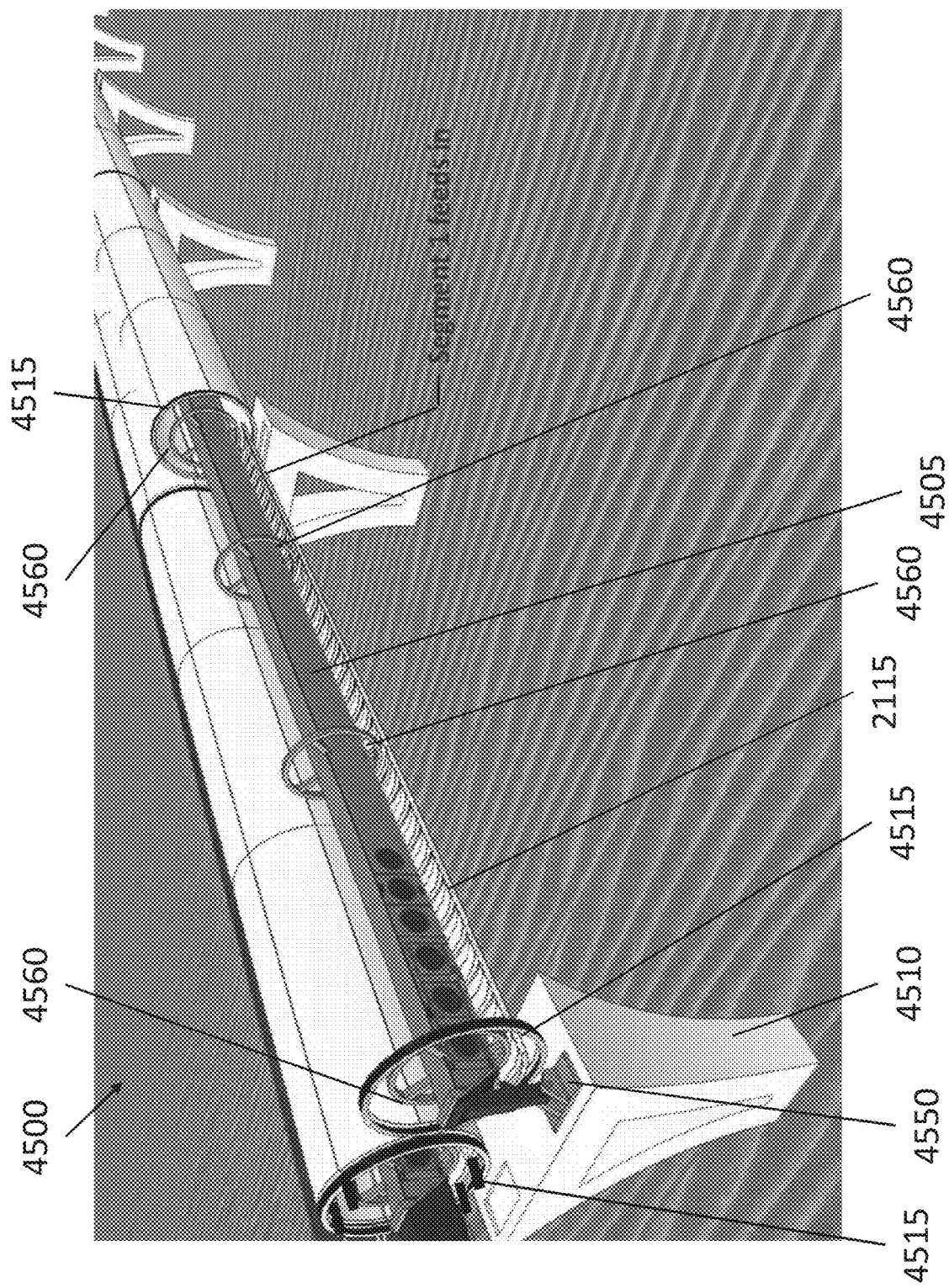
FIG. 43 shows an exemplary tube segment feeding-in process of the automated tube segment installer in accordance with aspects of the disclosure.

FIG. 43 shows an exemplary tube segment feeding-in process (e.g., segment one) of the installation process 4500 of the automated tube segment installer 4505 in accordance with aspects of the disclosure. As shown in FIG. 43, the automated tube segment installer 4505 may be arranged via a mounting arrangement 4550 (one shown), for example between two pillars 4510 (e.g., adjacent pillars or non-adjacent pillars). As shown in FIG. 43, the automated tube segment installer 4505 moves a layered panel 2115 into location along the transportation path between the expansion bellows 4515 arranged on adjacent pillars 4510. In embodiments, the automated tube segment installer 4505 may utilize conveyors with panel securing elements 4560 (e.g., magnets, vacuums, etc.) mounted thereon to move a layered panel 2115 into location along the transportation path between the expansion bellows 4515.

Figure 44:
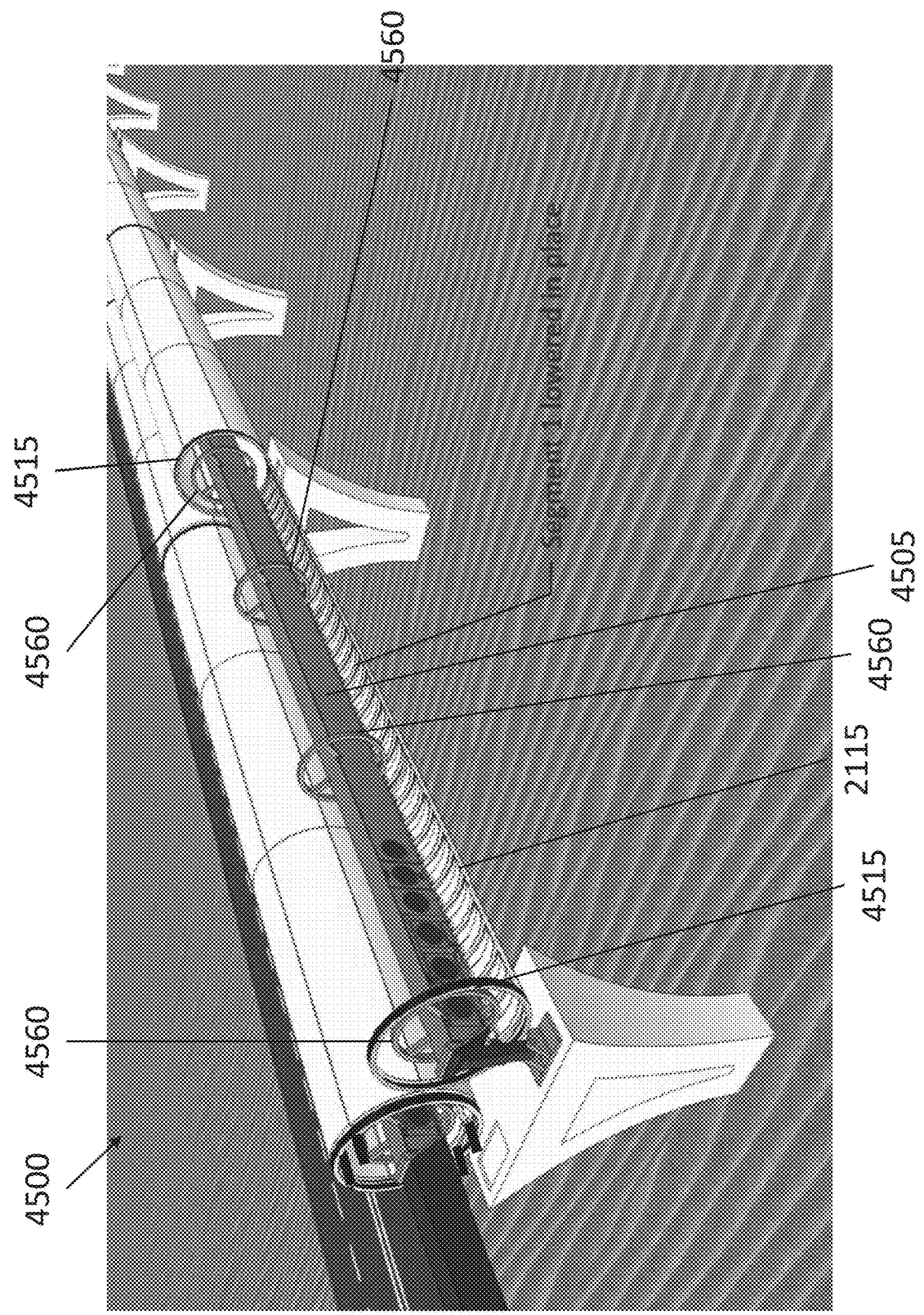
FIG. 44 shows an exemplary tube segment lowering process of the automated tube segment installer in accordance with aspects of the disclosure.

FIG. 44 shows an exemplary tube segment lowering process (e.g., segment one) of the installation process 4500 of the automated tube segment installer 4505 in accordance with aspects of the disclosure. As shown in FIG. 44, once the automated tube segment installer 4505 moves a layered panel 2115 into location (longitudinally) along the transportation path between the expansion bellows 4515 arranged on adjacent pillars 4510, the automated tube segment installer 4505 is operable to lower the layered panel 2115 (in a radial direction) into position on the expansion bellows 4515. In embodiments, the panel securing elements 4560 are operable to move the layered panel 2115 (in a radial direction) into location along the transportation path between the expansion bellows 4515. Once the layered panel 2115 is arranged into position on the expansion bellows 4515, the layered panel 2115 may be fastened and/or welded to the expansion bellows 4515.

Figure 45:
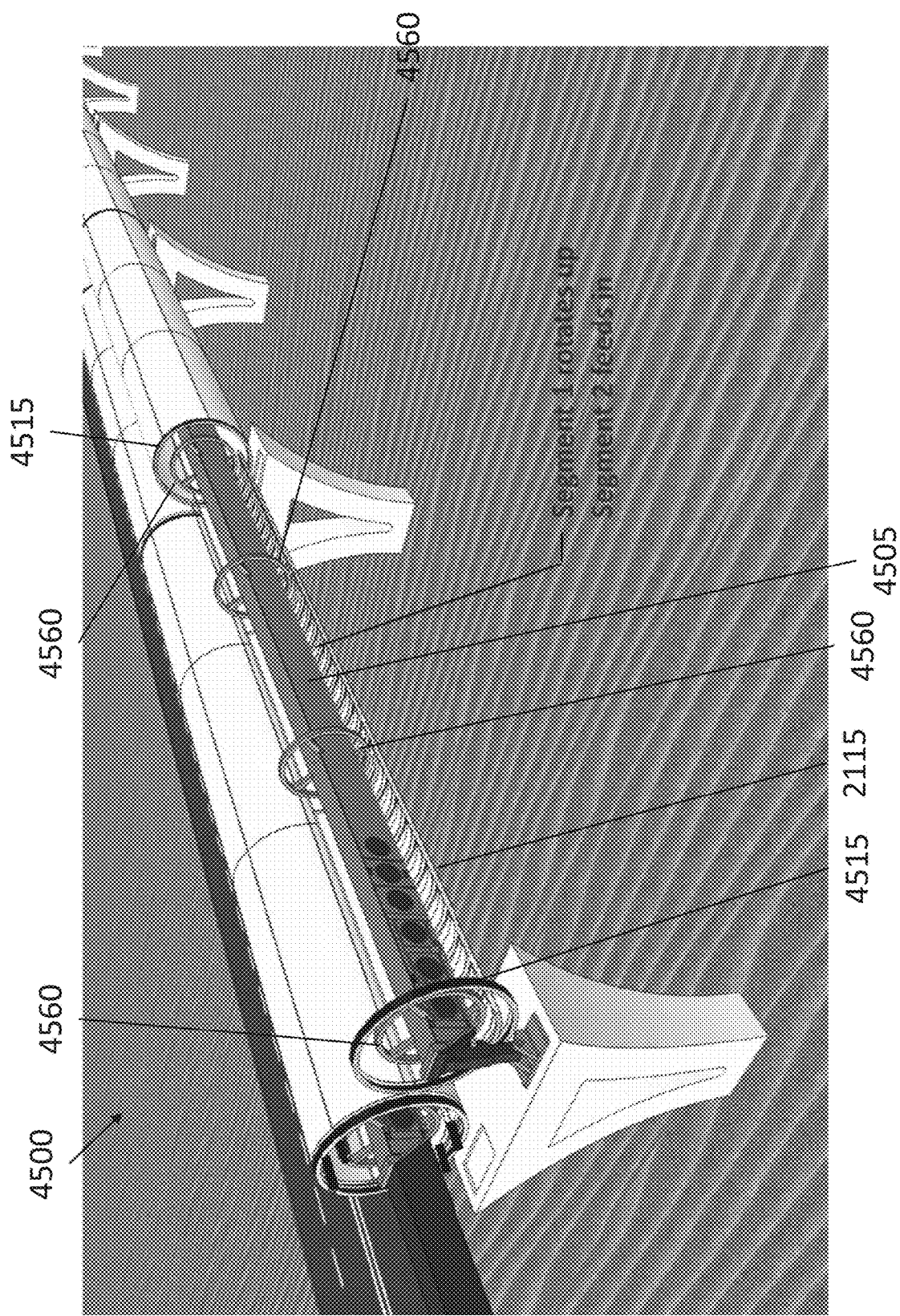
FIG. 45 shows an exemplary tube segment rotating process and a feeding-in process of a next (or second) tube segment in accordance with aspects of the disclosure.

FIG. 45 shows an exemplary tube segment rotating process and a feeding-in process of a next (or second) tube segment in accordance with aspects of the disclosure. As shown in FIG. 45, the expansion bellows 4515 are rotated (e.g., using a rotating mechanism arranged in the mounting arrangement 4550) to move the first panel in a circumferential direction (of the tube under construction), e.g., 60° for a six-panel commonly-sized segmental tube construction. As shown in FIG. 45, while (or after or before) the expansion bellows 4515 are rotated to move the first panel in a circumferential direction, the automated tube segment installer 4505 performs a feeding-in process of a next layered panel 2115 (e.g., segment two) into location along the transportation path between the expansion bellows 4515 arranged on adjacent pillars 4510.

Figure 46:
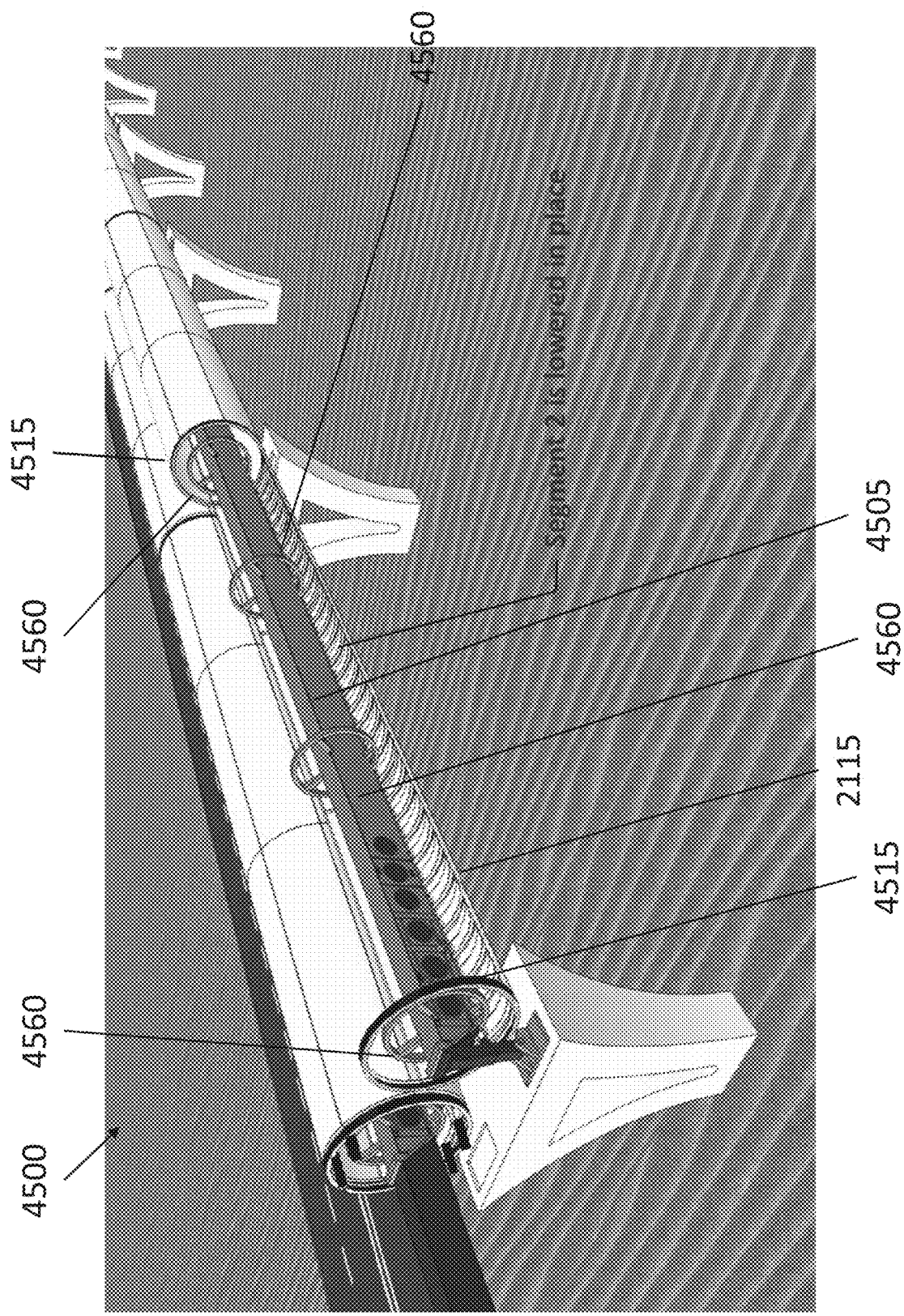
FIG. 46 shows an exemplary tube segment lowering process of a second tube segment in accordance with aspects of the disclosure.

FIG. 46 shows an exemplary tube segment lowering process of a second tube segment of the installation process 4500 of the automated tube segment installer 4505 in accordance with aspects of the disclosure. As shown in FIG. 46, once the automated tube segment installer 4505 performs a feeding-in process and moves a layered panel 2115 (e.g., segment two) into location (longitudinally) along the transportation path between the expansion bellows 4515 arranged on adjacent pillars 4510, the automated tube segment installer 4505 is operable to lower the layered panel 2115 (in a radial direction) into position on the expansion bellows 4515. In embodiments, panel securing elements 4560 are operable to move the layered panel 2115 (in a radial direction) into location along the transportation path between the expansion bellows 4515. Once the layered panel 2115 is arranged into position on the expansion bellows 4515, the layered panel 2115 (e.g., segment two) may be fastened (and/or welded) to the expansion bellows 4515 and/or to the adjacent panel 2115 (e.g., segment one).

Figure 47:
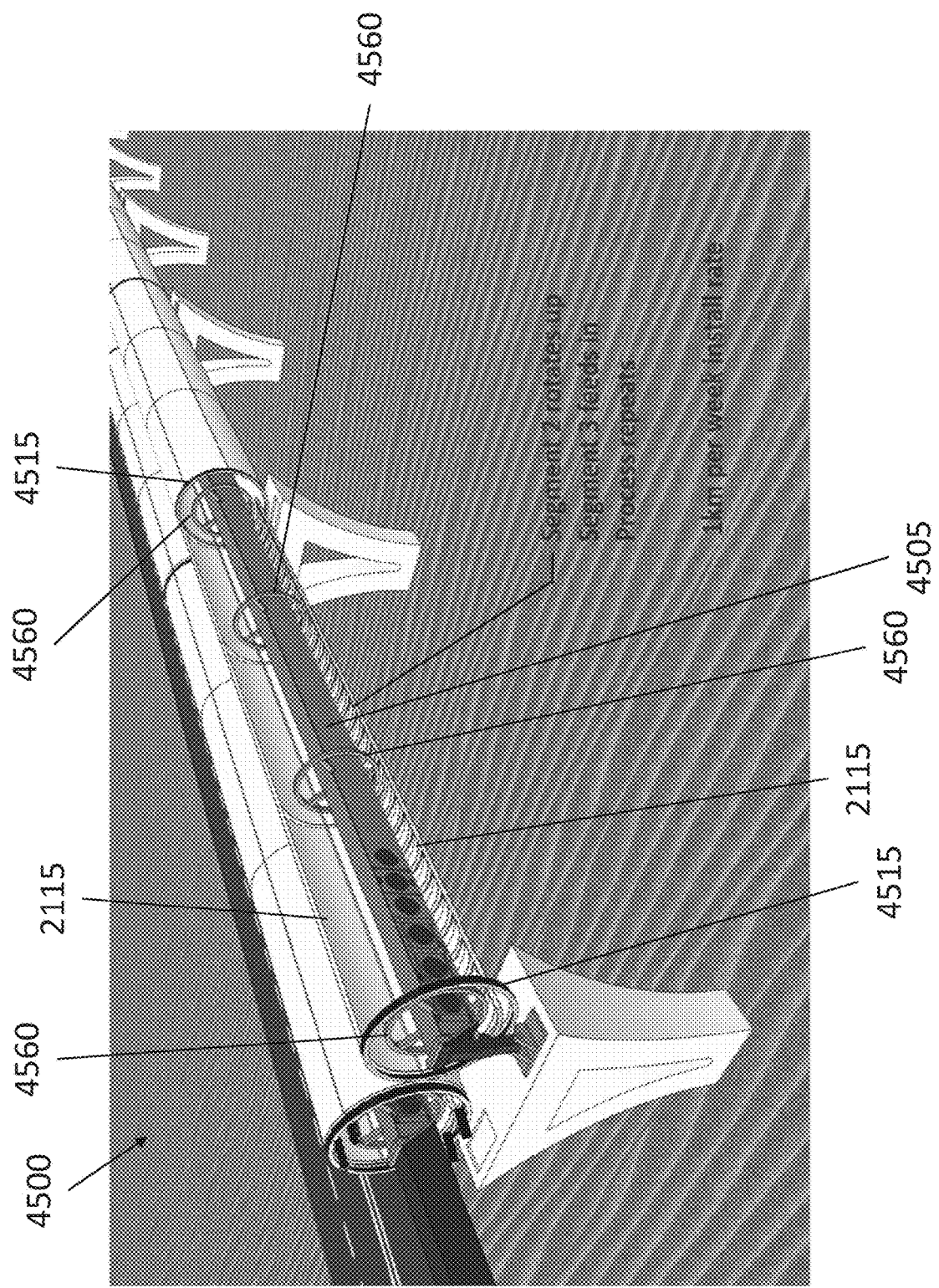
FIG. 47 shows a tube segment rotating process and a feeding-in process of a next (or third) tube segment in accordance with aspects of the disclosure.

FIG. 47 shows an exemplary tube segment rotating process and a feeding-in process of a next (or third) tube segment of the installation process 4500 of the automated tube segment installer 4505 in accordance with aspects of the disclosure. As shown in FIG. 47, the expansion bellows 4515 are rotated (e.g., using a rotating mechanism arranged in the mounting arrangement 4550) to move the first panel and second panel in a circumferential direction (of the tube under construction), e.g., 60° for a six-panel commonly-sized segmental tube construction. As shown in FIG. 47, while (or after or before) the expansion bellows 4515 are rotated to move the first and second panels in a circumferential direction, the automated tube segment installer 4505 performs a feeding-in process of a next layered panel 2115 (e.g., segment three) into location along the transportation path between the expansion bellows 4515 arranged on adjacent pillars 4510.

Figure 48:
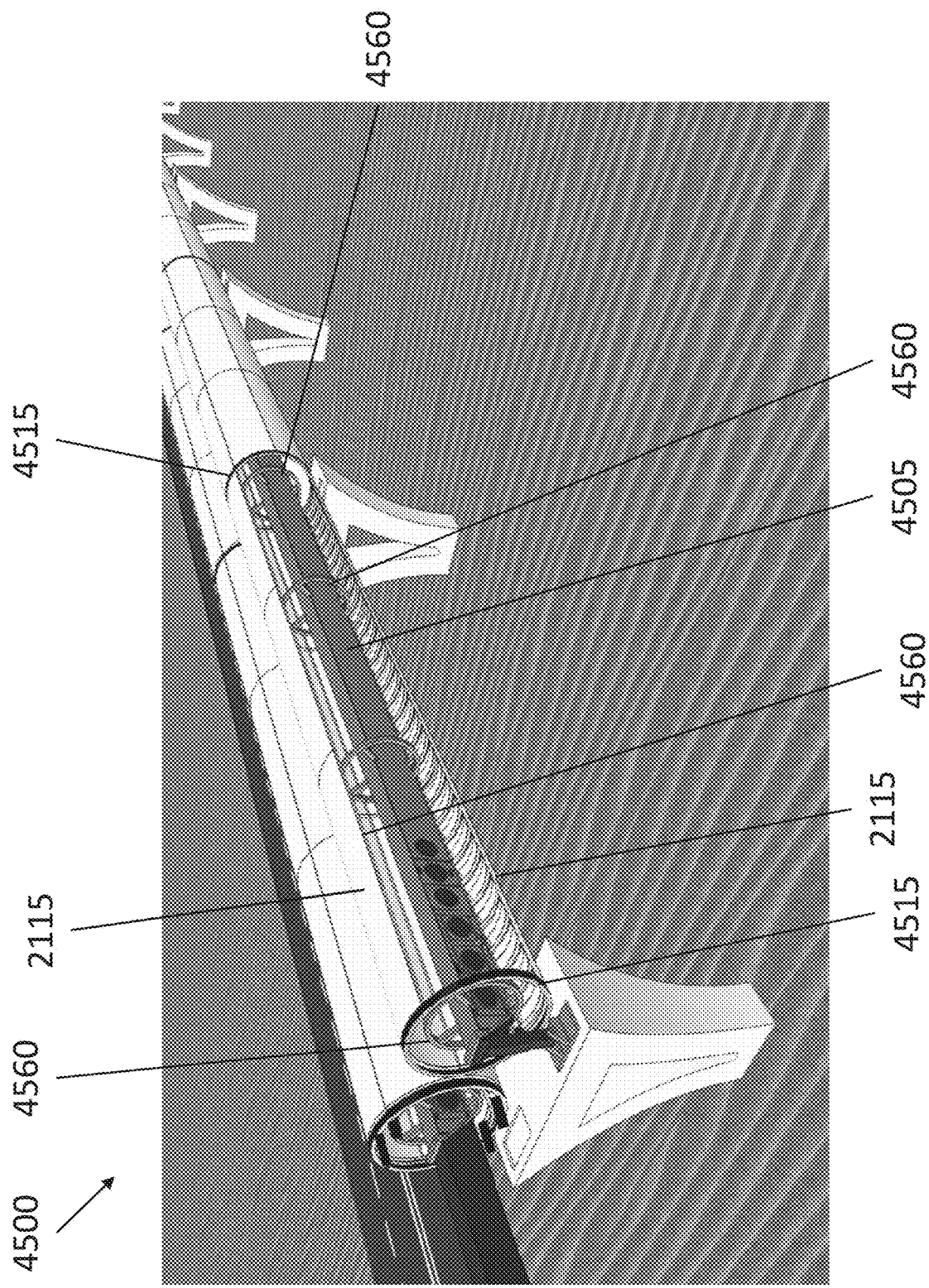
FIG. 48 shows an exemplary tube segment lowering process of the third tube segment in accordance with aspects of the disclosure.

FIG. 48 shows an exemplary tube segment lowering process of the third tube segment of the installation process 4500 of the automated tube segment installer 4505 in accordance with aspects of the disclosure. As shown in FIG. 48, once the automated tube segment installer 4505 performs a feeding-in process and moves a layered panel 2115 (e.g., segment three) into location (longitudinally) along the transportation path between the expansion bellows 4515 arranged on adjacent pillars 4510, the automated tube segment installer 4505 is operable to lower the layered panel 2115 (in a radial direction) into position on the expansion bellows 4515. In embodiments, panel securing elements 4560 are operable to move the layered panel 2115 (in a radial direction) into location along the transportation path between the expansion bellows 4515. Once the layered panel 2115 is arranged into position on the expansion bellows 4515, the layered panel 2115 (e.g., segment three) may be fastened (and/or welded) to the expansion bellows 4515 and/or to the adjacent panel 2115 (e.g., segment two).

Figure 49:
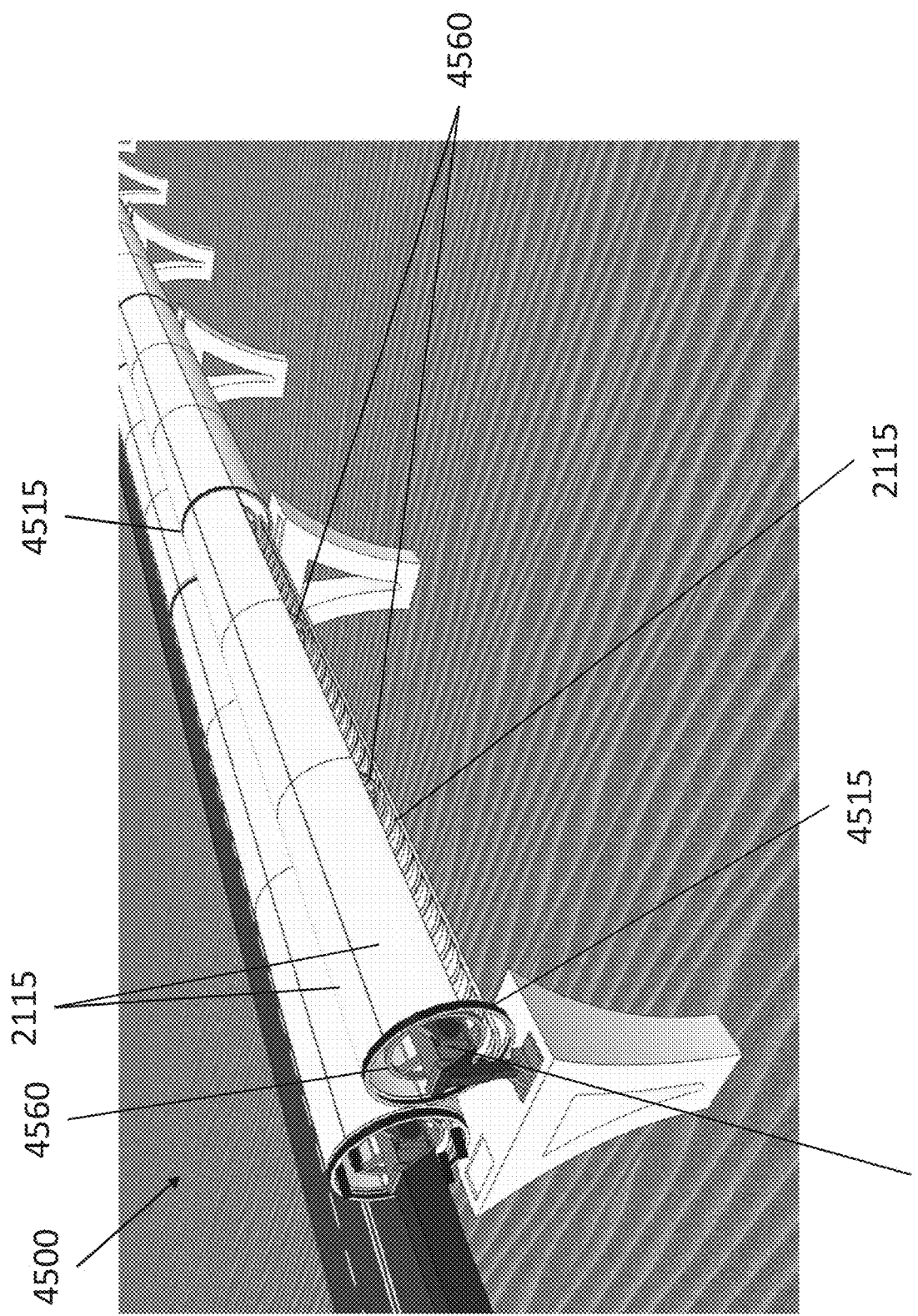
FIG. 49 shows a tube segment rotating process and a feeding-in process of a next (or fourth) tube segment in accordance with aspects of the disclosure.

FIG. 49 shows a tube segment rotating process and a feeding-in process of a penultimate tube segment of the installation process 4500 of the automated tube segment installer 4505 in accordance with aspects of the disclosure. As shown in FIG. 49, the expansion bellows 4515 are rotated (e.g., using a rotating mechanism arranged in the mounting arrangement 4550) to move the first, second, third, and fourth panels in a circumferential direction (of the tube under construction), e.g., 60° for a six-panel commonly-sized segmental tube construction. As shown in FIG. 49, while (or after or before) the expansion bellows 4515 are rotated to move the first, second, third, and fourth panels in a circumferential direction, the automated tube segment installer 4505 performs a feeding-in process of a next layered panel 2115 (e.g., segment five) into location along the transportation path between the expansion bellows 4515 arranged on adjacent pillars 4510.

Figure 50:
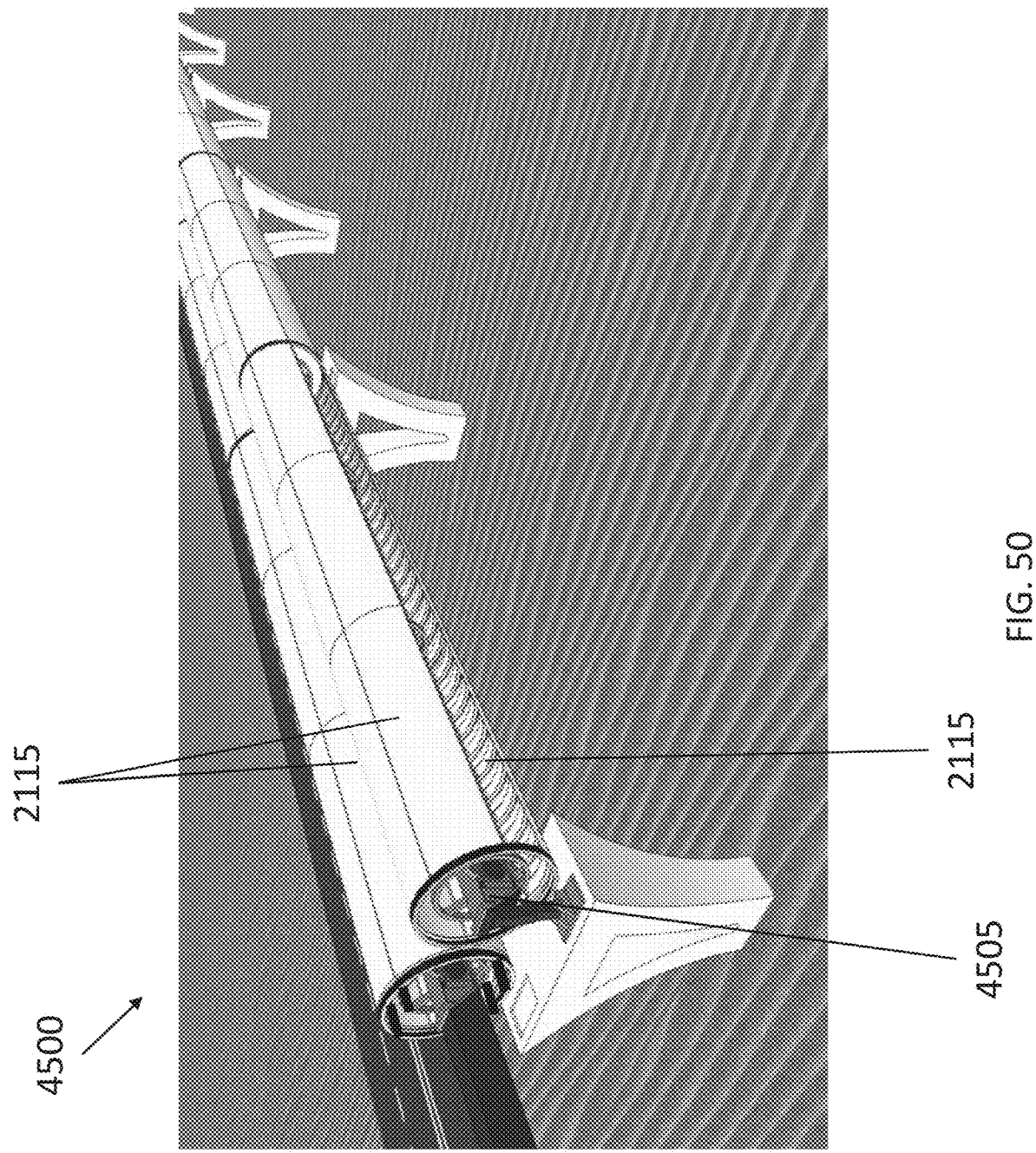
FIG. 50 shows an exemplary tube segment lowering process of the fourth tube segment in accordance with aspects of the disclosure.

FIG. 50 shows an exemplary tube segment lowering process of the fifth (e.g., penultimate) tube segment of the installation process 4500 of the automated tube segment installer 4505 in accordance with aspects of the disclosure. As shown in FIG. 50, once the automated tube segment installer 4505 performs a feeding-in process and moves a layered panel 2115 (e.g., segment five) into location (longitudinally) along the transportation path between the expansion bellows 4515 arranged on adjacent pillars 4510, the automated tube segment installer 4505 is operable to lower the layered panel 2115 (in a radial direction) into position on the expansion bellows 4515. In embodiments, panel securing elements 4560 are operable to move the layered panel 2115 (in a radial direction) into location along the transportation path between the expansion bellows 4515. Once the layered panel 2115 is arranged into position on the expansion bellows 4515, the layered panel 2115 (e.g., segment five) may be fastened (and/or welded) to the expansion bellows 4515 and/or to the adjacent panel 2115 (e.g., segment four).

Figure 51:
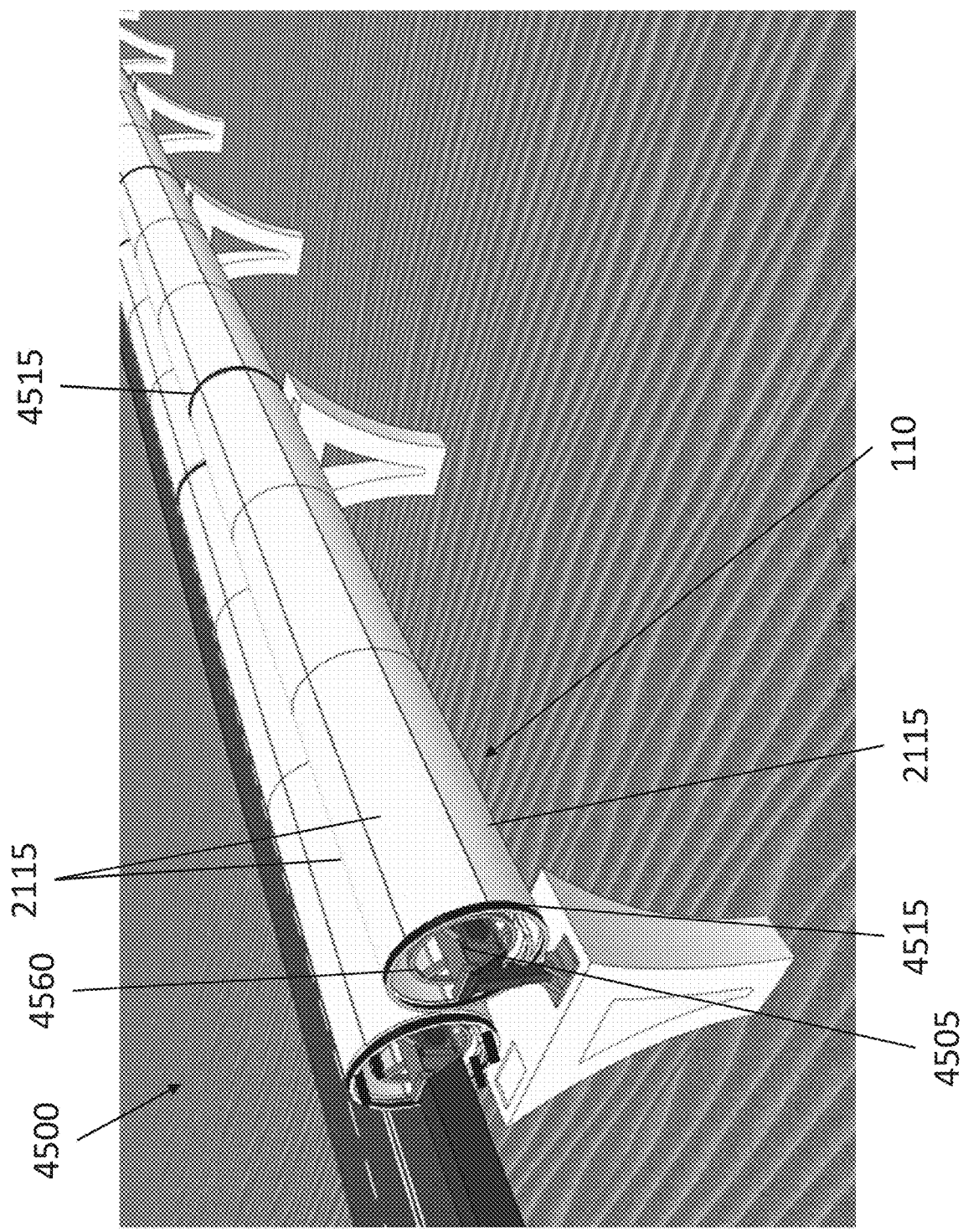
FIG. 51 shows an exemplary tube segment lowering process of a final tube segment to form the segmental tube section in accordance with aspects of the disclosure.

FIG. 51 shows an exemplary tube segment lowering process of a final (e.g., sixth) tube segment of the installation process 4500 of the automated tube segment installer 4505 to form the segmental tube section in accordance with aspects of the disclosure. The expansion bellows 4515 are rotated (e.g., using a rotating mechanism arranged in the mounting arrangement 4550) to move the first, second, third, fourth, and fifth panels in a circumferential direction (of the tube under construction), e.g., 60° for a six-panel commonly-sized segmental tube construction. While (or after or before) the expansion bellows 4515 are rotated to move the first, second, third, fourth and fifth panels in a circumferential direction, the automated tube segment installer 4505 performs a feeding-in process of a layered track panel 3115 (e.g., segment six) into location along the transportation path between the expansion bellows 4515 arranged on adjacent pillars 4510.

As shown in FIG. 51, once the automated tube segment installer 4505 performs a feeding-in process and moves a layered track panel 3115 (e.g., segment six) into location (longitudinally) along the transportation path between the expansion bellows 4515 arranged on adjacent pillars 4510, the automated tube segment installer 4505 is operable to lower the layered track panel 3115 (in a radial direction) into position on the expansion bellows 4515. In embodiments, panel securing elements 4560 are operable to move the layered track panel 3115 (in a radial direction) into location along the transportation path between the expansion bellows 4515. Once the layered panel 2115 is arranged into position on the expansion bellows 4515, the layered panel 3115 (e.g., segment six) may be fastened (and/or welded) to the expansion bellows 4515 and/or to the adjacent panel 2115 (e.g., segments five and one). As shown in FIG. 51, once the final tube segment is arranged and secured (e.g., fastened and/or welded) in place, the panels 2115 and track panel 3115 together form the segmental tube section 110. Moreover, in accordance with aspects of the disclosure, by placing the track panel 3115 last (e.g., as the sixth tube segment with this exemplary and non-limiting embodiment), the track panel 3115 is in proper position (circumferentially) for an underneath track when it is moved longitudinally and vertically into arrangement (without need for rotation in the circumferential direction). It should be understood, however, that the present disclosure contemplates other track arrangements, including an overhead track.

Figure 52:
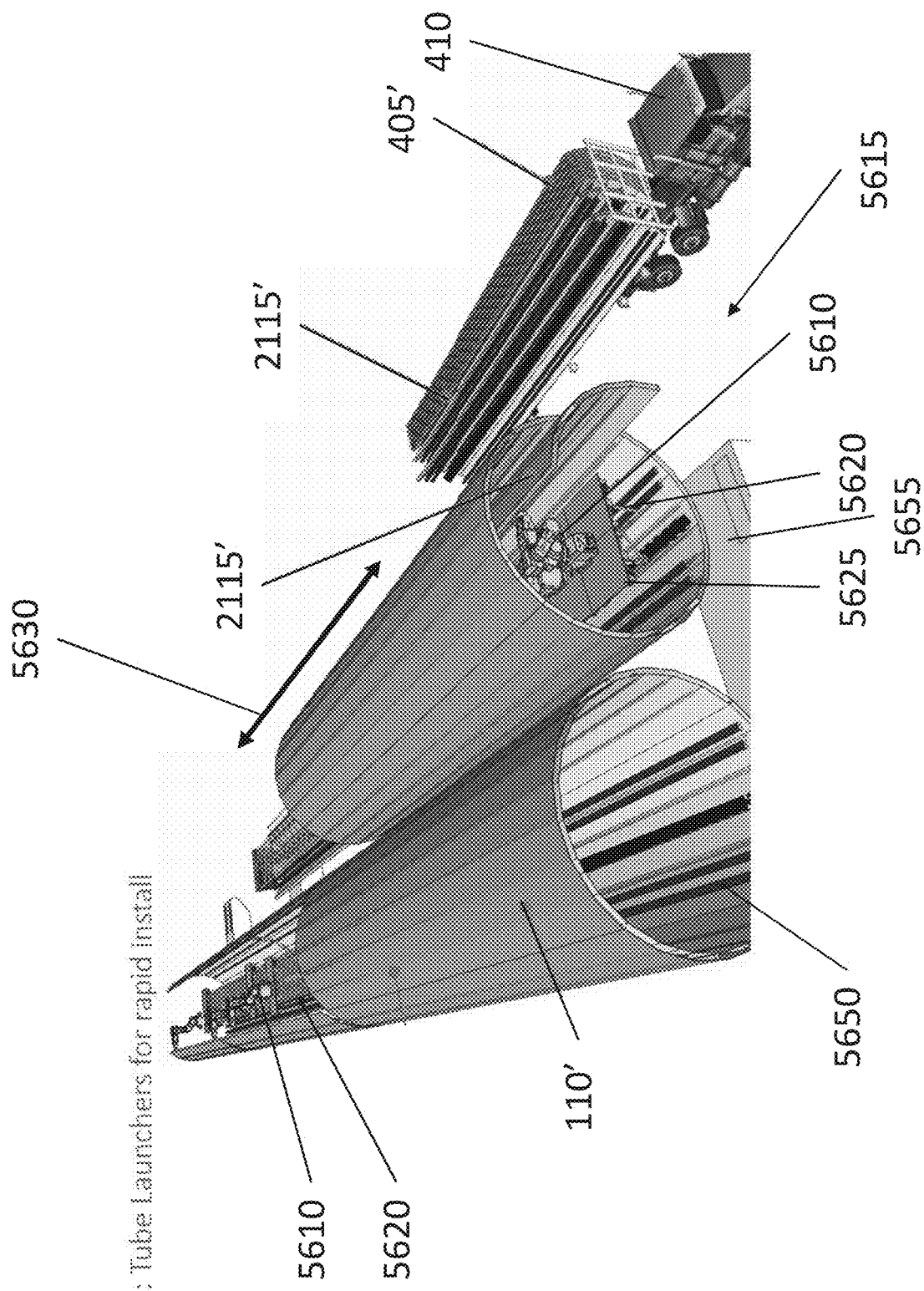
FIG. 52 shows an exemplary depiction of an automated tube segment installer for constructing segmental tubes at the install site in accordance with aspects of the disclosure.

FIG. 52 shows an exemplary depiction of an automated tube segment installer for constructing segmental tubes at the install site in accordance with aspects of the disclosure. As shown in FIG. 52, with this exemplary and non-limiting embodiment, the segmental tube section 110' is formed of four (quadrant) tube segments 100'. In accordance with aspects of the disclosure, automation systems may assemble the tube segments in the field (e.g., at an installation location). In embodiments, the tube is assembled from the center outward, enabling assembly inside tunnels, keeping manufacturing tooling standard and amortized over large volumes of the constructed tube.

In embodiments, the tube segments are manufactured in a production facility on flexible roll forming lines to accommodate different lengths and, in embodiments, to accommodate different diameters. In embodiments, a sheet metal tube design is used that applies material strength where needed, while, e.g., minimizing material (and thus, weight and cost) in regions where material strength less necessary. In accordance with further aspects of the disclosure, using a sheet metal construction (e.g., as opposed to other manufacturing/construction techniques) advantageously utilizes a mature, low-cost, quality- and safety-conscious industry sheet metal construction base.

In accordance with aspects of the disclosure, material handling systems transport tube segments from an infeed of the tube and transport/supply segments to installation robots. As shown in FIG. 52, in accordance with aspects of the disclosure, a plurality of tube segments can be accommodated nested in an open trailer 405' attached to a truck 410. As noted herein, tube segments can also be accommodated in a container (e.g., a 40' shipping container) for fast deployment anywhere in the world. As shown in FIG. 52, in accordance with additional aspects of the disclosure, the tube segments 110' may be pre-populated with, e.g., tested components pre-assembled in the controlled environment of a production facility. In such a manner, manufacturing in the field is minimized, and in accordance with aspects of the disclosure, the tube segments 110' can be "plugged and played" in the field.

As shown in FIG. 52, aspects of the disclosure are directed to a tube assembling gantry 5615. The tube assembling gantry includes an at least one assembly track 5620, at least one platform 5625, and at least one robotic manipulator 5610. In an exemplary embodiment, the at least one robotic manipulator 5610 may include an actuator, an end effector, and a welding cell. The assembly track 5620 may be assembled in the location where the tube is desired. The at least one robotic manipulator 5610 may be positioned on the track 5620 such that it has at least one direction 5630 of motion in the direction of the track.

As shown in FIG. 52, an embodiment is directed to a method for assembling a segmented tube in the field. A plurality of plate segments may be delivered to an assembly site, such as a location where a segmented tube is desired to be located. A tube assembling gantry 5615 may be deployed. The robotic manipulator 5610 may position the end effector to move a plate or tube segment (e.g., layered panel 2115') to a desired location. In embodiments, the robotic manipulator 5610 may utilize a bolting system to substantially connect a first plate segment and a second adjacent plate segment to assemble a tube segment 110'. In other contemplated embodiments, the robotic manipulator 5610 is operable to arrange and hold the plate in proper position while welding is performed (e.g., by a welding robot) with need for fastening (e.g., with bolts) the tube segments to one another. One or more of the plate segments may have an alignment track 5650. A separate robot manipulator 5610 may move along an alignment track and apply a fastening method, such as epoxy and/or grout, for example, to secure the track. A separate robot manipulator may serially laser weld the tube segments to form a vacuum sealable structure along the track. The gantry 5615 may concurrently move to additional pylons (or pillars) 5655 for further assembly independently of the fastening robot manipulators 5610. A first plate segment may be connected by any number of connectors, such as, for example, welds, fasteners and/or by an interlocking baffled design. In some contemplated embodiments, concrete may be pumped into the inner sandwich of the plate segments. The assembly track 5620 may be extended and relocated linearly along the path of the assembly as the tube segments 110' are built.

As shown in FIG. 52, an additional aspect of the disclosure is directed to attaching plate segments in the direction of length prior to or at substantially the same time as plate segments in the direction of curvature, such that the tube may be assembled in multiple directions simultaneously.

While the specification describes particular embodiments of the present disclosure, those of ordinary skill can devise variations of the present disclosure without departing from the inventive concept. For example, with another contemplated installation process, the tube segments could be transported to the installation site, assembled into a segmental tube section, and lifted or raised into final position (e.g. using suitable crane(s)).

System Environment

Aspects of embodiments of the present disclosure (e.g., control systems for the robots for assembly or for unloading and queueing of the tube segments and control systems for manufacturing the tube segments) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a usb key, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present disclosure may be embodied in a field programmable gate array (FPGA).

Figure 53:
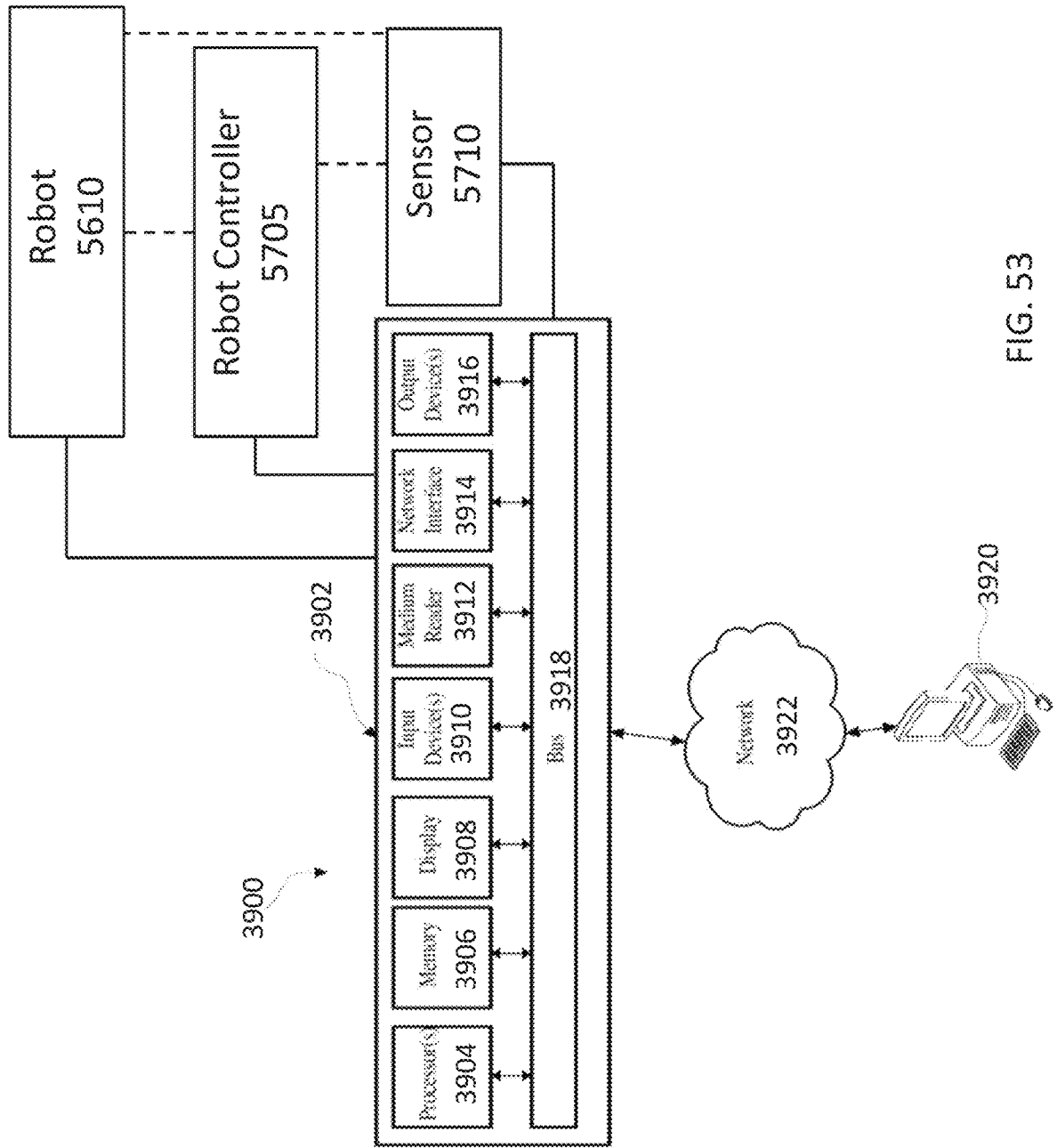
FIG. 53 shows an exemplary environment for practicing aspects of the present disclosure.

FIG. 53 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks or cloud environment.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 53, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 53, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof. As shown in FIG. 53, the computer system 3902 may include communication and/or power connections to robot 5610, and a robot controller 5705 to control activation/deactivation of the robots 5610, in accordance with aspects of the disclosure. Additionally, as shown in FIG. 53, the computer system 3902 may include one or more sensors 5710 (e.g., positional sensors, GPS systems, magnetic sensors) that may provide data (e.g., positional data) to robot controller 5705.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 53. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the disclosure are not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

While the specification describes particular embodiments of the present disclosure, those of ordinary skill can devise variations of the present disclosure without departing from the inventive concept. For example, while some embodiments of the present disclosure utilize the tube segments to form a segmental tube for a low-pressure, high-speed transportation path, it should be understood that the segmental tube structure could also be utilized in the wind industry, the hydro industry, and/or the oil pipe industry.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

Insofar as the description above and the accompanying drawing disclose any additional subject matter that is not within the scope of the claims below, the embodiments are not dedicated to the public and the right to file one or more applications to claim such additional embodiments is reserved.

What is claimed is:

1. A system for installing a segmental tube section structure having a length and a circumference, the segmental tube section structure comprising: a plurality of tube segments extending the length in a longitudinal direction of the segmental tube section structure and extending in a circumferential direction of the segmental tube section structure, wherein each tube segment of the plurality of tube segments extends in the circumferential direction to span an arc of the circumference of the segmental tube section, wherein each of the plurality of tube segments are connected to adjacent tube segments of the plurality of tube segments in the circumferential direction to form the segmental tube section structure, the system comprising:
 a tube-segment remover structured and arranged to queue and position shipping containers for removing the plurality of tube segments therefrom at an installation site;
 an assembly conveyor structured and arranged for queueing the plurality of tube segments removed from the shipping containers and conveying the plurality of tube segments from the tube-segment remover to the tube manufacturing location and through previously assembled segmental tube sections;
 a connection or fastener arrangement for connecting the plurality of tube segments to adjacent tube segments of the plurality of tube segments, and connecting the plurality of tube segments to adjacent tube segments of a previously assembled segmental tube section structure; and
 a controller comprising at least one processor operable to control the tube-segment remover, the assembly conveyor, and the connection or fastener arrangement to install the segmental tube section structure.

2. The system according to claim 1, further comprising:
 a plurality of expansion bellows operable to retain a received tube segment, rotate by a distance of the arc, and retain a next tube segment,
 wherein the received tube segment is connected to the next tube segment while retained by the plurality of expansion bellows.

3. The system according to claim 1, wherein a plurality of segmental tube section structures are connected with adjacent segmental tube section structures to form a tube extending in the longitudinal direction.

4. The system according to claim 1, wherein the system is operable to install tube segments in the longitudinal direction prior to installation of tube segments in the circumferential direction.

5. The system according to claim 1, wherein the system is operable to install tube segments in the longitudinal direction substantially the same time as installation of tube segments in the circumferential direction, such that the tube is assembled in multiple directions simultaneously.

6. The system according to claim 1, wherein the connection or fastener arrangement comprises a welder operable to form an air-tight interior surface.

7. The system according to claim 6, wherein the air-tight interior surface maintains a sub 100 Pa pressure environment.

8. The system according to claim 1, wherein the plurality of tube segments comprise a sheet metal, and each of the plurality of tube segments are connected to the adjacent tube segments of the plurality of tube segments via welds formed between the adjacent tube segments.

9. The system according to claim 8, wherein the plurality of tube segments when welded to the adjacent tube segments of the plurality of tube segments forms an air-tight interior surface.

10. The system according to claim 1, wherein the plurality of tube segments are nestable with each other when arranged adjacent each other, and are accommodateable in the shipping container for shipping from a manufacturing facility.

11. The system according to claim 1, wherein each of the plurality of tube segments comprises an outer metal layer and an inner metal layer.

12. The system according to claim 1, wherein at least one of the plurality of tube segments comprises a transportation vehicle track or an attachment structure to accommodate a vehicle track assembly.

13. The system according to claim 1, wherein the plurality of tube segments comprise six segments each spanning 60 degrees of the circumference of the segmental tube section structure.

14. The system according to claim 1, wherein the plurality of tube segments comprise between six and eight segments.

15. The system according to claim 1, further comprising a transfer mechanism operable to:
 receive a tube segment in a radial fixture spanning from a first column to a second column of the transfer mechanism;
 receive a next tube segment; and
 rotate the tube segment by a distance of the arc, after receiving the tube segment but before receiving the next tube segment.

16. The system according to claim 15, wherein the transfer mechanism is operable to be fully populated prior to welding or connecting adjacent segments together along their longitudinal length.

17. The system according to claim 1, wherein at least some of the tube segments of the plurality of tube segments extends in the circumferential direction to span an equal arc of the circumference of the segmental tube section.

18. The system according to claim 1, wherein all but one of the tube segments of the plurality of tube segments extends in the circumferential direction to span an equal arc of the circumference of the segmental tube section.

19. The system according to claim 18, wherein the tube segment not spanning an equal arc of the circumference of the segmental tube section accommodates a track assembly.

20. The system according to claim 1, further comprising a track attachment/assembly station for attaching at least one of a propulsion track and a levitation track to at least one of the plurality of tube segments.

* * * * *